US008556709B2

(12) United States Patent
Nguyen et al.

(10) Patent No.: US 8,556,709 B2
(45) Date of Patent: *Oct. 15, 2013

(54) VIRTUAL PLAYER TRACKING AND RELATED SERVICES

(75) Inventors: Binh Nguyen, Reno, NV (US); Bryan D. Wolf, Reno, NV (US); Brian Underdahl, VC Highlands, NV (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/188,281

(22) Filed: Jul. 21, 2011

(65) Prior Publication Data

US 2011/0281655 A1 Nov. 17, 2011

Related U.S. Application Data

(63) Continuation of application No. 11/881,190, filed on Jul. 25, 2007, now Pat. No. 8,057,298, which is a continuation of application No. 11/497,740, filed on Aug. 1, 2006, which is a continuation-in-part of application No. 11/285,898, filed on Nov. 23, 2005, which is a continuation of application No. 10/097,507, filed on Mar. 12, 2002, now Pat. No. 6,997,803, application No. 13/188,281, which is a continuation of application No. 11/881,190, filed on Jul. 25, 2007, now Pat. No. 8,057,298, which is a continuation of application No. 11/497,740, filed on Aug. 1, 2006, which is a continuation-in-part of application No. 11/480,713, filed on Jul. 3, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................... 463/25; 463/7; 463/29; 463/42

(58) Field of Classification Search
USPC ........................................................ 463/31
See application file for complete search history.

(56) References Cited

U.S. PATENT DOCUMENTS

| | | | |
|---|---|---|---|
| 3,931,504 | A | 1/1976 | Jacoby |
| 4,072,930 | A | 2/1978 | Lucero et al. |

(Continued)

FOREIGN PATENT DOCUMENTS

| | | |
|---|---|---|
| AU | 199650576 | 4/1997 |
| AU | 2004212348 | 8/2003 |

(Continued)

OTHER PUBLICATIONS

Chinese Third Office Action dated Oct. 26, 2011 issued in CN200780036010.9.

(Continued)

*Primary Examiner* — Dmitry Suhol
*Assistant Examiner* — Kevin Y Kim
(74) *Attorney, Agent, or Firm* — Foley & Lardner LLP

(57) ABSTRACT

Various gaming-related services are provided, including but not limited to security services, harm minimization services, player identification services, bonusing/progressive services, accounting services, financial/banking services, network tunneling services, cheating detection services, etc. Such services may be provided, at least in part, by software agents that can be configured for different platforms and/or operating systems. Some software-based player tracking methods of the invention can aggregate data from multiple devices used by a player for gaming.

26 Claims, 21 Drawing Sheets

(56) References Cited

U.S. PATENT DOCUMENTS

| | | | |
|---|---|---|---|
| 4,335,809 | A | 6/1982 | Wain |
| 4,430,728 | A | 2/1984 | Beitel et al. |
| 4,454,594 | A | 6/1984 | Heffron et al. |
| 4,468,750 | A | 8/1984 | Chamoff et al. |
| 4,532,416 | A | 7/1985 | Berstein |
| 4,572,509 | A | 2/1986 | Sitrick |
| 4,582,324 | A * | 4/1986 | Koza et al. ...................... 463/16 |
| 4,607,844 | A | 8/1986 | Fullerton |
| 4,652,998 | A | 3/1987 | Koza et al. |
| 4,689,742 | A | 8/1987 | Troy et al. |
| 4,856,787 | A | 8/1989 | Itkis |
| 4,868,900 | A | 9/1989 | Mcguire |
| 5,103,079 | A | 4/1992 | Barakai et al. |
| 5,136,644 | A | 8/1992 | Audebert et al. |
| 5,149,945 | A | 9/1992 | Johnson et al. |
| 5,155,837 | A | 10/1992 | Liu et al. |
| 5,265,874 | A | 11/1993 | Dickinson et al. |
| 5,286,062 | A | 2/1994 | Greenwood et al. |
| 5,290,033 | A | 3/1994 | Bittner et al. |
| 5,342,047 | A | 8/1994 | Heidel et al. |
| 5,348,299 | A | 9/1994 | Clapper, Jr. |
| 5,397,125 | A | 3/1995 | Adams |
| 5,410,703 | A | 4/1995 | Nilsson et al. |
| 5,421,009 | A | 5/1995 | Platt |
| 5,421,017 | A | 5/1995 | Scholz et al. |
| 5,466,920 | A | 11/1995 | Nair et al. |
| 5,473,772 | A | 12/1995 | Halliwell et al. |
| 5,487,544 | A | 1/1996 | Clapper, Jr. |
| 5,489,096 | A | 2/1996 | Aron |
| 5,491,812 | A | 2/1996 | Pisello et al. |
| 5,555,418 | A | 9/1996 | Nilsson et al. |
| 5,609,337 | A | 3/1997 | Clapper, Jr. |
| 5,611,730 | A | 3/1997 | Weiss |
| 5,643,086 | A | 7/1997 | Alcorn et al. |
| 5,645,485 | A | 7/1997 | Clapper, Jr. |
| 5,647,592 | A | 7/1997 | Gerow |
| 5,654,746 | A | 8/1997 | McMullan, Jr. et al. |
| 5,655,961 | A | 8/1997 | Acres et al. |
| 5,671,412 | A | 9/1997 | Christiano |
| 5,682,533 | A | 10/1997 | Siljestroemer |
| 5,684,750 | A | 11/1997 | Kondoh et al. |
| 5,688,174 | A | 11/1997 | Kennedy |
| 5,702,304 | A | 12/1997 | Acres et al. |
| 5,715,403 | A | 2/1998 | Stefik |
| 5,715,462 | A | 2/1998 | Iwamoto et al. |
| 5,741,183 | A | 4/1998 | Acres et al. |
| 5,749,784 | A | 5/1998 | Clapper, Jr. |
| 5,752,882 | A | 5/1998 | Acres et al. |
| 5,759,102 | A | 6/1998 | Pease et al. |
| 5,761,647 | A | 6/1998 | Boushy |
| 5,762,552 | A | 6/1998 | Vuong et al. |
| 5,766,076 | A | 6/1998 | Pease et al. |
| 5,768,382 | A | 6/1998 | Schneier et al. |
| 5,770,533 | A | 6/1998 | Franchi |
| 5,779,545 | A | 7/1998 | Berg et al. |
| 5,779,549 | A | 7/1998 | Walker et al. |
| 5,797,795 | A | 8/1998 | Takemoto et al. |
| 5,800,269 | A | 9/1998 | Holch et al. |
| 5,819,107 | A | 10/1998 | Lichtman et al. |
| 5,820,459 | A | 10/1998 | Acres et al. |
| 5,828,843 | A | 10/1998 | Grimm et al. |
| 5,833,540 | A | 11/1998 | Miodunski et al. |
| 5,836,817 | A | 11/1998 | Acres et al. |
| 5,845,077 | A | 12/1998 | Fawcett |
| 5,845,090 | A | 12/1998 | Collins et al. |
| 5,845,902 | A | 12/1998 | Takemoto |
| 5,848,064 | A | 12/1998 | Cowan |
| 5,851,149 | A | 12/1998 | Xidos et al. |
| 5,855,515 | A | 1/1999 | Pease et al. |
| 5,870,723 | A | 2/1999 | Pare, Jr. et al. |
| 5,871,400 | A | 2/1999 | Yfantis |
| 5,876,284 | A | 3/1999 | Acres et al. |
| 5,885,158 | A | 3/1999 | Torango et al. |
| 5,896,566 | A | 4/1999 | Averbuch et al. |
| 5,902,983 | A | 5/1999 | Crevelt et al. |
| 5,905,523 | A | 5/1999 | Woodfield et al. |
| 5,925,127 | A | 7/1999 | Ahmad |
| 5,935,000 | A | 8/1999 | Sanchez, III et al. |
| 5,941,771 | A | 8/1999 | Haste, III |
| 5,943,241 | A | 8/1999 | Nichols et al. |
| 5,949,042 | A | 9/1999 | Dietz, II et al. |
| 5,970,143 | A | 10/1999 | Schneier |
| 5,971,855 | A | 10/1999 | Ng |
| 5,980,384 | A | 11/1999 | Barrie |
| 5,980,385 | A | 11/1999 | Clapper, Jr. |
| 5,987,376 | A | 11/1999 | Olson et al. |
| 5,999,808 | A | 12/1999 | LaDue et al. |
| 6,001,016 | A | 12/1999 | Walker et al. |
| 6,002,772 | A | 12/1999 | Saito |
| 6,003,013 | A | 12/1999 | Boushy et al. |
| 6,006,034 | A | 12/1999 | Heath et al. |
| 6,009,458 | A | 12/1999 | Hawkins et al. |
| 6,029,046 | A | 2/2000 | Khan et al. |
| 6,038,666 | A | 3/2000 | Hsu et al. |
| 6,047,128 | A | 4/2000 | Zander |
| 6,047,324 | A | 4/2000 | Ford |
| 6,048,269 | A | 4/2000 | Burns et al. |
| 6,052,512 | A | 4/2000 | Peterson et al. |
| 6,071,190 | A | 6/2000 | Weiss et al. |
| 6,098,837 | A | 8/2000 | Izawa et al. |
| 6,099,408 | A | 8/2000 | Schneier et al. |
| 6,104,815 | A | 8/2000 | Alcorn et al. |
| 6,106,396 | A | 8/2000 | Alcorn et al. |
| 6,113,098 | A | 9/2000 | Adams |
| 6,113,492 | A | 9/2000 | Walker et al. |
| 6,113,495 | A | 9/2000 | Walker et al. |
| 6,125,185 | A | 9/2000 | Boesch |
| 6,135,884 | A | 10/2000 | Hedrick et al. |
| 6,135,887 | A | 10/2000 | Pease et al. |
| 6,146,277 | A | 11/2000 | Ikeda |
| 6,149,522 | A | 11/2000 | Alcorn et al. |
| 6,154,878 | A | 11/2000 | Saboff |
| 6,159,098 | A | 12/2000 | Slomiany et al. |
| 6,165,072 | A | 12/2000 | Davis et al. |
| 6,169,976 | B1 | 1/2001 | Colosso |
| 6,178,510 | B1 | 1/2001 | O'Connor et al. |
| 6,183,362 | B1 | 2/2001 | Boushy |
| 6,190,256 | B1 | 2/2001 | Walker et al. |
| 6,193,152 | B1 | 2/2001 | Fernando et al. |
| 6,193,608 | B1 | 2/2001 | Walker et al. |
| 6,199,107 | B1 | 3/2001 | Dujari |
| 6,219,836 | B1 | 4/2001 | Wells et al. |
| 6,253,374 | B1 | 6/2001 | Dresevic et al. |
| 6,254,483 | B1 | 7/2001 | Acres |
| 6,264,561 | B1 | 7/2001 | Saffari et al. |
| 6,280,328 | B1 | 8/2001 | Holch et al. |
| 6,285,868 | B1 | 9/2001 | LaDue |
| 6,285,886 | B1 | 9/2001 | Kamel et al. |
| 6,293,865 | B1 | 9/2001 | Kelly et al. |
| 6,302,793 | B1 | 10/2001 | Fertitta, III et al. |
| 6,306,035 | B1 | 10/2001 | Kelly et al. |
| 6,310,873 | B1 | 10/2001 | Rainis et al. |
| 6,315,663 | B1 | 11/2001 | Sakamoto |
| 6,317,827 | B1 | 11/2001 | Cooper |
| 6,328,648 | B1 | 12/2001 | Walker et al. |
| 6,340,331 | B1 | 1/2002 | Saunders et al. |
| 6,343,990 | B1 | 2/2002 | Rasmussen et al. |
| 6,347,996 | B1 | 2/2002 | Gilmore et al. |
| 6,351,688 | B1 | 2/2002 | Nichols et al. |
| 6,364,769 | B1 | 4/2002 | Weiss et al. |
| 6,368,216 | B1 | 4/2002 | Hedrick et al. |
| 6,368,219 | B1 | 4/2002 | Szrek et al. |
| 6,371,852 | B1 | 4/2002 | Acres |
| 6,402,618 | B1 | 6/2002 | Reed et al. |
| 6,409,602 | B1 | 6/2002 | Wiltshire et al. |
| 6,446,257 | B1 | 9/2002 | Pradhan et al. |
| 6,449,687 | B1 | 9/2002 | Moriya |
| 6,453,319 | B1 | 9/2002 | Mattis et al. |
| 6,454,648 | B1 | 9/2002 | Kelly et al. |
| 6,488,585 | B1 | 12/2002 | Wells et al. |
| 6,508,709 | B1 | 1/2003 | Karmarkar |
| 6,508,710 | B1 | 1/2003 | Paravia et al. |
| 6,554,705 | B1 | 4/2003 | Cumbers |
| 6,575,829 | B2 | 6/2003 | Coleman et al. |

(56) References Cited

U.S. PATENT DOCUMENTS

| | | | |
|---|---|---|---|
| 6,607,439 B2 | 8/2003 | Schneier et al. | |
| 6,625,661 B1 | 9/2003 | Baldwin | |
| 6,638,170 B1 | 10/2003 | Crumby | |
| 6,645,077 B2 | 11/2003 | Rowe | |
| 6,645,078 B1 | 11/2003 | Mattice | |
| 6,652,378 B2 | 11/2003 | Cannon et al. | |
| 6,656,040 B1 | 12/2003 | Brosnan et al. | |
| 6,666,765 B2 | 12/2003 | Vancura | |
| 6,682,423 B2 | 1/2004 | Brosnan et al. | |
| 6,684,195 B1 | 1/2004 | Deaton et al. | |
| 6,739,973 B1 | 5/2004 | Lucchesi et al. | |
| 6,745,236 B1 | 6/2004 | Hawkins et al. | |
| 6,749,502 B2 | 6/2004 | Baerlocher | |
| 6,749,510 B2 | 6/2004 | Giobbi | |
| 6,785,291 B1 | 8/2004 | Cao et al. | |
| 6,805,634 B1 | 10/2004 | Wells et al. | |
| 6,853,973 B2 | 2/2005 | Mathews et al. | |
| 6,866,586 B2 | 3/2005 | Oberberger et al. | |
| 6,875,110 B1 | 4/2005 | Crumby | |
| 6,896,618 B2 | 5/2005 | Benoy et al. | |
| 6,908,387 B2 | 6/2005 | Hedrick et al. | |
| 6,910,079 B2 | 6/2005 | Zimmermann et al. | |
| 6,913,531 B1 | 7/2005 | Yoseloff | |
| 6,935,946 B2 | 8/2005 | Yoseloff et al. | |
| 6,962,530 B2 | 11/2005 | Jackson | |
| 6,988,267 B2 | 1/2006 | Harris et al. | |
| 6,997,803 B2 | 2/2006 | LeMay et al. | |
| 7,127,069 B2 | 10/2006 | Nguyen | |
| 7,168,089 B2 | 1/2007 | Nguyen et al. | |
| 7,318,775 B2 | 1/2008 | Brosnan et al. | |
| 7,399,229 B2 | 7/2008 | Rowe | |
| 7,438,643 B2 | 10/2008 | Brosnan et al. | |
| 7,455,591 B2 | 11/2008 | Nguyen | |
| 7,470,182 B2 | 12/2008 | Martinek et al. | |
| 7,480,857 B2 | 1/2009 | Benbrahim et al. | |
| 7,515,718 B2 | 4/2009 | Nguyen et al. | |
| 7,618,317 B2 | 11/2009 | Jackson | |
| 7,636,859 B2 | 12/2009 | Little et al. | |
| 7,780,526 B2 | 8/2010 | Nguyen et al. | |
| 7,785,204 B2 | 8/2010 | Wells et al. | |
| 7,801,303 B2 | 9/2010 | Dulac | |
| 7,828,654 B2 | 11/2010 | Carter | |
| 7,887,420 B2 | 2/2011 | Nguyen et al. | |
| 7,951,002 B1 | 5/2011 | Brosnan | |
| 7,972,214 B2 | 7/2011 | Kinsley et al. | |
| 7,988,559 B2 * | 8/2011 | Yoseloff et al. | 463/42 |
| 8,057,298 B2 | 11/2011 | Nguyen et al. | |
| 2001/0021666 A1 | 9/2001 | Yoshida et al. | |
| 2001/0031663 A1 | 10/2001 | Johnson | |
| 2001/0036854 A1 | 11/2001 | Okuniewicz | |
| 2001/0036855 A1 | 11/2001 | DeFrees-Parrott et al. | |
| 2001/0039210 A1 | 11/2001 | St-Denis | |
| 2001/0044337 A1 | 11/2001 | Rowe et al. | |
| 2001/0044339 A1 | 11/2001 | Cordero et al. | |
| 2001/0053712 A1 | 12/2001 | Yoseloff et al. | |
| 2002/0002075 A1 | 1/2002 | Rowe | |
| 2002/0016202 A1 | 2/2002 | Fertitta et al. | |
| 2002/0022516 A1 | 2/2002 | Forden | |
| 2002/0028706 A1 | 3/2002 | Barnard et al. | |
| 2002/0034980 A1 | 3/2002 | Lemmons et al. | |
| 2002/0045477 A1 | 4/2002 | Dabrowski | |
| 2002/0049909 A1 | 4/2002 | Jackson et al. | |
| 2002/0050683 A1 | 5/2002 | Hirota | |
| 2002/0071557 A1 | 6/2002 | Nguyen | |
| 2002/0093136 A1 | 7/2002 | Moody | |
| 2002/0107065 A1 | 8/2002 | Rowe | |
| 2002/0111205 A1 | 8/2002 | Beavers | |
| 2002/0116615 A1 | 8/2002 | Nguyen et al. | |
| 2002/0132662 A1 | 9/2002 | Sharp et al. | |
| 2002/0137217 A1 | 9/2002 | Rowe | |
| 2002/0142844 A1 | 10/2002 | Kerr | |
| 2002/0151359 A1 | 10/2002 | Rowe | |
| 2002/0155887 A1 | 10/2002 | Criss-Puszkiewicz et al. | |
| 2003/0009542 A1 | 1/2003 | Kasal et al. | |
| 2003/0032485 A1 | 2/2003 | Cockerille | |
| 2003/0036425 A1 | 2/2003 | Kaminkow et al. | |
| 2003/0045356 A1 | 3/2003 | Thomas | |
| 2003/0054878 A1 | 3/2003 | Benoy et al. | |
| 2003/0064771 A1 | 4/2003 | Morrow et al. | |
| 2003/0064805 A1 | 4/2003 | Wells | |
| 2003/0069074 A1 | 4/2003 | Jackson | |
| 2003/0074323 A1 | 4/2003 | Catan | |
| 2003/0095791 A1 | 5/2003 | Barton et al. | |
| 2003/0100371 A1 | 5/2003 | Gatto et al. | |
| 2003/0157979 A1 | 8/2003 | Cannon et al. | |
| 2003/0176213 A1 | 9/2003 | LeMay et al. | |
| 2003/0186734 A1 | 10/2003 | LeMay et al. | |
| 2003/0187853 A1 | 10/2003 | Hensley et al. | |
| 2003/0188306 A1 | 10/2003 | Harris et al. | |
| 2004/0002385 A1 | 1/2004 | Nguyen | |
| 2004/0048671 A1 | 3/2004 | Rowe | |
| 2004/0067794 A1 | 4/2004 | Coetzee | |
| 2004/0092310 A1 | 5/2004 | Brosnan et al. | |
| 2004/0137978 A1 | 7/2004 | Cole et al. | |
| 2004/0147314 A1 | 7/2004 | LeMay et al. | |
| 2004/0152517 A1 | 8/2004 | Hardisty et al. | |
| 2004/0166931 A1 | 8/2004 | Criss-Puszkiewicz et al. | |
| 2004/0180722 A1 | 9/2004 | Giobbi | |
| 2004/0242321 A1 | 12/2004 | Overton | |
| 2004/0242322 A1 | 12/2004 | Montagna et al. | |
| 2004/0248651 A1 | 12/2004 | Gagner | |
| 2004/0259640 A1 | 12/2004 | Gentles et al. | |
| 2005/0043086 A1 | 2/2005 | Schneider | |
| 2005/0054446 A1 | 3/2005 | Kammler et al. | |
| 2005/0059470 A1 | 3/2005 | Cannon | |
| 2005/0065802 A1 | 3/2005 | Rui et al. | |
| 2005/0108519 A1 | 5/2005 | Barton et al. | |
| 2005/0108769 A1 | 5/2005 | Arnold et al. | |
| 2005/0113172 A1 | 5/2005 | Gong | |
| 2005/0120040 A1 | 6/2005 | Williams et al. | |
| 2005/0137016 A1 | 6/2005 | Enzminger et al. | |
| 2005/0153778 A1 | 7/2005 | Nelson et al. | |
| 2005/0192099 A1 | 9/2005 | Nguyen et al. | |
| 2005/0216942 A1 | 9/2005 | Barton | |
| 2005/0221898 A1 | 10/2005 | Gatto et al. | |
| 2005/0272501 A1 | 12/2005 | Tran et al. | |
| 2005/0288080 A1 | 12/2005 | Lockton et al. | |
| 2006/0009273 A2 | 1/2006 | Moshal | |
| 2006/0019749 A1 | 1/2006 | Merati et al. | |
| 2006/0035713 A1 | 2/2006 | Cockerille et al. | |
| 2006/0046855 A1 | 3/2006 | Nguyen et al. | |
| 2006/0068871 A1 | 3/2006 | Crawford, III et al. | |
| 2006/0073869 A1 | 4/2006 | LeMay et al. | |
| 2006/0160621 A1 | 7/2006 | Rowe et al. | |
| 2006/0247028 A1 | 11/2006 | Brosnan et al. | |
| 2006/0258428 A1 | 11/2006 | Blackburn et al. | |
| 2006/0264256 A1 | 11/2006 | Gagner et al. | |
| 2006/0281541 A1 | 12/2006 | Nguyen et al. | |
| 2007/0004506 A1 | 1/2007 | Kinsley et al. | |
| 2007/0026935 A1 | 2/2007 | Wolf et al. | |
| 2007/0032301 A1 | 2/2007 | Acres et al. | |
| 2007/0060361 A1 | 3/2007 | Nguyen et al. | |
| 2007/0060363 A1 | 3/2007 | Nguyen et al. | |
| 2007/0178970 A1 | 8/2007 | LeMay et al. | |
| 2007/0207852 A1 | 9/2007 | Nelson et al. | |
| 2007/0270213 A1 | 11/2007 | Nguyen et al. | |
| 2008/0004107 A1 | 1/2008 | Nguyen et al. | |
| 2008/0090654 A1 | 4/2008 | Okada | |
| 2008/0192058 A1 | 8/2008 | Liu et al. | |
| 2009/0209332 A1 | 8/2009 | Soukup et al. | |
| 2010/0099491 A1 | 4/2010 | Little et al. | |
| 2011/0105234 A1 | 5/2011 | Nguyen et al. | |
| 2011/0218038 A1 | 9/2011 | Kinsley et al. | |

FOREIGN PATENT DOCUMENTS

| | | |
|---|---|---|
| DE | 197 30 002 A1 | 12/1997 |
| EP | 0599769 | 6/1994 |
| EP | 0 689 325 | 6/1995 |
| EP | 0 706 275 | 4/1996 |
| EP | 0 715 245 | 6/1996 |
| EP | 0 744 786 | 11/1996 |
| EP | 0 769 769 | 4/1997 |
| EP | 0 841 615 | 5/1998 |

(56) References Cited

FOREIGN PATENT DOCUMENTS

| | | |
|---|---|---|
| EP | 0 905 614 | 3/1999 |
| EP | 1 004 970 | 5/2000 |
| EP | 1 061 430 | 12/2000 |
| EP | 1 074 955 | 2/2001 |
| EP | 1 199 690 | 4/2002 |
| EP | 1 231 577 | 8/2002 |
| EP | 1 255 234 | 11/2002 |
| EP | 1 291 048 | 3/2003 |
| EP | 1 396 829 | 3/2004 |
| EP | 1 473 682 | 11/2004 |
| EP | 1 895 483 | 3/2008 |
| EP | 1 920 415 B1 | 11/2009 |
| GB | 2 151 054 | 7/1985 |
| GB | 2 251 112 | 6/1992 |
| GB | 2 392 276 | 10/2004 |
| JP | 10-277243 | 10/1998 |
| JP | 2002-197332 | 7/2002 |
| RU | 2124230 | 12/1998 |
| RU | 17678 U1 | 4/2001 |
| WO | WO 95/24689 | 9/1995 |
| WO | WO 96/00950 | 1/1996 |
| WO | WO 97/30549 | 8/1997 |
| WO | WO 98/40141 | 9/1998 |
| WO | WO 99/00164 | 1/1999 |
| WO | WO 99/01188 | 1/1999 |
| WO | WO 00/67424 | 11/2000 |
| WO | WO 01/20424 | 3/2001 |
| WO | WO 02/05229 | 1/2002 |
| WO | WO 02/21468 | 3/2002 |
| WO | WO 02/073501 | 9/2002 |
| WO | WO 02/077935 | 10/2002 |
| WO | WO 03/019486 | 6/2003 |
| WO | WO 2004/021290 | 3/2004 |
| WO | WO 2004/071601 | 8/2004 |
| WO | WO 2007/032888 | 3/2007 |
| WO | WO 2007/044175 | 4/2007 |
| WO | WO 2008/005264 | 1/2008 |
| WO | WO 2008/016610 | 2/2008 |
| WO | WO 2010/045004 | 4/2010 |

OTHER PUBLICATIONS

Australian Office Action dated Jul. 28, 2011 issued in 2007281499.
U.S. Office Action dated Jul. 15, 2002 issued in U.S. Appl. No. 09/595,798.
U.S. Final Office Action dated Mar. 20, 2003 issued in U.S. Appl. No. 09/595,798.
U.S. Advisory Action dated May 21, 2003 issued in U.S. Appl. No. 09/595,798.
U.S. Office Action dated Jul. 1, 2003 issued in U.S. Appl. No. 09/595,798.
U.S. Office Action dated Jan. 14, 2004 issued in U.S. Appl. No. 09/595,798.
U.S. Interview Summary dated Mar. 16, 2004 issued in U.S. Appl. No. 09/595,798.
U.S. Final Office Action dated Jun. 3, 2004 issued in U.S. Appl. No. 09/595,798.
U.S. Office Action dated Jan. 28, 2005 issued in U.S. Appl. No. 09/595,798.
U.S. Office Action dated Apr. 8, 2005 issued in U.S. Appl. No. 09/595,798.
U.S. Final Office Action dated May 3, 2006 issued in U.S. Appl. No. 09/595,798.
U.S. Examiner Interview Summary dated Jul. 10, 2006 issued in U.S. Appl. No. 09/595,798.
U.S. Office Action dated Sep. 6, 2006 issued in U.S. Appl. No. 09/595,798.
U.S. Final Office Action dated Mar. 14, 2007 issued in U.S. Appl. No. 09/595,798.
U.S. Decision Pre-Appeal dated Sep. 14, 2007 issued in U.S. Appl. No. 09/595,798.
U.S. Notice of Abandonment dated Mar. 5, 2008 issued in U.S. Appl. No. 09/595,798.
U.S. Notice of Petition Granted re Notice of Abandonment Vacated dated Jun. 24, 2009 issued in U.S. Appl. No. 09/595,798.
U.S. Office Action dated Sep. 16, 2009 issued in U.S. Appl. No. 09/595,798.
U.S. Interview Summary dated Jan. 13, 2010 issued in U.S. Appl. No. 09/595,798.
U.S. Notice of Allowance and Allowability dated May 14, 2010 issued in U.S. Appl. No. 09/595,798.
U.S. Notice of Allowance and Allowability dated Sep. 20, 2010 issued in U.S. Appl. No. 09/595,798.
U.S. Notice of Allowance dated Jan. 7, 2011 issued in U.S. Appl. No. 09/595,798.
U.S. Office Action dated Jul. 1, 2002 issued in U.S. Appl. No. 09/642,192.
U.S. Interview Summary dated Oct. 9, 2002 issued in U.S. Appl. No. 09/642,192.
U.S. Final Office Action dated Jan. 2, 2003 issued in U.S. Appl. No. 09/642,192.
U.S. Interview Summary dated Jan. 14, 2003 issued in U.S. Appl. No. 09/642,192.
U.S. Advisory Action dated Jan. 29, 2003 issued in U.S. Appl. No. 09/642,192.
U.S. Office Action dated Apr. 21, 2003 issued in U.S. Appl. No. 09/642,192.
U.S. Final Office Action dated Sep. 30, 2003 issued in U.S. Appl. No. 09/642,192.
U.S. Interview Summary dated Oct. 22, 2003 issued in U.S. Appl. No. 09/642,192.
U.S. Advisory Action dated Nov. 6, 2003 issued in U.S. Appl. No. 09/642,192.
U.S. Office Action dated Feb. 10, 2004 issued in U.S. Appl. No. 09/642,192.
U.S. Office Action dated Jul. 1, 2004 issued in U.S. Appl. No. 09/642,192.
U.S. Interview Summary dated Mar. 14, 2004 issued in U.S. Appl. No. 09/642,192.
U.S. Notice of Informal or Non-Responsive RCE Amendment dated Jan. 11, 2006 issued in U.S. Appl. No. 09/642,192.
U.S. Final Office Action dated Mar. 28, 2006 issued in U.S. Appl. No. 09/642,192.
U.S. Office Action dated Nov. 20, 2006 issued in U.S. Appl. No. 09/642,192.
U.S. Office Action dated Jan. 20, 2010 issued in U.S. Appl. No. 11/731,406.
U.S. Final Office Action dated Jul. 2, 2010 issued in U.S. Appl. No. 11/731,406.
U.S. Office Action dated Jan. 19, 2011 issued in U.S. Appl. No. 11/731,406.
U.S. Office Action dated Jun. 14, 2011 issued in U.S. Appl. No. 11/731,406.
U.S. Examiner Interview Summary dated Sep. 1, 2011 issued in U.S. Appl. No. 11/731,406.
U.S. Office Action dated May 18, 2004 issued in U.S. Appl. No. 10/097,507.
U.S. Final Office Action dated May 17, 2005 issued in U.S. Appl. No. 10/097,507.
U.S. Notice of Allowance dated Aug. 31, 2005 issued in U.S. Appl. No. 10/097,507.
U.S. Office Action dated Dec. 24, 2009 issued in U.S. Appl. No. 11/285,898.
U.S. Final Office Action dated May 26, 2010 issued in U.S. Appl. No. 11/285,898.
U.S. Office Action dated Oct. 5, 2011 issued in U.S. Appl. No. 11/285,898.
U.S. Examiner Interview Summary dated Dec. 12, 2011 issued in U.S. Appl. No. 11/285,898.
U.S. Office Action dated Mar. 8, 2010 issued in U.S. Appl. No. 11/497,740.
U.S. Office Action Final dated Aug. 12, 2010 issued in U.S. Appl. No. 11/497,740.
U.S. Examiner Interview Summary dated Dec. 16, 2010 issued in U.S. Appl. No. 11/497,740.

(56) References Cited

OTHER PUBLICATIONS

U.S. Office Action dated Jul. 22, 2011 issued in U.S. Appl. No. 11/497,740.
U.S. Examiner Interview Summary dated Sep. 26, 2011 issued in U.S. Appl. No. 11/497,740.
U.S. Final Office Action dated Dec. 12, 2011 issued in U.S. Appl. No. 11/497,740.
U.S. Office Action dated Jan. 7, 2010 issued in U.S. Appl. No. 11/881,190.
U.S. Final Office Action dated Jun. 11, 2010 issued in U.S. Appl. No. 11/881,190.
U.S. Office Action dated Nov. 24, 2010 issued in U.S. Appl. No. 11/881,190.
U.S. Examiner Interview Summary dated Feb. 15, 2011 issued in U.S. Appl. No. 11/881,190.
U.S. Notice of Allowance dated Jun. 23, 2011 issued in U.S. Appl. No. 11/881,190.
U.S. Notice of Allowance dated Sep. 9, 2011 issued in U.S. Appl. No. 11/881,190.
U.S. Office Action dated Apr. 4, 2006 issued in U.S. Appl. No. 10/230,604.
U.S. Final Office Action dated Oct. 12, 2006 issued in U.S. Appl. No. 10/230,604.
U.S. Advisory Action dated Jan. 31, 2007 issued in U.S. Appl. No. 10/230,604.
U.S. Notice of Panel Decision from Pre-Appeal Brief Review dated Jun. 19, 2007 issued in U.S. Appl. No. 10/230,604.
U.S. Office Action dated Mar. 18, 2008 issued in U.S. Appl. No. 10/230,604.
U.S. Final Office Action dated Aug. 18, 2008 issued in U.S. Appl. No. 10/230,604.
U.S. Office Action dated May 13, 2008 issued in U.S. Appl. No. 11/173,442.
U.S. Final Office Action dated Nov. 4, 2008 issued in U.S. Appl. No. 11/173,442.
U.S. Office Action dated Apr. 30, 2009 issued in U.S. Appl. No. 11/173,442.
U.S. Final Office Action dated Dec. 21, 2009 issued in U.S. Appl. No. 11/173,442.
U.S. Office Action dated Jul. 7, 2010 issued in U.S. Appl. No. 11/173,442.
U.S. Examiner Interview Summary dated Sep. 21, 2010 issued in U.S. Appl. No. 11/173,442.
U.S. Office Action dated Dec. 8, 2010 issued in U.S. Appl. No. 11/173,442.
U.S. Examiner Interview Summary dated Mar. 23, 2011 issued in U.S. Appl. No. 11/173,442.
U.S. Notice of Allowance dated Apr. 14, 2011 issued in U.S. Appl. No. 11/173,442.
U.S. Office Action dated Oct. 6, 2008 issued in U.S. Appl. No. 11/224,814.
U.S. Office Action dated Aug. 3, 2009 issued in U.S. Appl. No. 11/224,814.
U.S. Final Office Action dated Feb. 25, 2010 issued in U.S. Appl. No. 11/224,814.
U.S. Advisory Action dated May 18, 2010 issued in U.S. Appl. No. 11/224,814.
U.S. Notice of Allowance dated Oct. 7, 2010 issued in U.S. Appl. No. 11/224,814.
U.S. Response to 312 Amendment dated Nov. 26, 2010 issued in U.S. Appl. No. 11/224,814.
Nguyen, et al. "Distributed Game Services," U.S. Appl. No. 11/225.337, filed Sep. 12, 2005.
U.S. Office Action dated Jul. 27, 2009 issued in U.S. Appl. No. 11/225,337.
U.S. Final Office Action dated Feb. 1, 2010 issued in U.S. Appl. No. 11/225,337.
U.S. Advisory Action dated Apr. 12, 2010 issued in U.S. Appl. No. 11/225,337.
U.S. Office Action dated Jul. 19, 2010 issued in U.S. Appl. No. 11/225,337.
U.S. Examiner Interview Summary dated Oct. 14, 2010 issued in U.S. Appl. No. 11/225,337.
U.S. Final Office Action dated Jan. 5, 2011 issued in U.S. Appl. No. 11/225,337.
U.S. Office Action dated Jul. 5, 2011 issued in U.S. Appl. No. 11/223,337.
U.S. Examiner Interview Summary dated Nov. 16, 2011 issued in U.S. Appl. No. 11/225,337.
U.S. Notice of Allowance dated Dec. 21, 2011 issued in U.S. Appl. No. 11/225,337.
U.S. Office Action dated Nov. 25, 2011 issued in U.S. Appl. No. 12/253,525.
US Office Action dated Apr. 14, 2010 issued in U.S. Appl. No. 11/480,713.
US Final Office Action dated Sep. 2, 2010 issued in U.S. Appl. No. 11/480,713.
Australian Examiner's First Report dated Dec. 1, 2005 issued in AU2001283264.
Canadian Office Action dated Aug. 5, 2010 issued in CA 2,420,224.
Canadian Office Action dated Jun. 13, 2011 issued in CA 2,420,224.
Australian First Examination Report dated May 22, 2008 issued in AU2003200934.
Australian Examiner's First Report dated Jan. 31, 2011 issued in AU2009217419.
Canadian Office Action dated Jan. 21, 2011 issued in CA 2,421,541.
PCT International Search Report dated Nov. 13, 2003 issued in PCT/US2003/22180.
Australian Examiner's First Report dated Jun. 28, 2006 issued in AU2003251941.
Australian Examiner's Report No. 2 dated Aug. 8, 2006 issued in AU2003251941.
Australian Examiner's Report No. 3 dated Aug. 2, 2007 issued in AU2003251941.
Australian Examiner's First Report dated Aug. 7, 2009 issued in AU2008201281.
European Office Action dated Dec. 28, 2009 issued in EP03791582.4.
Russian Office Action (English translation) dated Apr. 10, 2007 issued in RU2005108664.
PCT International Search Report dated Apr. 7, 2008 issued in PCT/US2007/017121.
PCT Written Opinion dated Apr. 7, 2008, issued in PCT/US2007/017121.
PCT Partial International Search Report dated Jan. 25, 2008 issued in PCT/US2007/017121.
PCT International Preliminary Report on Patentability and Written Opinion dated Feb. 3, 2009 issued in PCT/US2007/017121 (WO2008/016610).
AU Examiner's First Report dated Oct. 22, 2010 issued in 2006266236.
AU Examiner's Second Report dated Sep. 19, 2011 issued in 2006266236.
Australian Examiner's First Report dated Nov. 18, 2010 issued in AU 2006291294.
Australian Examiner's Report No. 2 dated Feb. 14, 2011 issued in AU 2006291294.
PCT International Search Report dated May 7, 2010 issued in PCT/US2009/058664.
PCT International Preliminary Report on Patentability and Written Opinion dated Apr. 19, 2011 issued in PCT/US2009/058664.
International Search Report and Written Opinion dated Feb. 26, 2008 issued in PCT/US2007/014952.
International Preliminary Report on Patentability and Written Opinion dated Jan. 6, 2009 issued in PCT/US2007/014952.
Adamec, Justene, (Sep. 9, 2005) "Checkraise: The Bots", Blogcritics.org News, [downloaded from http://blogcritics.org/archives/2005/09/09/093200.php on Jun. 30, 2006], 3 pages.
Anonymous: "Noble Poker: Security & Integrity", (May 12, 2005) [Retrieved from the Internet: http://web.archive.org/web/20050512081751/http://www.noblepoker.com], XP002465543.

(56) References Cited

OTHER PUBLICATIONS

CS Guard, Dec. 19, 2001, Half-Life www.olo.counter.com, webpage retrieved from the Internet at http://www.olo.counter-strike.pl/index.php?page=archive on Jun. 3, 2010, p. 3 of 5 pages.
Gaming Standards Association (2007), "G2S Basics," webpage retrieved from Internet at http://www.gamingstandards.com/pdfs/G2S_Sheet_final.pdf, on Sep. 5, 2008, 2 pages.
Gaming Standards Association (2007) (author unknown), "S2S Message Protocol v1.2 with Errata Sheet 1," Chapter 13, pp. 289-308. [online] retrieved from Internet on Sep. 23, 2008. http://www.gamingstandards.com/index.php?page=standards/free_downloads_standards.
Golle, Philippe et al., "Preventing Bots from Playing Online Games" ACM Computers in Entertainment, [Online] vol. 3, No. 3, Jul. 2005, pp. 1-10, XP002465544 Retrieved from the Internet: http://portal.acm.org/citation.cfm?doid=1077246.1077255.
Hauptmann, Steffen et al. (1996) "On-line Maintenance With On-The-Fly-Software Replacement," 1996 IEEE Proceedings, Third International Conference on Configurable Distributed Systems, No. 0-8 186-7395-8/96, 11 pgs (70-80).
HBP-10 Bill Dispenser, Multi-Country Platform (2001) JCM American, retrieved from the Internet at http://www.jcm-american.com/bill_dispensers.html on Sep. 20, 2001, 1 page.
HBP-5 Note Hopper (2001) JCM American, retrieved from the Internet at http://www.jcm-american.com/sub-note-hoppers.html on Sep. 20, 2001, 1 page.
Hiroaki Higaki, 8 page document entitled "Group Communication Algorithm for Dynamically Updating in Distributed Systems" Copyright 1994 IEEE International Conference on Parallel and Distributed Systems (pp. 56-62) 08-8 186-655-6/94, higaki@sdesun.slab.ntt.jp.
Hiroaki Higaki, 9 page document entitled "Extended Group Communication Algorithm for Updating Distributed Programs" Copyright 1996, IEEE, International Conference on Parallel and Distributed Systems, 0-81 86-7267-6/96, hig@takilab.k.dendai.as.jp.
Oracle8™ Enterprise Edition Partitioning Option (1999), Features Overview Feb. 1999, webpage for Oracle Corporation, retrieved from the Internet at www.oracle.com/collateral/ent_partitioning_fo_pdf, Feb. 1999, 8 pgs.
PcToolsTM Guides, "Manage the CPU Task Priority," www.pctools.com, webpage retrieved from the Internet at http://www.pctools.com/guides/registry/detail.1179, Sep. 16, 2002, 2 pgs.
Spielo Gaming International (2000) webpage advertisements entitled "Visions of Tomorrow" and "PowerStation5" retrieved from the Internet at http://www.spielo.com, dated Dec. 6, 2000, 7 pages.
Webster's 1913 Dictionary, Definition of "Continuous" as shown in Webster's Online Dictionary, retrieved from the Internet at http://www.webster-dictionary.org/definition/continuous on Mar. 2, 2009, 2 pgs.
Webster's 1913 Dictionary, Definition of "Regular" as shown in Webster's Online Dictionary, retrieved from the Internet at http://www.webster-dictionary.org/definition/regular on Mar. 2, 2009, 3 pgs.
Windows 3.1 Resource Kit, Jul. 30, 2001, Microsoft.com, retrieved from the Internet at http://support.microsoft.com/kb/83433 on Feb. 8, 2009 and on Aug. 27, 2010.
U.S. Final Office Action dated Jan. 24, 2012 issued in U.S. Appl. No. 11/731,406.
U.S. Final Office Action dated Jan. 26, 2012 issued in U.S. Appl. No. 11/285,898.
Third Party Submission dated Nov. 8, 2011 for U.S. Appl. No. 13/101,939.
Canadian Office Action dated Jan. 31, 2012 issued in CA 2,421,541.
Australian Examiner's report No. 2 dated Jan. 5, 2012 issued in 2007281499.
U.S. Appl. No. 09/642,192, filed Aug. 18, 2000, LeMay et al.
U.S. Allowed Claims dated Jun. 19, 2012 for U.S. Appl. No. 11/225,337.
U.S. Notice of Allowance dated Jun. 19, 2012 issued in U.S. Appl. No. 11/225,337.
European Office Action dated Jan. 14, 2011 issued in EP 01 946 053.4-1238.
Australian Examiner's report No. 3 dated Mar. 27, 2012 issued in 2007281499.
Chinese Office Action dated Jul. 31, 2009 issued in CN200780036010.9.
Chinese First Office Action dated Nov. 25, 2010 issued in CN200780036010.9.
Chinese Second Office Action dated Jun. 16, 2011 issued in CN200780036010.9.
EP Office Action dated May 8, 2012 issued in EP 09 793 079.6-2221.
"1,001 Windows 95 Tips, Operating System Shortcuts" (1995) Synapse Adaptive.com, Access and Productivity Tools, webpage retrieved from the Internet at http://www.synapseadaptive.com/tools/Win95%20keyboard%20shortcuts.html, on Dec. 8, 2009, 5 pages.
Wang et al., "Casino technology player tracking and slot accounting systems," Database Inspec [Online] *The Institution of Electrical Engineers*, Stevenage, GB; Database accession No. 7228747; XP002231402; abstract, 1 page.
Office action regarding Canadian Application No. 2,795,419, dated Jun. 27, 2013, 2 pages.

* cited by examiner

VIRTUAL PLAYER TRACKING AND RELATED SERVICES

CROSS-REFERENCE TO RELATED APPLICATIONS

This application is a continuation of U.S. patent application Ser. No. 11/881,190, entitled "VIRTUAL PLAYER TRACKING AND RELATED SERVICES" and filed on Jul. 25, 2007, which is a continuation of U.S. patent application Ser. No. 11/497,740, entitled "VIRTUAL PLAYER TRACKING AND RELATED SERVICES" and filed on Aug. 1, 2006, which is a continuation-in-part of U.S. patent application Ser. No. 11/285,898, by LeMay, et al., entitled "VIRTUAL GAMING PERIPHERALS FOR A GAMING MACHINE" and filed on Nov. 23, 2005, which is a continuation of U.S. patent application Ser. No. 10/097,507, by LeMay, et al., entitled "VIRTUAL GAMING PERIPHERALS FOR A GAMING MACHINE", filed Mar. 12, 2002, and issued on Feb. 14, 2006 as U.S. Pat. No. 6,997,803, all of which are incorporated herein by reference in their entireties and for all purposes. U.S. patent application Ser. No. 11/497,740 is a continuation-in-part of U.S. patent application Ser. No. 11/480,713, entitled "DETECTING AND PREVENTING BOTS AND CHEATING IN ONLINE GAMING" and filed Jul. 3, 2006, the disclosure of which is incorporated herein by reference in its entirety and for all purposes.

FIELD OF THE INVENTION

The present disclosure relates to gaming devices, methods and networks.

BACKGROUND OF THE INVENTION

Traditionally, wagering games such as slot games, poker games, blackjack games, etc., have been permitted only in certain jurisdictions. In these jurisdictions, such wagering games were only allowed in gaming establishments such as casinos and the like.

However, it has now become very common for such wagering games to be played via the Internet. Such games may be referred to herein as "Internet wagering games" or the like, although the invention is not limited to wagering games and networks other than the Internet may be used to provide such games.

Although Internet wagering games are currently illegal in the United States, they are very popular in many parts of the world. A recent poll of United States citizens determined that approximately 67% believed that the United States government should allow entities based in the United States to legally provide Internet wagering games. It seems likely that Internet wagering games will eventually become legal in more parts of the world, including at least some jurisdictions of the United States.

For a gaming establishment, it can be important to determine the game playing habits of individual game players. When the game playing habits of an individual player are known, the gaming establishment may provide incentives corresponding to the game playing habits of the individual game player to encourage additional game play. For example, the gaming establishment may provide an individual player with coupons for free meals, free rooms or discounted game play, depending on the player's game playing habits. The game playing habits of individual game players are typically determined by monitoring game usage on a gaming machine using a player tracking device of a gaming machine.

Just as gaming establishments use player tracking systems to obtain information about game play in the gaming establishments, it would be very useful for online game providers to obtain such information regarding players of Internet wagering games. However, current player tracking systems are not configured for use outside of a gaming establishment. Even if systems were developed for use outside of a gaming establishment, it would probably be quite expensive to equip each player's host device with a player tracking apparatus. Moreover, a player can use a variety of different host devices for playing Internet wagering games, such as a personal computer ("PC"), a cellular telephone, a personal digital assistant ("PDA"), etc. It seems unlikely that either the players or the game providers would want to bear the financial burden of providing such equipment for all of the host devices a player may wish to use for playing Internet wagering games. Accordingly, it would be very desirable to develop new player tracking methods and devices for wagering games conducted via the Internet or other networks.

SUMMARY OF THE INVENTION

Some aspects of the invention provide one or more different services, including but not limited to security functions, harm minimization functions, player identification functions, player tracking functions, bonusing/progressive game functions, accounting functions, financial/banking operations, network tunneling, cheating detection, etc. Some such implementations may be thought of as involving an agent that "follows" a player from host device to host device, but in reality each device executes separate software. Such software may be referred to herein as "software agents" or the like. Because the host devices used for gaming may be different, the software agents may be configured for different platforms and/or operating systems.

For example, some implementations of the present invention provide software-based player tracking that can extend to multiple devices used by a player for gaming. Whether the player plays games on a gaming machine, a PC, a PDA, a cell phone or another host device, the player can accumulate points in a player tracking program: points based on game play on all such devices can be tracked.

Some implementations of the invention provide a gaming method that includes the following steps: obtaining first gaming information regarding a first player's Internet wagering games on a first device; obtaining second gaming information regarding the first player's wagering games on a second device; combining at least some components of the first gaming information and the second gaming information; and crediting a player tracking account of the first player based on a combination of at least some components of the first gaming information and the second gaming information.

The method may include the step of installing first tracking software on the first device, wherein the first tracking software obtains the first gaming information. The first tracking software may comprise a player tracking software agent.

The second device may or may not be disposed within a gaming machine of a gaming establishment. The second device may be a wired device or a wireless device. In some implementations, the first device and the second device are in locations other than gaming establishments.

The gaming method may include the step of determining a first playing style of the first player. The first playing style may be based on at least one of play consistency indicia, reaction time indicia, wagering indicia, length of play indicia, frequency of play indicia, game preference indicia, win frequency indicia, win amount indicia or optimal play indicia of the first player. The gaming method may include the step of determining whether the first device is being played according to the first playing style.

The gaming method may include the step of invoking countermeasures when it is determined that the first device is not being played according to the first playing style. The countermeasures may comprise requiring a proper response to a challenge, disabling the first device and/or sending a message to a game administrator.

Alternative methods are provided by the invention. One such method includes these steps: obtaining first gaming information regarding a first player's wagering games from a first software agent executing on a first host device; obtaining second gaming information regarding the first player's wagering games from a second software agent executing on a second host device; and crediting a player tracking account of the first player based on the first gaming information and the second gaming information.

The method may also involve monitoring a heartbeat from a third software agent. The method may also include the step of initiating countermeasures when an expected heartbeat is not received from the third software agent. The third software agent may also monitor a heartbeat from another device.

The method may involve determining third gaming information regarding a second player's wagering games on a third device. The determining step may be performed, at least in part, by the first software agent executing on the first host device. The method may involve monitoring the third gaming information for indicia of cheating. For example, the monitoring steps may be performed by a software agent on the first device. The method may also involve monitoring the first or second gaming information for indicia of cheating. The monitoring steps may be performed by a third software agent executing on a third device.

A third software agent executing on the first device may obtain at least some of the first gaming information from the first software agent. The third software agent may have a higher or a lower permission level than that of the first software agent. In some such implementations, the third software agent is an advertising software agent configured for targeting advertisements to the first player based, at least in part, on the first gaming information.

The method may provide one or more software agents configured to perform various tasks and/or to provide various services. Such services include, but are not limited to, network access services, accounting services, financial services, auditing services, controller services and/or licensing services.

The present invention provides hardware that is configured to perform the methods of the invention, as well as software to control devices to perform these and other methods. For example, methods of this invention may be represented (at least in part) as program instructions and/or data structures, databases, etc. that can be provided on such computer readable media. These and other features of the present invention will be presented in more detail in the following detailed description of the invention and the associated figures.

DETAILED DESCRIPTION OF THE INVENTION

Figure 1A:
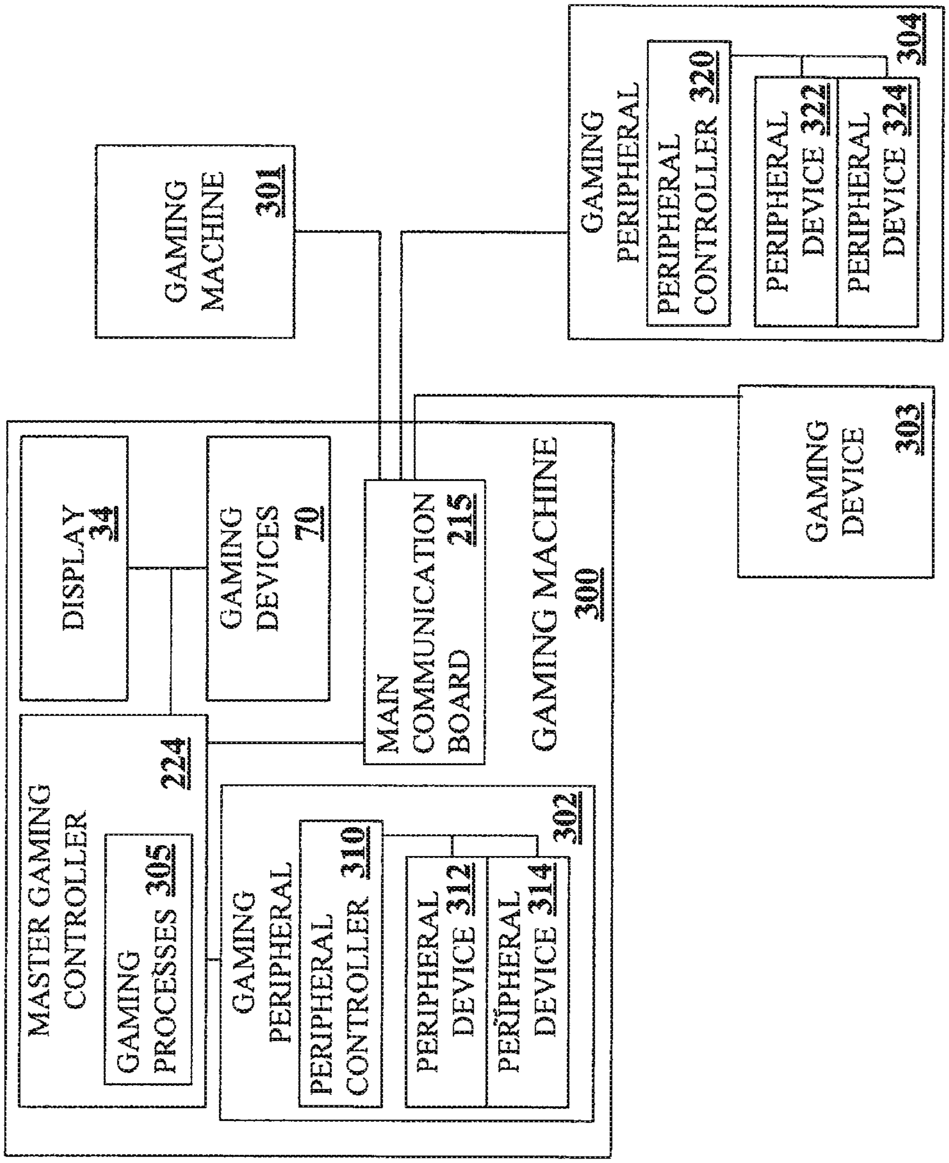
FIG. 1A is a block diagram of a gaming machine connected to a gaming machine, a gaming device and a gaming peripheral.

Concepts important to this invention are "gaming devices," "shared gaming devices," "peripheral devices", "gaming peripherals," "virtual gaming peripherals," "gaming processes," "virtual gaming peripheral processes" and "gaming services." These concepts are initially described with respect to FIG. 1A. Further details of these concepts are described with respect FIGS. 1B-10.

FIG. 1A is a block diagram of a gaming machine 300 connected to a gaming machine 301, a gaming device 303 and a gaming peripheral 304. In the present invention, a virtual gaming peripheral may be used to provide a gaming service at a gaming machine. The virtual gaming peripheral may be comprised of one or more virtual gaming peripheral processes that control one or more gaming devices to provide the gaming service. The virtual gaming peripheral processes are typically software components comprising logic necessary to generate the functions of the virtual gaming peripheral. Preferably, a master gaming controller 224 residing on the gaming machine 300 activates the virtual gaming peripheral processes. In some embodiments, other logic devices such as a peripheral controller 310 or a peripheral controller 320, may be used to activate the virtual gaming peripheral processes.

The master gaming controller 224 or another logic device may activate a plurality of gaming processes 305 including the virtual gaming peripheral processes to perform various gaming functions such as providing a game of chance on the gaming machine or providing various gaming services. In the present invention, gaming processes refer to any software components activated by a logic device such as the master gaming controller 224 or the peripheral controller 310. Thus, the gaming processes are not limited only to gaming processes that provide the game of chance on the gaming machine. For example, player tracking services may be provided on the gaming machine 300. Player tracking services are not required to provide a game of chance on the gaming machine. However, one or more game processes 305, such as virtual gaming peripheral processes, may be activated by the master gaming controller 224 to provide player tracking services. Details of a gaming architecture which may be used to manage gaming processes on a logic device such as master gaming controller 224 are described in co-pending U.S. application Ser. No. 10/040,239, filed on Jan. 3, 2002, by LeMay, et al., and entitled, "Game Development Architecture That Decouples The Game Logic From The Graphics Logic," which is incorporated herein in its entirety and for all purposes.

Gaming services refer to functions provided by the virtual gaming peripherals. Gaming services may be used as part of a play of game of chance on the gaming machine 300 but are not limited to game play. For instance, player tracking services are gaming services that may be provided by a virtual gaming peripheral but are not required to play the game chance or used as part of a game of chance.

Traditionally, gaming devices refer to hardware components, such as coin hoppers, coin acceptors, bill validators and reel assemblies (see FIG. 1B for further details) that are used to play a game of chance on the gaming machine. Traditionally, gaming peripherals are hardware components used with a gaming machine that are used to enhance a game of chance or to play provide a function not directly related to game play. For example, gaming peripheral 304 may be a bonus reel that is activated when certain events occur during game play on gaming machine 300. In this case, the peripheral devices may be a motor 322 that spins the reel and lights 324 that flash. The gaming peripheral 304 may receives commands, "such as spin reels or flash lights," from the master gaming controller 224. These commands may be interpreted by a peripheral controller 320 that drives the peripheral devices. As another example, gaming peripheral 302 may a player tracking unit with the peripheral controller 310 that controls a card reader 312 and a display with touch screen 314. In this case, the gaming peripheral 302 is used to provide player tracking services.

Gaming devices and gaming peripherals may be mounted directly to a gaming machine or located external to the gaming machine. For instance, display 34 and the gaming devices 70 are mounted directly to gaming machine 300 while gaming device 303 is located external to gaming machine 300 but communicates with the gaming machine via a connection to the main communication board 215. Similarly, the gaming peripheral 302 is mounted directly to the gaming machine 300 while the gaming peripheral 304 is located externally to the gaming machine 300 but in communication with the gaming machine via a connection to the main communication board 215.

In the present invention, a gaming device refers to a logical abstraction of one or more hardware components that may be controlled by a virtual gaming peripheral process in a virtual gaming peripheral. A virtual gaming peripheral may control a plurality of gaming devices to provide a game service. Device drivers and device interfaces (see FIGS. 2-4) may be used to provide an interface between the logic abstraction used by the virtual gaming peripheral process and the hardware components. In one embodiment, the gaming device may be a single hardware component, such as a bill validator mounted to the gaming machine 300 or a card reader located on the gaming peripheral 302, and a virtual gaming peripheral process may directly control the gaming device. In another implementation, the gaming device may be a gaming peripheral with a plurality of peripheral devices that is controlled by the virtual gaming peripheral process. In yet another embodiment, the gaming device controlled by the virtual gaming peripheral may be the gaming machine 301 which may include a combination of gaming peripherals with peripheral devices and gaming devices.

The level of logical abstractions used by the virtual gaming peripheral processes may vary. For example, when the gaming device is a hardware component, such as a light panel, the logical abstraction may allow the virtual gaming peripheral process to directly control the functions of the light panel such as flashing individual lights on the panel. In another embodiment, such as when the light panel is located on a gaming peripheral 302, the logical abstraction may be higher such that the virtual gaming peripheral process may send high level commands like "flash lights," to the gaming peripheral 302. The peripheral controller 310 on the gaming peripheral may then interpret the high level command and directly control the light panel. Details of peripheral communication methods that may be used with the present invention are described in U.S. Pat. No. 6,251,014, by Stockdale et al. and titled, "Standard Peripheral Communication," which is incorporated in its entirety and for all purposes.

A plurality of virtual gaming peripheral processes that are used for different virtual gaming peripherals and other gaming processes may be active simultaneously. The virtual gaming peripheral processes and other gaming processes that are simultaneously active may be controlled by a single logic device, such as the master gaming controller 224, or a plurality of logic devices such as the master gaming controller 224, the peripheral controller 310 and the peripheral controller 320. Each active gaming process (virtual gaming processes are one type of gaming process) may control one or more gaming devices. In the present invention, when two or more gaming processes may control the same gaming device, the gaming device is referred to as shared gaming device. For shared gaming devices, the gaming system may have to resolve conflicts that arise when two or more gaming processes desire to control the same gaming device at the same time.

Figure 1B:
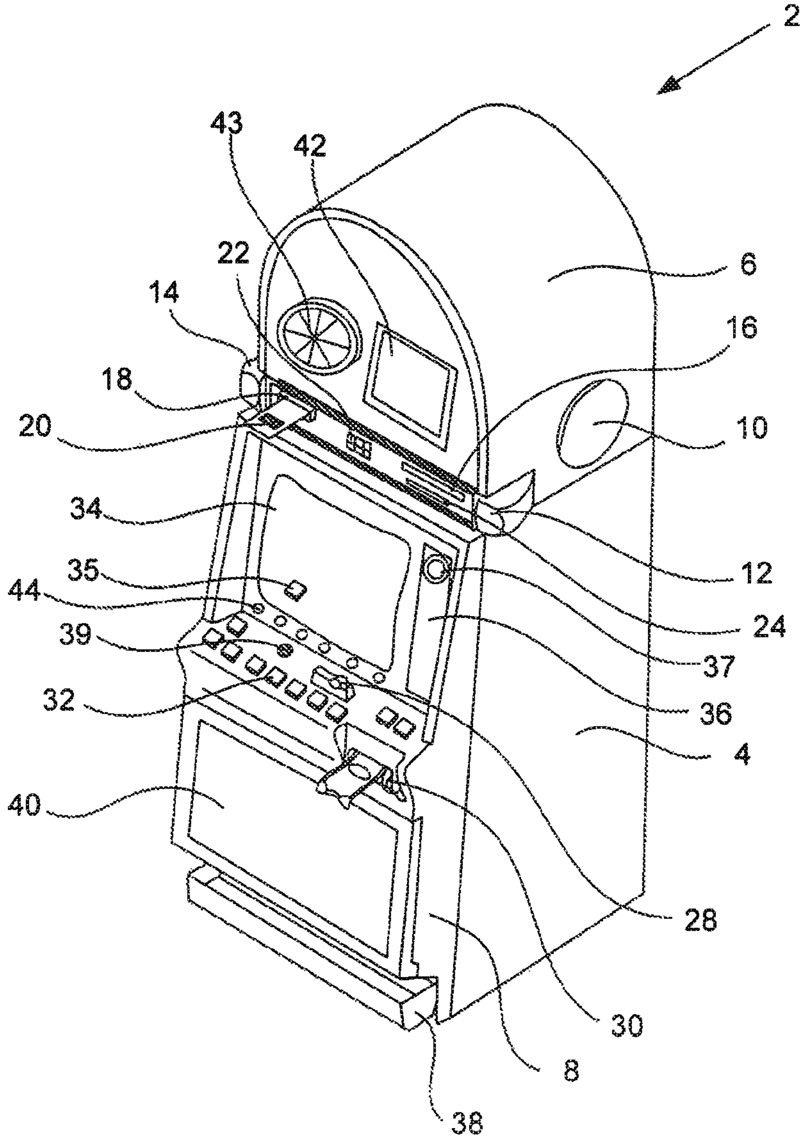
FIG. 1B is a perspective drawing of a gaming machine having a top box and other devices.

In FIG. 1B, a perspective drawing of video gaming machine 2 of the present invention is shown. The gaming machine comprises many gaming devices that may be used to generate a game of chance as well as to provide additional game services. In FIG. 1B, gaming devices and some of their typical functions are described. In FIGS. 2-8, virtual gaming peripheral processes that may control a combination of gaming devices to provide game services are described. In FIG. 9 and FIG. 10, internal gaming devices and the distribution of gaming devices in a gaming machine network which also may be used by a virtual gaming peripherals are described.

Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. The bill validator 30, coin acceptor 28, player-input switches 32, video display monitor 34, and information panel are traditionally devices used to play a game of chance on the game machine 2. The gaming machine 2 may also include a note dispenser (not shown) used to dispense currency. The devices may be controlled by circuitry, often referred to as a master gaming controller (See FIG. 9), housed inside the main cabinet 4 of the machine 2. Many possible games of chance, including but not limited to traditional slot games, video slot games, video poker, lottery games, card games, pachinko games, board games, keno and dice games, may be provided with gaming machines of this invention.

Viewable through the main door is a video display monitor 34 and an information panel 36. The information panel 36 may be a back-lit, silk screened glass panel with lettering to indicate general game information including, for example, the number of coins played. A light panel 44 is located below the display 34 and in some embodiments may surround the monitor. The light panel 44 may be used to convey information to a game player as well to add excitement to games played on the gaming machine. The gaming machine may include a camera 37 that may serve a variety of functions such as for security and video communication. For instance, the camera 37 may be used for face recognition and may be used for voice recognition. The finger print reader 39 may also be used for security purposes. For example, it may be used to identify a player that is using the gaming machine.

The display monitor 34 will typically be a cathode ray tube, high resolution flat-panel LCD, a plasma display, or other conventional electronically controlled video monitor. The display monitor may be used to present the game of chance or bonus game of chance played on the gaming machine. The display monitor may include a touch screen sensor designed to detect inputs from touch screen buttons 35 displayed on the display screen 34. The touch screen buttons may be used to control a play of a game of chance as well as to provide inputs for game services provided on the gaming machine. The display screen 34 may comprise a single display window or multiple display windows. When multiple display windows are used, multiple games and games services may be provided simultaneously in the plurality of windows. The gaming machine 2 may also include a second display 42. The secondary display may also be a cathode ray tube, high resolution flat-panel LCD, a plasma display, or other conventional electronically controlled video monitor and may include a touch screen sensor. The second display 42 may be used to provide elements of a game of chance, a bonus game, game services, entertainment content and attraction features.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 for displaying player tracking information and a card reader 24 for entering a magnetic striped card containing player tracking information. Also, a smart card reader that reads smart cards may be used. Further, the top box 6 may house different or additional devices than shown in the FIG. 1B. For example, the top box may contain a bonus wheel 43 or a back-lit silk screened panel which may be used to add bonus features to the game being played on the gaming machine. The top box may also include a secondary display. During a game, these devices may be controlled and powered, in part, by the master gaming controller housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34. Using the key pad 22, a display 16 and a card reader 24, the user may also initiate a player tracking session on the gaming machine 2. During the player tracking session, the player may earn loyalty point based upon their game play (e.g., amount of money wagered) that may redeemed for various benefits.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine such as the touch screen button 35. Certain player choices may be captured by player tracking software loaded in a memory inside of the gaming machine. For example, the rate at which a player plays a game or the amount a player bets on each game may be captured by the player tracking software. The player tracking software may utilize the non-volatile memory storage device to store this information (see FIG. 9).

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights 44 on the gaming machine 2 or from lights behind the belly glass 40. The bonus wheel 43 may also spin and lights on the wheel may flash to provide various visual effects. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

Figure 2:
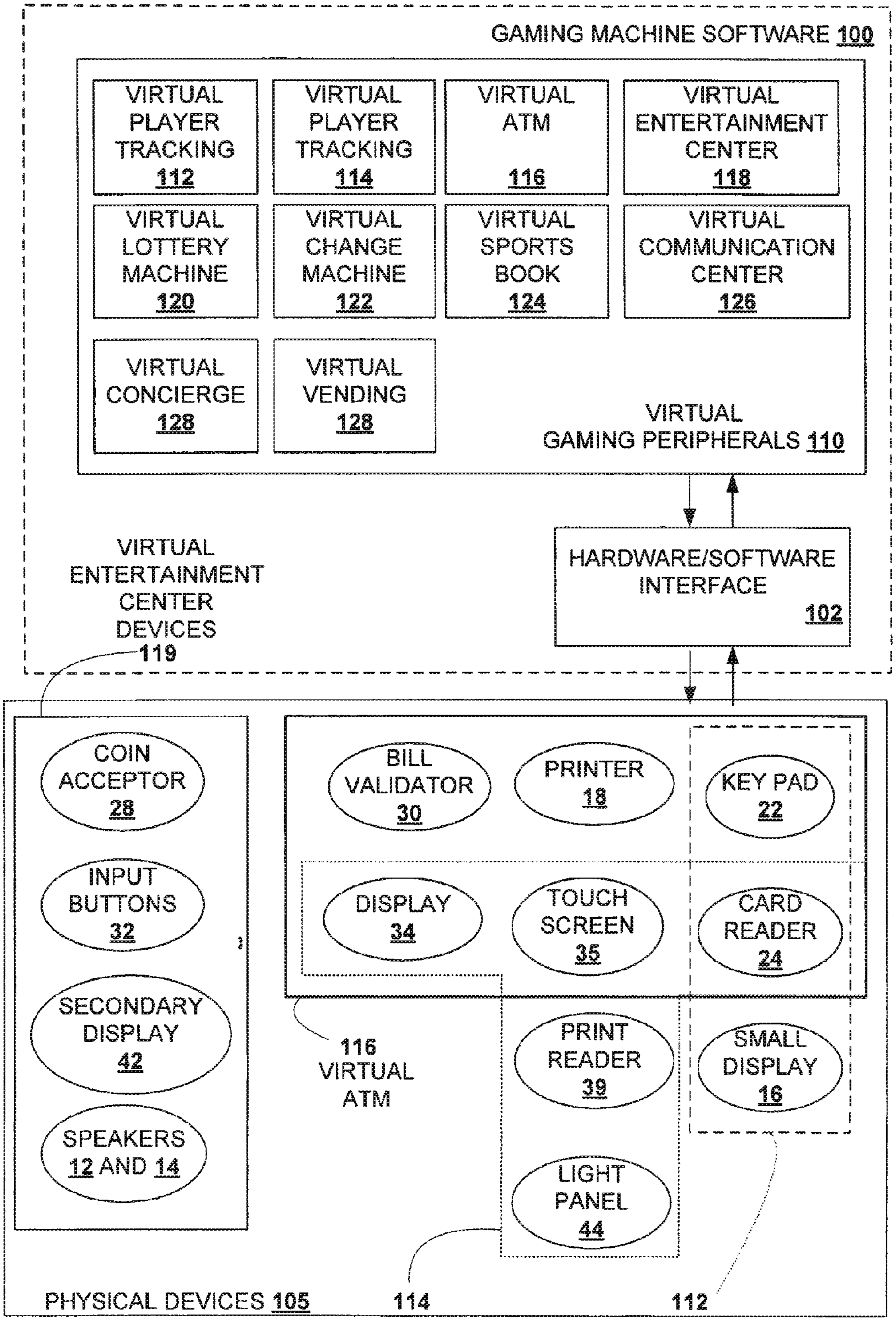
FIG. 2 is a block diagram of a gaming machine with virtual gaming peripheral software modules that control various gaming devices.

FIG. 2 is a block diagram of a gaming machine with virtual gaming peripheral software modules 110 that may be used to control various gaming devices to provide a gaming service. In the present invention, the virtual gaming peripheral software modules are a component of gaming machine software 100 that may be executed as processes by a gaming operating system (see FIGS. 3 and 4). In one embodiment, the gaming operating system is part of the master gaming controller of the gaming machine (see FIG. 9). However, logic devices separate from the master gaming controller may also be used to execute one or more virtual gaming peripheral processes. Using the hardware/software interface 102 (described in more detail with respect to FIG. 3), each virtual gaming peripheral may be used to control a combination of physical gaming devices 105 residing on the gaming machine or remote to the gaming machine but in communication with the gaming machine to provide at least one gaming service.

Examples of virtual gaming peripherals 110 include but are not limited to 1) virtual player tracking 112 and 114 which may be used to provide player tracking services, 2) a virtual Automatic Teller Machine (ATM) 116 which may allow the gaming machine to provide fund transfers and monetary account management, 3) a virtual entertainment center 118 which may allow the gaming machine to provide one or more entertainment services besides game play to the game player, 4) a virtual lottery machine 120 that may allow a player to purchase a lottery ticket of some sort at the gaming machine, 5) a virtual change machine 122 that may allow a player to obtain change at a gaming machine, 6) a virtual sports book 124 that may allow a player to make a wager on an event at the gaming machine, to monitor events, to receive results and to cash out a winning event ticket, 7) a virtual communication center 125 that may allow a player to communicate with other game players, other individuals, send and receive e-messages and locate other players, 8) a virtual concierge 128 that allows a player to learn about and obtain various hotel/casino, restaurant, entertainment and travel services, 9) a virtual vending machine 128 that allows a player to purchase various vending items at the gaming machine and 10) a virtual kiosk (not shown) that allows for Internet enabled services, such as web-browsing, and registration services such as for a loyalty program. The virtual vending machine 128 may allow a gaming machine to dispense items directly to the player or allow the player to order an item which is brought to the player. Details of a virtual player tracking gaming peripheral are described in co-pending U.S. application Ser. No. 09/642,192, filed Aug. 18, 2000, by LeMay, et al. and entitled, "Virtual Player Tracking and Related Services," which is incorporated herein in its entirety and for all purposes. Details of a entertainment content which may be provided with a virtual entertainment center gaming peripheral, such as 118, are described in co-pending U.S. application Ser. No. 09/665,526, filed Sep. 19, 2000, by LeMay, et al and entitled, "Play Per View," which is incorporated herein in its entirety and for all purposes.

As described above, each virtual gaming peripheral, which may be a process executed on the gaming machine, may control a combination of gaming devices in the physical gaming devices 105 to provide a gaming service. Four examples of gaming device combinations are shown for illustrative purposes. The device combinations used by a virtual gaming peripheral may vary according to the gaming devices available on a particular gaming machine. As an example of device combinations that may be used by virtual gaming peripherals, the virtual ATM 116 may control the bill validator 30, the printer 18, the key pad 22, the display 34, the card reader 24 and the touch screen 35 to provide ATM services. The card reader 22 may be used to accept an ATM card. The key pad 22 may be used to enter a pin number. The bill validator 30 may be used to accept cash or printed tickets with a cash value. Funds entered into the gaming machine may be transferred to a bank account. The display 34 and the touch screen 35 may be used to display and select various ATM services. The printer 18 may be used to provide receipts and print cashless tickets which may be used for game play in other gaming machines.

A virtual sports book 124 and the virtual lottery machine 120 may also provide services using the combination of devices described for the virtual ATM 116. However, the context in which the devices are used may be different. For instance, the printer 18 may be used to print a lottery ticket for the virtual lottery machine 120 and a wager ticket for the virtual sports book 124 instead of a receipt. Also, the display 34 and touch screen 35 may be used to display and make lottery and sports bets selections instead of ATM selections. The contexts in which different gaming devices may be used by different virtual gaming peripherals are tracked by software on the gaming machine and are described in further detail with respect to FIGS. 3 and 4.

As another example, a virtual entertainment center peripheral 118 may control a coin acceptor 28, input buttons 32, the secondary display 42 and speakers 12 and 14 to provide entertainment sources to a player. In one embodiment, the virtual entertainment center 118 may act as a musical video jukebox. Using the input buttons 32, a player may select musical videos, which are output on the secondary display 42 and speakers 12 and 14. In another embodiment, the player may be able to select a musical format, which is output on speakers 12 and 14. In yet another embodiment, the player may be able to watch a sporting event on the secondary display while playing a game on the gaming machine. In some cases, the player may be required to deposit money via the coin acceptor 28 to use the virtual entertainment center.

In yet another example of virtual gaming peripheral, a virtual player tracking gaming peripheral (112 and 114) may be used to control a combination of gaming devices to provide player tracking services. In the present invention, different combinations of gaming devices may be used to provide the same gaming service. For instance, the first virtual player tracking peripheral 112 uses the key pad 22, the card reader 24 and the small display 16 to provide player tracking services. In another embodiment, instead of the small display 16, a portion of the large display 34, i.e. via "picture in a picture," may also be used. To start a player tracking session, the player insert a player tracking card in the card reader 24, enters a PIN number using the key pad 22 and receive player tracking information via the small display 16. The second virtual player tracking peripheral 114 uses the display 34, the touch screen 35, the card reader 24, a finger print reader 39 and a light panel 44. To start a player tracking session, the player insert a player tracking card in the card reader 24, provides finger print information via the print reader 39 and receives player tracking information via the display 34. Using the touch screen 35, the player may be able to select choices from player tracking service menus and interfaces displayed on the display 34. The light panel 44 may be used to convey to a player operational information. For example, the light panel may change color or flash when a player has inserted their player tracking card incorrectly in the gaming machine.

In the present invention, one or more virtual gaming peripherals 110 as well as game play processes on the gaming machine may share the same gaming device. For instance, the card reader 24 may be used by the virtual ATM peripheral 116, the first virtual player tracking peripheral 112 and the second virtual player tracking peripheral 114. As another example, the bill validator 30 may be used by the virtual ATM peripheral 116 and by the master gaming controller on the gaming machine.

Traditionally, gaming devices have not been shared by different software elements or processes executing on the gaming machine and the functions of a particular gaming device have been fairly limited. For example, card readers on gaming machine are typically used only to read player tracking information from player tracking cards. As another example, the bill validator 30 is typically used only to insert credits into the gaming machine. Thus, conflicts between different gaming processes wishing to use a gaming device at the same time have not generally had to be considered on gaming machines.

In the present invention, since a given gaming device may be shared by multiple software entities, the context in which a given device is being used may be important. For example, a player tracking session is usually initiated when a player inserts a player tracking card into the card reader 24. When a card is inserted into the card reader 24, one of the virtual player tracking peripherals (e.g., 112 or 114) may detect the insertion of the card an initiate the player tracking session. When the virtual ATM peripheral 116 is active, the player may insert an ATM card into the card reader 24 to begin ATM services (inserting the card may also activate the ATM peripheral if it is not active). Thus, one possible scenario using the card reader 24 is that the player has requested an ATM service, the virtual ATM peripheral 116 is given control of the card reader 24 and the peripheral is waiting for the player to insert an ATM card into the card reader 24. If the player mistakenly inserts a player tracking card into the card reader 24, the virtual ATM 116 may generate an error because the player tracking card is not an ATM card. When the virtual ATM peripheral 116 and the virtual player tracking peripheral (112 or 114) may be operating simultaneously, logic on the gaming machine may be required to determine in the situation described above whether a player tracking session is to be initiated or an error is to be generated.

In general, when a gaming device is shared by two or more entities, such as two or more virtual gaming peripheral processes or a virtual gaming peripheral process and another gaming process executed on the gaming machine, and when situations occur where the two or more entities may want to use simultaneously the same shared gaming device, shared gaming device logic may be required to arbitrate control of the shared gaming device. In traditional gaming machines, arbitrating control of a shared gaming device is generally not an issue because most gaming devices are usually either controlled by a single process or used for a single purpose. Control of the shared by gaming device may be determined according to the context in which the device is being used. For instance, using the coin acceptor 28 in the context of entering credits to the gaming machine may be given priority over using the coin acceptor in the context to make change using the virtual change machine 122 or to purchase items from the gaming machine using the virtual vending machine 128. Details of the shared gaming device logic used with the present invention are described in more detail with respect to FIGS. 3, 4, 6 and 8.

One advantage of using virtual gaming peripherals and shared gaming devices is more robustness and flexibility in maintaining gaming machine functionality. When a gaming device fails using the virtual gaming peripherals, it may be easier to maintain gaming machine functionality because a new virtual gaming peripheral process may be loaded that provides the same functionality without using the failed gaming device. For instance, if player tracking services are provided on a gaming machine using the virtual player tracking peripheral 112, which uses the small display 16, the card reader 24 and the key pad 22, and the key pad 22 fails or the small display 16 fails, the second virtual player tracking peripheral 114 may be activated which does not use either of these devices. Thus, with the present invention, the player tracking services, i.e., the functionality, of the gaming machine may be maintained until the faulty device is replaced by simply activating a new virtual gaming peripheral.

Another advantage of using virtual gaming peripherals and shared gaming devices is more flexibility in increasing gaming machine functionality without adding hardware to the gaming machine. With virtual gaming peripherals, combinations of gaming devices used to provide gaming services may be easily modified. These combinations may be chosen in a manner to maximize device utilization on the gaming machine such that more opportunities for additional revenues and better customer service are provided. For instance, as described above, the light panel 44 installed on the gaming machine may be used with the virtual player tracking peripheral 114 to convey information to the player as well as to add excitement to the play of a game. With current player tracking units, a lighting device for this purpose may be built into the player tracking unit which is installed on the gaming machine. To upgrade a gaming machine without this functionality, the player tracking unit is replaced. With the present invention, the ability to convey information to a player using a lighting device may be accomplished by installing a virtual player tracking peripheral, such as 114, on the gaming machine that uses a lighting device already available on the gaming machine such as the light panel 44. Thus, the ability to convey information to the player is obtained without replacing or adding hardware to the gaming machine.

Figure 3:
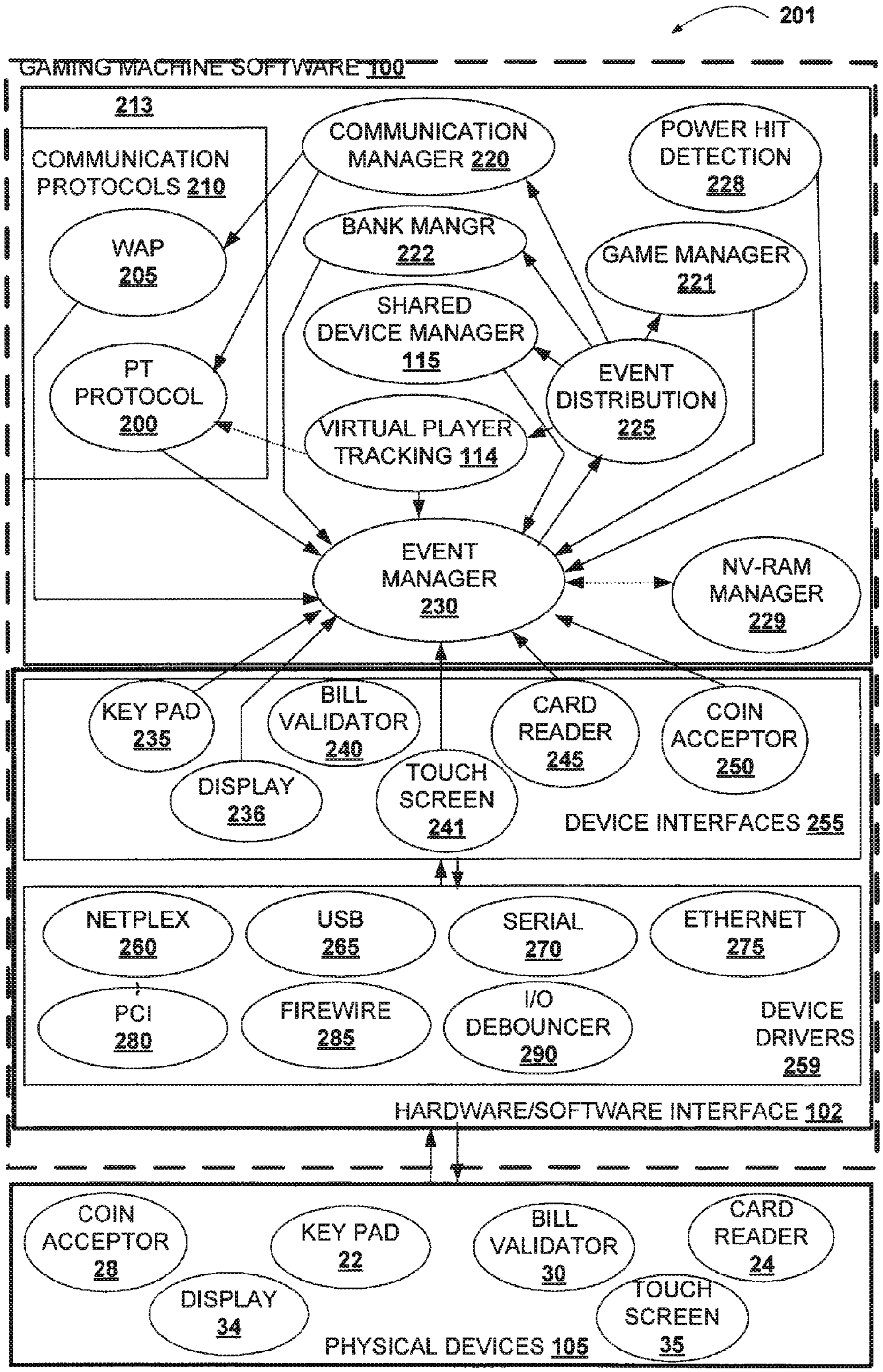
FIG. 3 is a block diagram depicting a gaming machine software architecture in a gaming machine with virtual gaming peripherals.

Various hardware and software architectures may be used to implement the virtual gaming peripherals and shared gaming devices of the present invention. FIG. 3 is a block diagram depicting one suitable example of gaming machine software elements 100 in a gaming machine with a software architecture 201 employing a NV-RAM manager 229 to access a physical non-volatile memory storage device 234 as described with reference to FIG. 9. The NV-RAM manager is a "process" executed by an operating system 213 residing on the gaming machine. A "process" is a separate software execution module that is protected by the operating system executed by a microprocessor on the master gaming controller 224 (See FIG. 9). When a process, including the NV-RAM manger 229, is protected, other software processes or software units executed by the master gaming controller 224 can not access the memory of the protected process.

The operating system 213 used to implement the gaming software architecture of the present invention may be one of a number of commercially available operating systems, such as QNX by QNX Software Systems, LTD of Kanata, Ontario, Canada which is Unix based, Windows NT and MS Windows 2000 by Microsoft Corporation of Redmond, Wash. or Linux by Redhat, Durham, N.C., which is an open source Unix based operating system. Different operating systems may use different definitions of processes. In QNX, the processes are protected. With other operating systems, a "process" may be dedicated logic that is executed. Using different operating systems, many different implementations of the present invention are possible and the present invention is not limited to the constraints of a particular operating system.

The NV-RAM manager 229 controls access to the non-volatile memory on the gaming machine. By using the NV-RAM manager 229, the gaming processes and virtual gaming peripheral processes may share the non-volatile memory resource at the same time. Thus, the non-volatile memory usage is optimally used which may lower the costs associated with adding new functions to the gaming machine.

Other processes that may be considered part of the operating system include but are not limited to a communication manager 220, a bank manager 222, an event manager 230, a game manager 221, a power hit detection process 228, a shared gaming device manager 115 and a virtual gaming peripheral process 114. The virtual gaming player tracking peripheral process 114 may be used to provide player tracking services using the card reader 24, the key pad 22, the fingerprint reader 39 and the light panel 44 as described with respect to FIG. 2. The shared gaming device manager 115 may be used to arbitrate control of one or more shared gaming devices on the gaming machine. For instance, for each shared gaming device, a separate shared gaming device manager process may be used to arbitrate control of the shared gaming device. As another example, a shared gaming device manager process may be used to arbitrate control of multiple shared gaming devices. In general, a gaming machine may include multiple shared gaming device manager processes that each manage one or more shared gaming devices (see FIG. 4).

Figure 6:
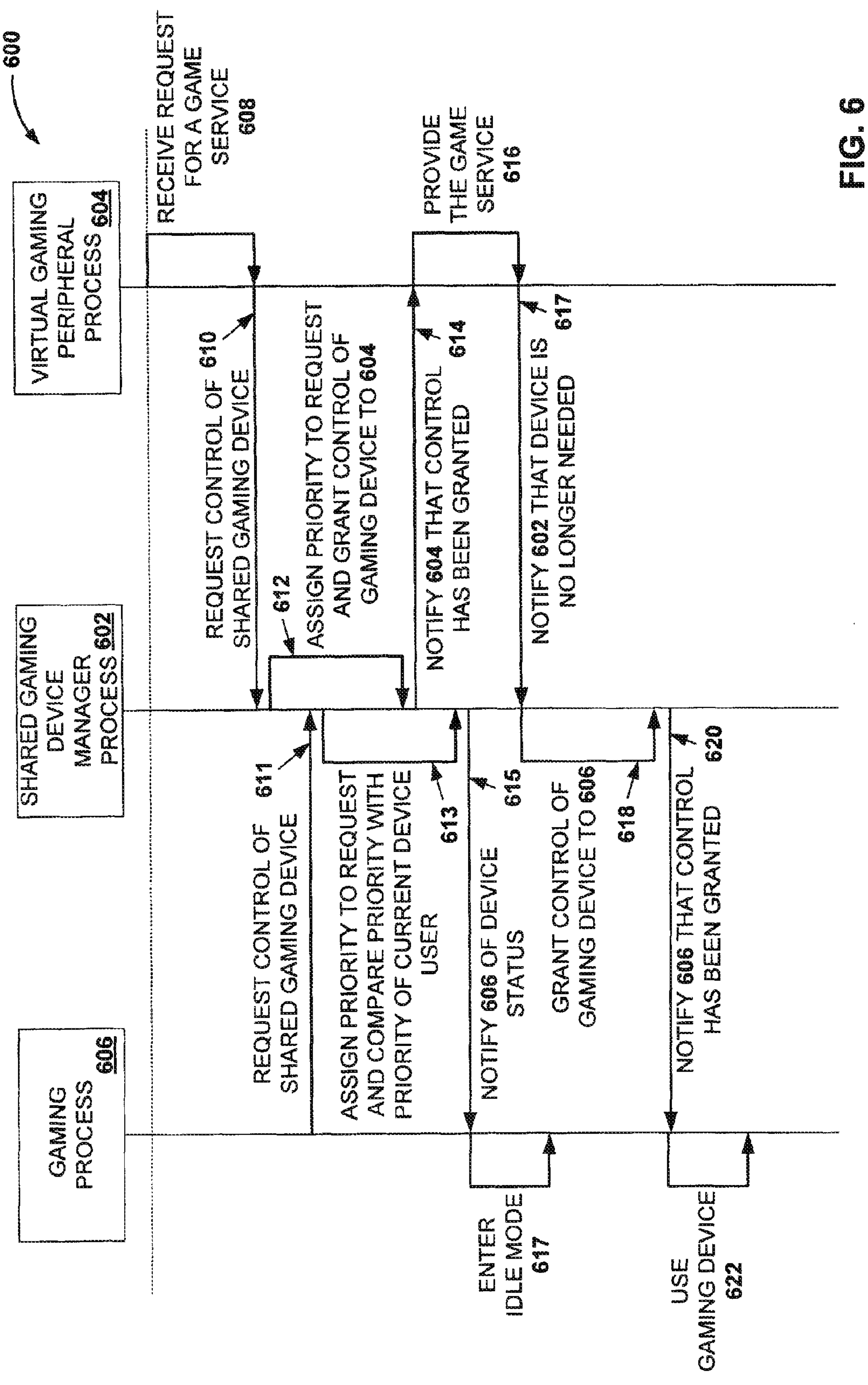
FIG. 6 is an interaction diagram between a virtual gaming peripheral process, a shared gaming device manager process and a virtual gaming peripheral process.

In one embodiment, the shared gaming device manager 115 arbitrates requests to use a shared gaming device, such as the card reader 24 or the bill validator 30, from the different gaming processes within the gaming operating system and determines which entity is given access to the shared gaming device, based on priority settings (see FIG. 6). The gaming processes that may request control of a shared gaming device include but are not limited to 1) a virtual gaming peripheral process, such as the virtual player tracking process 114 and 2) a game play process, such as the bank manager 222 or the game manager 221. At any given time, multiple entities may try to obtain control of one of the shared gaming devices. For example, when the card reader 24 is used to read player tracking cards and debit cards, the virtual player tracking peripheral process 114 and the bank manager process 222 may try to gain control of the card reader 24. This creates a need for one entity, e.g. the shared gaming device manager 115, to determine to whom and under what circumstances control of the card reader 24 is granted.

As described in more detail below, the shared gaming device manager listens to and responds to game events passed through the event manager 230 and event distribution 225 specifically those that are requests for any of its known contexts to enter or exit. A context is a logically defined situation where a gaming process may request control of a particular shared gaming device. A gaming process may generate contexts for more than shared gaming device. For instance, the virtual player tracking peripheral process 114 may generate contexts for the display 34, the touch screen 35, the card reader 24 and the light panel 44. The display 34, the touch screen 35, the card reader 24 and the light panel 44 may all be shared gaming devices. There are at least two circumstances under which the shared device manager 115 may grant control of the shared gaming device: 1) the current context is finished using the shared gaming device or 2) a higher priority context requires access to the shared gaming device.

Event based requests are one method of controlling access to a shared gaming device. Another method are arbitrated requests that are sent directly to a shared gaming device manager or a similar process. In the present invention, event based request, arbitrated request or combinations thereof may be used.

The display 34 is one example of a gaming device that may also be a shared gaming device. Contexts that may request access to the display screen 34 include but are not limited to: a) a menu context that displays machine menu for maintenance situations, b) a tilt context that displays tilts including hand pays for tilt situations, c) a game context that displays regular game play, bonus games and cash outs, d) an attract context that displays attract menus in attract situations, and e) a main menu context that displays a game selection menu and other game service menus available on the gaming machine. The contexts for the display 34 may be generated by various gaming processes active on the gaming machine. For instance, in one embodiment, game service menu contexts may be generated by one or more virtual gaming service peripherals, such as the virtual player tracking process 114. As another example, the game context may be generated by the game manager process 221. Thus, the display 34 is a device that may be shared multiple times. A practical limit may be applied to the display 34 or any other shared gaming device to keep the resource from being entirely exhausted.

The contexts described above for the display 34 may be prioritized. In one embodiment, the priorities for the display may be prioritized in descending order from highest to lowest, as the machine menu context, the tilt context, the game context, bonus game context, the attract context and the main menu context. In general, the priorities assigned to contexts for a shared gaming device are fixed. However, variable priorities may also be used for some contexts of the shared gaming device. As an example, the priorities of attract mode contexts generated by different virtual gaming peripherals may be increased or decreased as a function of time to emphasize a particular game service. Thus, a priority for an attract mode context for a particular game service provided by a virtual gaming peripheral may be increased at particular times such that the attract mode context is displayed more often than other attract mode contexts generated by other gaming processes during the time when its priority is increased. For example, an attract mode context that allows a patron to make a dinner reservation or an entertainment reservation may be emphasized more by increasing its priority in the early afternoon or at other times when the patron may desire these services.

Some parts of the gaming machine software 201 are communication protocols 210, an event manager 230 and event distribution 225, device interfaces 255, device drivers 259, the game manager 221 which interfaces with gaming processes used to generate the game of chance, game resources such as the bank manager 222, the NV-RAM manager 229 and the communication manager 220, which may be used by other processes, the virtual gaming peripheral processes, such as the virtual player tracking 114, and the shared device manager process 115 that arbitrates control of one or more shared gaming devices. These software modules comprising the gaming machine software 201 may be loaded into memory of the master gaming controller 224 (see FIGS. 9 and 10) of the gaming machine at the time of initialization of the gaming machine. The game operating system (OS) may be used to load and unload the gaming software modules from a mass storage device on the gaming machine into RAM for execution as processes on the gaming machine. The gaming OS may also maintain a directory structure, monitor the status of processes and schedule the processes for execution. During game play on the gaming machine, the gaming OS may load and unload processes from RAM in a dynamic manner.

The NV-RAM manager 229 is a protected process on the gaming machine to maintain the integrity of the non-volatile memory space on the gaming machine. All access to the non-volatile memory may be through the NV-RAM manager 229 via a defined API. During execution of the gaming machine software 100, the non-volatile manager 229 may receive access requests via the event manager 230 from other processes, including a bank manager 222, a game manager 221, virtual player tracking 114 and one or more device interfaces 255 to store or retrieve data in the physical non-volatile memory space. Other software units that request to read, write or query blocks of memory in the non-volatile memory are referred to as clients.

The device interfaces 255, including a key pad 235, a display 236, a card reader 245, a coin acceptor 250, a bill validator 240 and a touch screen 241, are software units that provide an interface between the device drivers and the gaming processes active on the gaming machine. The device interfaces 255 may receive commands from virtual gaming peripherals requesting an operation for one of the physical devices. For example, in one context, the virtual player tracking peripheral 114 may send a command to the display interface 236 requesting that a message of some type be displayed on the display 34. The display interface 236 sends the message to the device driver for the display 34. The device driver for the display communicates the command and message to the display 34 allowing the display 34 to display the message. When the display 34 may be controlled by more than one gaming process (e.g., the game manager 221 may use the display 34 to present the game of chance), the shared device manager 115 or a similar process may assign a priority to the context generated by the virtual player tracking peripheral 114 and grant control of the display 34 to the context depending on whether the display 34 is currently in use. If the display 34 is in use, the shared device manager may determine whether the current context using the device should be switched out for the context generated by the virtual player tracking peripheral 114.

The device interfaces 255 also receive game events from the physical devices. A game event is an event generated from any active game process such as active virtual gaming peripheral processes and active game play processes. In general, a game event may be received by the device interfaces 255 by polling or direct communication. The solid black arrows indicate event paths between the various software units. Using polling, the device interfaces 255 regularly communicate with the physical devices 105 via the device drivers 259 requesting whether an event has occurred or not. Typically, the device drivers 259 do not perform any high level event handling. For example, using polling, the card reader 245 device interface may regularly send a message to the card reader physical device 24 asking whether a card has been inserted into the card reader. Using direct communication, an interrupt or signal indicating a game event has occurred is sent to the device interfaces 255 via the device drivers 259 when a game event has occurred. For example, when a card is inserted into the card reader, the card reader 24 may send a "card-in message" to the device interface for the card reader 245 indicating a card has been inserted which may be posted to the event manager 230. The card-in message is a game event. Other examples of game events which may be received from one of the physical devices 105 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot and 13) Abandoned card.

Typically, the game event is an encapsulated information packet of some type posted by the device interface. The game event has a "source" and one or more "destinations." Each game event contains a standard header with additional information attached to the header. The additional information is typically used in some manner at the destination for the event.

As an example, the source of the card-in game event may be the card reader 24. The destinations for the card-in game event may be the bank manager 222, the communication manager 220 and the virtual player tracking manager 114. The communication manager 220 may communicate information read from the card to one or more devices located outside the gaming machine. When the magnetic striped card is used to deposit credits into the gaming machine, the bank manager 222 may prompt the card reader 24 via the card reader device interface 255 to perform additional operations. When the magnetic striped card is used to initiate a player tracking session, the virtual player tracking peripheral 114 prompt the card reader 24 via the card reader device interface 255 to perform additional operations related to player tracking Since multiple contexts may be applied to the card-in event, a shared device manager, such as 115, may be used to determine which context is granted control of the gaming device. For example, the shared device manager 115 may grant control of the card reader to either bank manager 222 or the virtual player tracking peripheral 114.

A game event may be created when an input is detected by one of the device interfaces 255. Game events may also be created by one game process and sent to another game process. For example, when a shared gaming device manager 115 grants control of one shared gaming device to a context, a game event may be generated. Game events may also be generated from entities located outside the gaming machine. For example, one gaming machine may send a game event to another gaming machine via the communication manager 220. The game events are distributed to their one or more destinations via a queued delivery system using the event distribution software process 225. However, since the game events may be distributed to more than one destinations, the game events differ from a device command or a device signal which is typically a point to point communication such as a function call within a program or interprocess communication between processes.

Since the source of the game event, which may be a device interface or a server outside of the gaming machine, is not usually directly connected to destination of the game event, the event manager 230 acts as an interface between the source and the one or more event destinations. After the source posts the event, the source returns back to performing its intended function. For example, the source may be a device interface polling a hardware device. The event manager 230 processes the game event posted by the source and places the game event in one or more queues for delivery. The event manager 230 may prioritize each event and place it in a different queue depending on the priority assigned to the event. For example, critical game events may be placed in a list with a number of critical game transactions stored in the NV-RAM as part of a state in a state-based transaction system executed on the gaming machine.

After a game event is received by the event manager 230, the game event is sent to event distribution 225 in the gaming system 213. Event distribution 225 broadcasts the game event to the destination software units that may operate on the game event. The operations on the game events may trigger one or more access requests to the NV-RAM via the NV-RAM manager 229. Further, when one or more software units may request control of a shared gaming device in response to the event, then a shared device manager may be used to arbitrate the request. For instance, when a player enters a bill into the gaming machine using the bill validator 30, this event may arrive at the bank manager 222 after the event has passed through the device drivers 259, the bill validator device interface 240, the event manager 230, and the event distribution 225 where information regarding the game event such as the bill denomination may be sent to the NV-RAM manager 229 by the event manager 230. After receiving the game event, the bank manager 222 evaluates the game event and determines whether a response is required to the game event. For example, the bank manager 222 may decide to increment the amount of credits on the machine according to the bill denomination entered into the bill validator 30. Further, the bank manager 222 may request control of the bill validator. When the bill validator 30 is a shared gaming device, the request may be arbitrated by a shared gaming device manager. Thus, one function of the bank manager software 222 and other software units is as a game event evaluator. More generally, in response to the game event, the bank manager 222 may 1) generate a new event and post it to the event manager 230, 2) send a command to the device interfaces 255, 3) send a command or information to the wide area progressive communication protocol 205 or the player tracking protocol 200 so that the information may be sent outside of the gaming machine, 4) do nothing or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 230 and then to the NV-RAM manager 229. The polling may require translation of messages from the accounting server or the wide area progressive server using communication protocol translators 210 residing on the gaming machine.

The communication protocols typically translate information from one communication format to another communication format. For example, a gaming machine may utilize one communication format while a server providing accounting services may utilize a second communication format. The player tracking protocol translates the information from one communication format to another allowing information to be sent and received from the server. Two examples of communication protocols are wide area progressive 205 and player tracking protocol 200. The wide area progressive protocol 205 may be used to send information over a wide area progressive network and the player tracking protocol 200 may be used to send information over a casino area network. The server may provide a number of gaming services including accounting and player tracking services that require access to the non-volatile memory on the gaming machine.

The power hit detection software 228 monitors the gaming machine for power fluctuations. The power hit detection software 228 may be stored in a memory different from the memory storing the rest of the gaming machine software 100. When the power hit detection software 228 detects that a power failure of some type may be eminent, an event may be sent to the event manger 230 indicating a power failure has occurred. This event is posted to the event distribution software 225 which broadcasts the message to all of the software units and devices within the gaming machine that may be affected by a power failure.

Device interfaces 255 are utilized with the gaming machine software 213 so that changes in the device driver software do not affect the gaming system software 213 or even the device interface software 255. For example, the gaming events and commands that each physical device 105 sends and receives may be standardized so that all the physical devices 105 send and receive the same commands and the same gaming events. Thus, when one of the physical devices 105 is replaced, a new device driver 259 may be required to communicate with the physical device. However, device interfaces 255 and gaming machine system software 213 remain unchanged. When the new physical device requires a different amount of NV-RAM from the old physical device, an advantage of the NV-RAM manager 229 is that the new space may be easily allocated in the non-volatile memory without reinitializing the NV-RAM. Thus, the physical devices 105 utilized for player tracking services may be easily exchanged or upgraded with minimal software modifications.

The various software elements described herein (e.g., the device drivers, device interfaces, communication protocols, etc.) may be implemented as software objects or other executable blocks of code or script. In a preferred embodiment, the elements are implemented as C++ objects. The event manager, event distribution, software player tracking unit and other gaming system 213 software may also by implemented as C++ objects. Each are compiled as individual processes and communicate via events and/or interprocess communication (IPC). Event formats and IPC formats may be defined as part of one or more Application Program Interfaces (APIs) used on the gaming machine. This method of implementation is common with the QNX operating system.

The operating system and its components have been described in the context of a gaming machine. The operating system may be executed by a master gaming controller on the gaming machine. The present invention is not so limited. Gaming processes may also be activated by operating systems executed by logic devices different from the master gaming controller on the gaming machine. For instance, a gaming peripheral mounted to a gaming machine may include a logic device that executes an operating system. The operating system on the gaming peripheral may be the same or different from the operating system executing on the master gaming controller on the gaming machine. The gaming peripheral may comprise one or more gaming devices. Like the gaming machine activating a virtual gaming peripheral process that controls gaming devices located on the gaming peripheral, the logic device on the gaming peripheral may activate virtual gaming peripheral processes that control gaming devices located on the gaming peripheral and the gaming machine. In this embodiment, when a gaming process executed by the gaming peripheral and a gaming process executed by the master gaming controller desire control of the same gaming device at the same time, logic residing on the master gaming controller, the logic device of the gaming peripheral or combinations thereof, may be used to arbitrate process conflicts.

Figure 4:
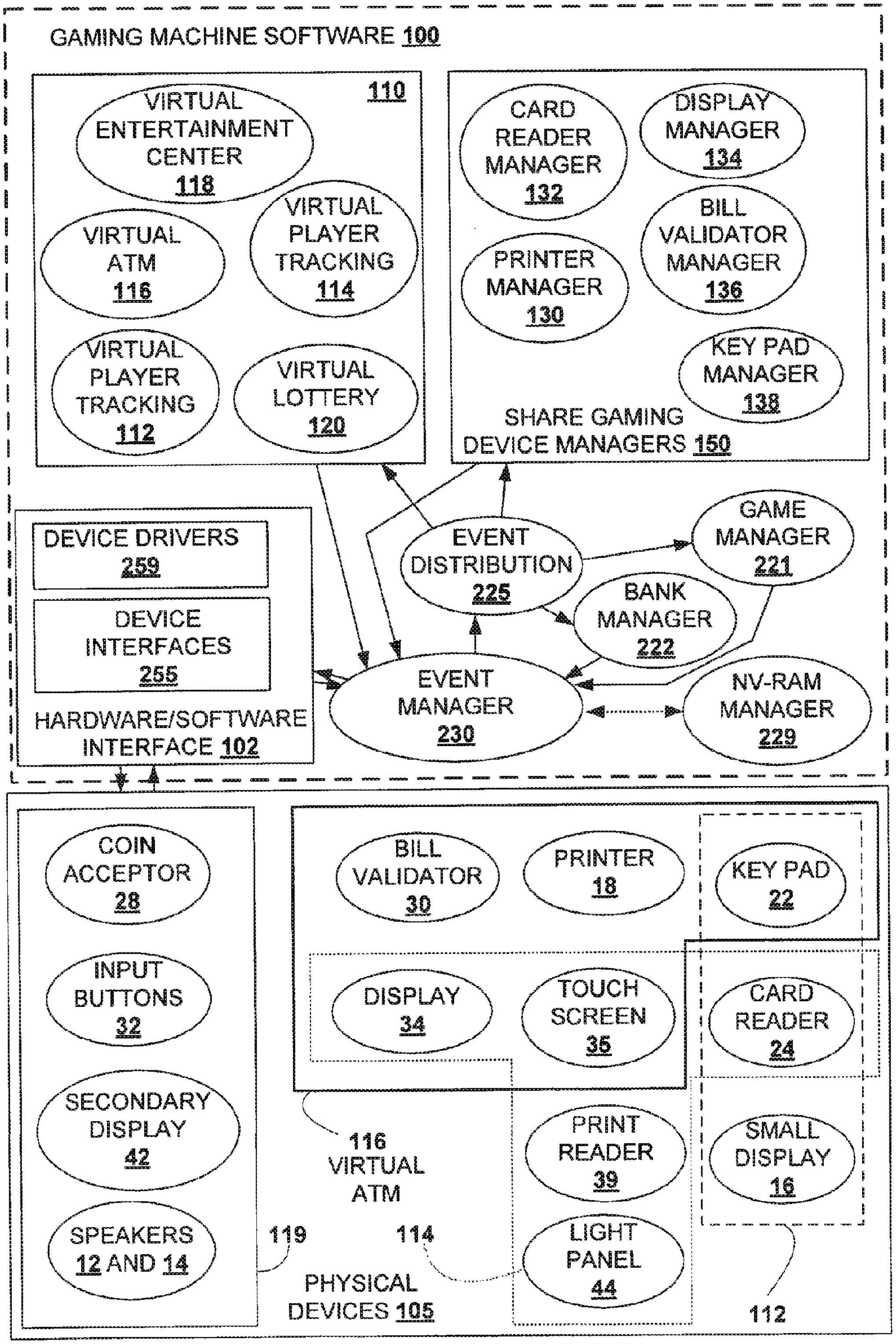
FIG. 4 is a block diagram depicting a plurality virtual gaming peripheral processes that control gaming devices using the software architecture described with respect to FIG. 3.

FIG. 4 is a block diagram depicting a plurality virtual gaming peripheral processes 110 that control gaming devices using the software architecture described with respect to FIG. 3. The number of virtual gaming peripheral processes active on the gaming machine may vary as a function of time. A plurality of different virtual gaming peripheral processes may be stored on a memory device on the gaming machine or available to the gaming machine via remote server (see FIG. 10). However, in many cases only a portion of these virtual gaming peripherals may be active. For instance, the virtual entertainment center 118, the virtual ATM 116, the virtual lottery 120, the virtual player tracking 112 and the virtual player tracking 114 may all be stored on a memory device on the gaming machine. However, the operating system may only load into RAM and activate one of the virtual player tracking peripherals and the virtual lottery peripheral 120. At a later time, the virtual lottery peripheral may be deactivated by the operating system and the virtual entertainment center 118 and the virtual ATM 116 may be activated by the operating system.

The virtual gaming peripherals may be activated as a function of time according gaming machine use patterns. In times of high demand, the amount of virtual gaming peripherals may be available on the gaming machine may be limited so that players focus primarily on game play. In time of low demand, more virtual gaming peripherals may be available on the gaming machine to attract players to use the gaming machine.

Five shared device managers are shown including: 1) a card reader manager 132 used to arbitrate control of the card reader 24, 2) a display manager 134 used to arbitrate control of the display 34, 3) a printer manager 130 used to arbitrate control of the printer 18, 4) a bill validator manager 136 used to arbitrate control of the bill validator, 5) a key pad manager used to arbitrate control of the key pad 22. Since the virtual gaming peripheral processes active on the gaming machine may change as a function of time the contexts used by the shared device managers 150 and the number of shared device managers may change as a function of time. For example, the bank manager 222 may generate a context for controlling the bill validator. When no other processes use the bill validator other than the bank manager 222, then the bill validator manager 136 may not be required. However, when the virtual ATM peripheral process 116 is active on the gaming machine, the virtual ATM process 116 may generate a context where control of the bill validator is required. Therefore, the bill validator manager process 136 may be required to arbitrate control of the bill validator 30 between contexts generated by the virtual ATM 116 and the bank manager 222.

When a gaming process, including but not limited to processes such as a virtual gaming peripheral processes 110 and game play processes such as the game manager 221 and bank manager 222, are loaded onto the gaming machine for execution, logic residing in the operating may determine what contexts are generated by the gaming process and update the shared gaming device managers. In one embodiment, a context table may be maintained for each gaming device. The context table may be updated by the gaming operating system as gaming processes are activated and deactivated on the gaming machine. The context table may include but is not limited to a list of the contexts for the gaming device, the name of the gaming process that generates the context, a priority for the context and information regarding when the context may be entered and may be exited. The context table may be used by a gaming device manager for each shared gaming device to arbitrate control of the shared gaming device. The present invention is not limited to a context table approach and other logical methods may be used to perform the book keeping associated with dynamic contexts on the gaming machine.

For example, the virtual lottery peripheral may use the printer 18, the display 34, the touch screen 35 and the bill validator 30 to allow a player to purchase a lottery ticket. When the virtual lottery peripheral 120 is loaded by the operating system the gaming operating system may update a table of contexts maintained for each gaming device used by the virtual lottery peripheral 120 including a context table for the printer 18, a context table for the display 34, a context table for the touch screen 35 and a context table for the bill validator 30. The updated context tables for each shared gaming device may be used by the appropriate shared gaming device manager to arbitrate control of the shared gaming devices during operation of the gaming machine.

Figure 5A:
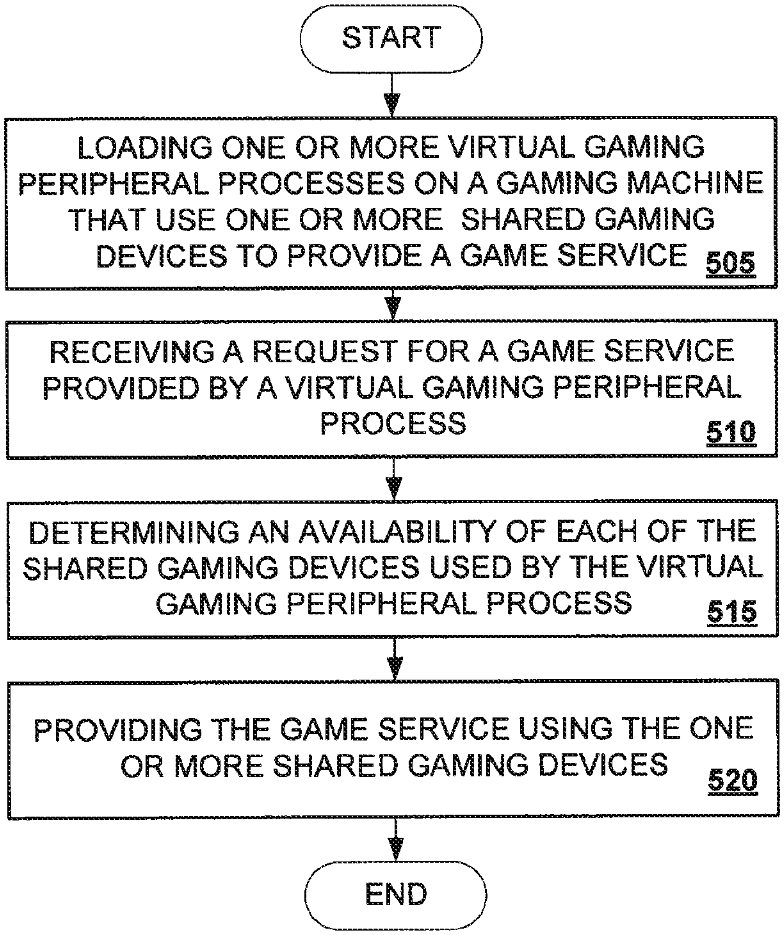
FIG. 5A is a flow chart depicting a method of providing a game service using a virtual gaming peripheral.

FIG. 5A is a flow chart depicting a method of providing a game service using a virtual gaming peripheral on a gaming machine. In 505, the gaming operating system may load one or more virtual gaming peripheral processes. Each virtual gaming peripheral process may use a combination of gaming devices to provide one or more gaming services. The gaming operating system may also load other gaming processes such as gaming processes used to provide a game of chance that may require the use of one or more gaming devices.

When loading or activating a gaming process on the gaming machine, the gaming operating system may determine the contexts in which the gaming process uses various gaming devices. The context information for each gaming device may be stored in a context table describing the contexts for the device. For example, a virtual ATM gaming peripheral process may a card reader, a key pad, a display screen, a printer and a touch screen to provide ATM services. When this process is loaded, the gaming operating system may determine all the contexts in which the virtual ATM process may use the key pad, the display screen, the card reader, the printer and the touch screen and update appropriate context tables for each of these gaming devices.

When a gaming device may be required to support contexts from two or more gaming processes that may conflict, i.e., two or more gaming processes may request control of the same gaming device simultaneously, then the gaming operating system may load a shared device manger to arbitrate control of the gaming device. For instance, a virtual ATM gaming peripheral, a virtual player tracking gaming peripheral and bank manager gaming process in some instances may simultaneously attempt to control the card reader. In this case, a card reader device manager may be used to arbitrate control of the card reader between the processes. The card reader device manager may use a card reader device context table to provide guidelines in regards to granting and switching control of the card reader to different processes.

In 510, a virtual gaming peripheral receives a request for a game service provided by the peripheral. For instance, a virtual entertainment center peripheral may receive a request to display a sporting event on a display screen on the gaming machine. In 515, the availability of each of the gaming devices used by the virtual gaming peripheral are determined. For instance, the virtual entertainment center peripheral may require the use of a display screen on the gaming machine and a communication connection to an outside video feed. Thus, the virtual entertainment center may request control of these devices. When the requested devices are not being used by other gaming processes, control of the display and communication connection may be granted to the virtual entertainment center. The number of outside communication connections available on a gaming machine may be limited. Thus, the outside communication connection may not always be available. In 520, the virtual gaming peripheral may use one or more shared gaming devices to provide the requested service. For instance, the virtual entertainment center may use the display and outside communication connection to present the requested sporting event. The outside communication connection may be an Ethernet communication connection with bandwidth that may be shared.

Figure 5B:
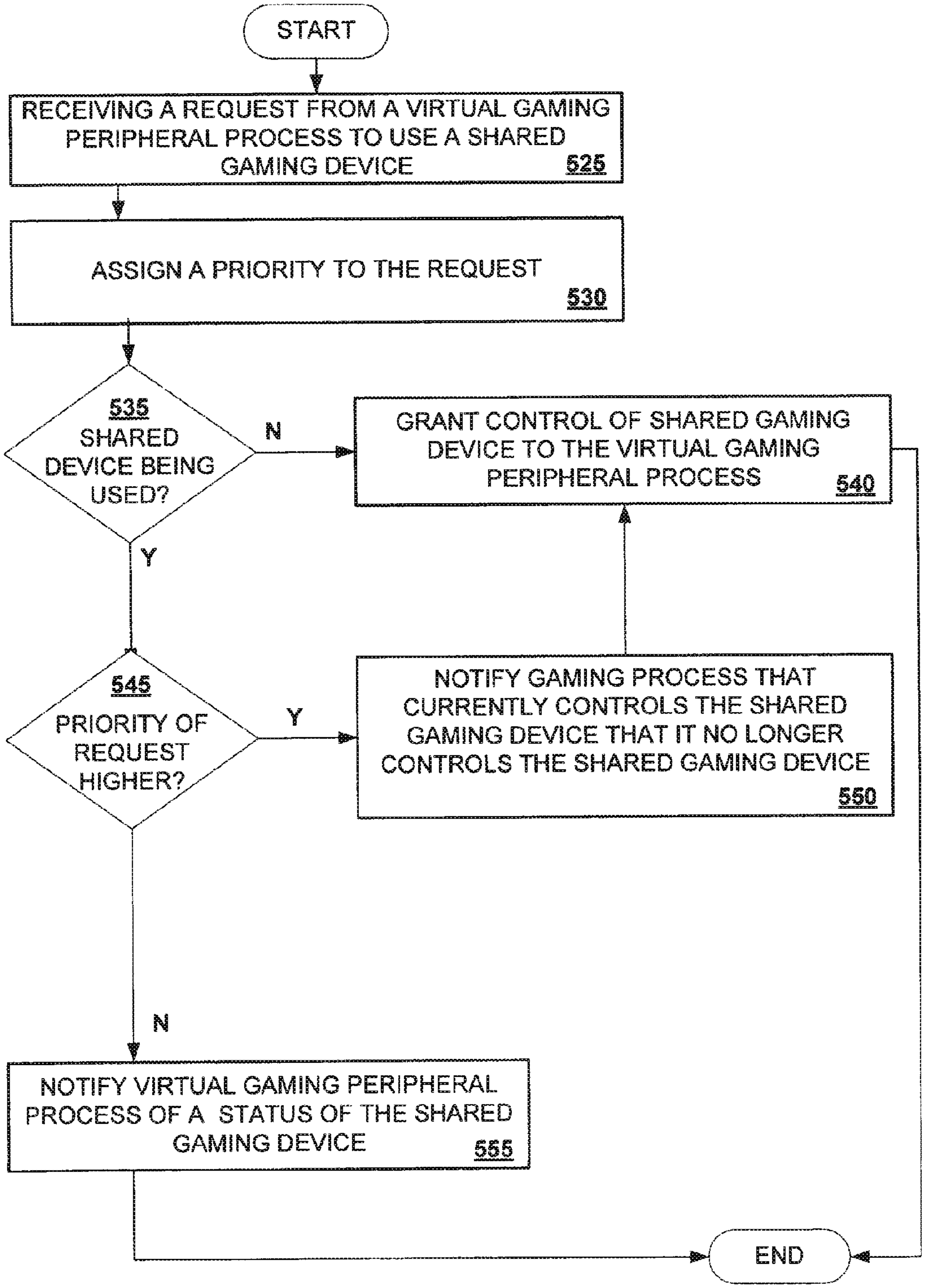
FIG. 5B is a flow chart depicting a method of arbitrating control of shared gaming devices on a gaming machine.

FIG. 5B is a flow chart depicting a method of arbitrating control of shared gaming devices on a gaming machine. In one embodiment, the logic may be implemented by a shared gaming device manager as described with respect to FIGS. 3 and 4. In 525, a request is received from a virtual gaming peripheral process or a gaming process. In 530, the priority may be assigned to the request. The priority may depend on the context in which the gaming device is to be used. In some cases, the priority assigned to a request may vary as a function of time. For instant, the priority assigned to a context generated from a particular virtual gaming peripheral may be increased or decreased to allow the gaming service provided by the virtual gaming peripheral to be emphasized or deemphasized. In some embodiments, the priority information for the contexts in which each gaming device may be used are stored in a context table.

In 535, it is determined whether the requested shared gaming device is not being used. In 540, when the requested gaming device is not being used, the gaming process requesting to use the gaming device may be granted control of the gaming device. In one embodiment, the gaming process may be notified via a gaming event message distributed through the event manager (see FIG. 3). The gaming process context currently controlling the requested gaming device and its priority may be stored on the gaming machine.

In 545, when the requested gaming device is not being used, the priority of the context currently controlling the requested gaming device is compared to the priority of the context requesting control of the gaming device. In 550 and 540, when the priority of the context requesting control of the gaming device is higher, the control of the gaming device may be switched from the current context to the requesting context and the current context may be notified that it no longer controls the gaming device. When the requesting context has a higher priority than current context, the switching of control of the gaming device may not occur automatically. Some contexts may be non-interruptible and thus, may be granted control of the gaming device until their use of the gaming device is completed.

In 555, when the priority of the context requesting control of the gaming device is lower than the current context or the current context is non-interruptible, the gaming process requesting control of the gaming device may be notified that the device is not available. The gaming process that has generated the context may enter an idle state until it is notified that the requested gaming device is available. However, the generated context may be inappropriate and it may be cancelled by the gaming machine. The gaming machine may also generate and store a queue of contexts generated by gaming processes that are waiting to use a particular gaming device.

Figure 5C:
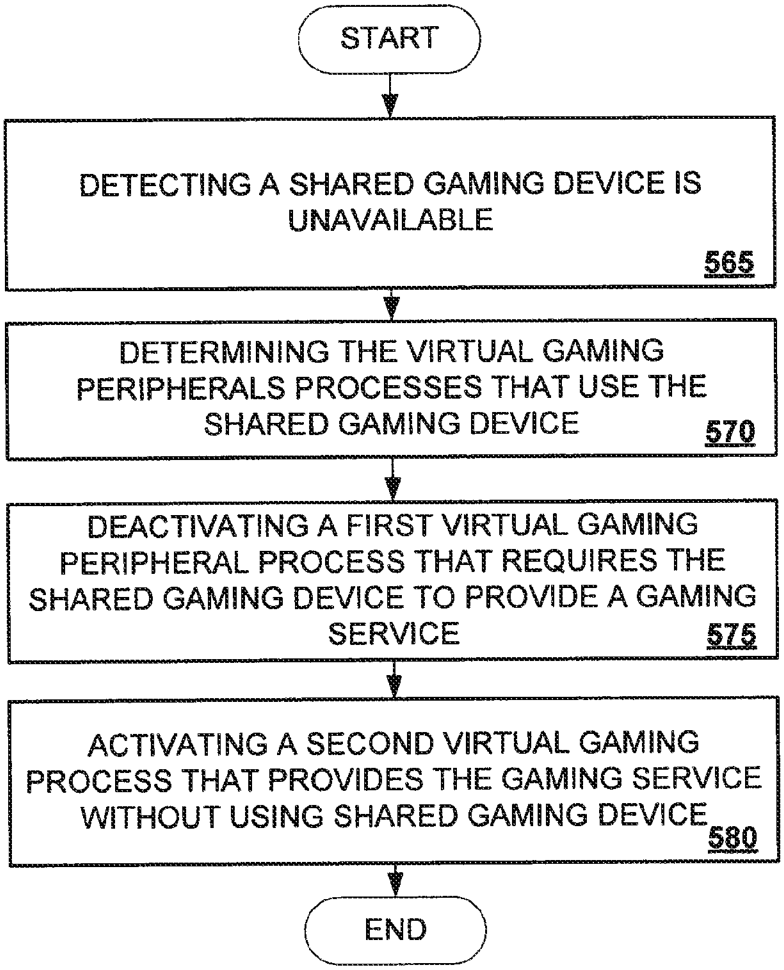
FIG. 5C is a flow chart depicting a method of providing game services using virtual gaming peripherals that can vary according to the gaming devices available on a gaming machine.

FIG. 5C is a flow chart depicting a method of providing a game service using a virtual gaming peripheral that varies according to the gaming devices available on a gaming machine. In 565, in one embodiment, the gaming machine may detect that a gaming device that was available on the gaming machine is no longer available. For instance, the gaming device may require maintenance of some type. In 570, the gaming machine may determine the virtual gaming peripheral processes and gaming processes currently active that generate contexts requiring use of the unavailable gaming device.

After surveying the gaming processes affected by the loss of the gaming device, the gaming machine may develop a recovery plan that allows the gaming machine to function without using the gaming device. The recovery plan may include deactivating gaming processes that require the gaming device and activating gaming processes that provide a level of functionality without using the gaming device. When some desired level of functionality is not possible, the gaming machine may shut itself down. In one embodiment, in 575, a first gaming peripheral process that requires the unavailable gaming device to provide a gaming service is deactivated. The virtual gaming peripheral process may be deleted by the gaming operating system. In 580, a second virtual gaming peripheral process is activated that provides the gaming services without using the gaming device. Thus, the second virtual gaming peripheral provides the same gaming service or a subset of the gaming services provided by the first gaming peripheral using a different combination of gaming devices than the first gaming peripheral i.e., the unavailable gaming device is no longer required.

FIG. 6 is an interaction diagram 600 between a virtual gaming peripheral process 604, a shared gaming device manager process 602 and a gaming process 606. The gaming process 606 may be a game play process such a game manager or a bank manager or a virtual gaming peripheral process such as a virtual player tracking peripheral process or a virtual ATM peripheral process. The interaction between the three processes is provided for illustrative purposes only as other more complex interactions are possible with the present invention. For instance, interactions between the shared gaming device manager process 602 and a plurality of gaming process are possible (e.g., 3 or more).

In 608, the virtual gaming peripheral process 604 receives a request for a game service provide by the virtual peripheral. In 610, the virtual gaming peripheral 608 sends a message to the device manager process 602 requesting control of a gaming device arbitrated by the device manager process 602. In 612, the device manager process 602 receives the request, assigns a priority to the request and grants control of the gaming device to the virtual gaming peripheral process 604. In 614, the device manager process sends a message to the virtual gaming process notifying that it now has control of the gaming device.

In 611, the gaming process 606 sends a message to the gaming device manager 602 requesting control of the same gaming device which is now controlled by the virtual gaming peripheral process 604. In 613, the shared gaming device manager 602 assigns a priority to the request by the gaming process 606, compares it to the priority of the request of the virtual gaming peripheral process currently controlling the gaming device and decides the control of the gaming device should remain with the virtual gaming peripheral process 604. In 615, the gaming device manager sends a message to the gaming process 602 indicating that the requested gaming device is unavailable. In 617, after receiving the message from the gaming device manager process 602, the gaming process 606 enters an idle mode. In the idle mode 606, the gaming process is waiting for the requested gaming device to become available.

In 616, the virtual gaming peripheral process provides the requested gaming service using a combination of gaming devices that it controls. In 617, the virtual gaming peripheral process 604 notifies the device manager process 602 that it has finished using the gaming device. In 618, the gaming device manager grants control of the shared gaming device to the gaming process 606. In 620, the device manager process 602 sends a message to the gaming process 606 to notify the gaming process 606 that it now controls the shared gaming device. In 622, the gaming process 606 uses the shared gaming device to provide a gaming function.

Figure 7A:
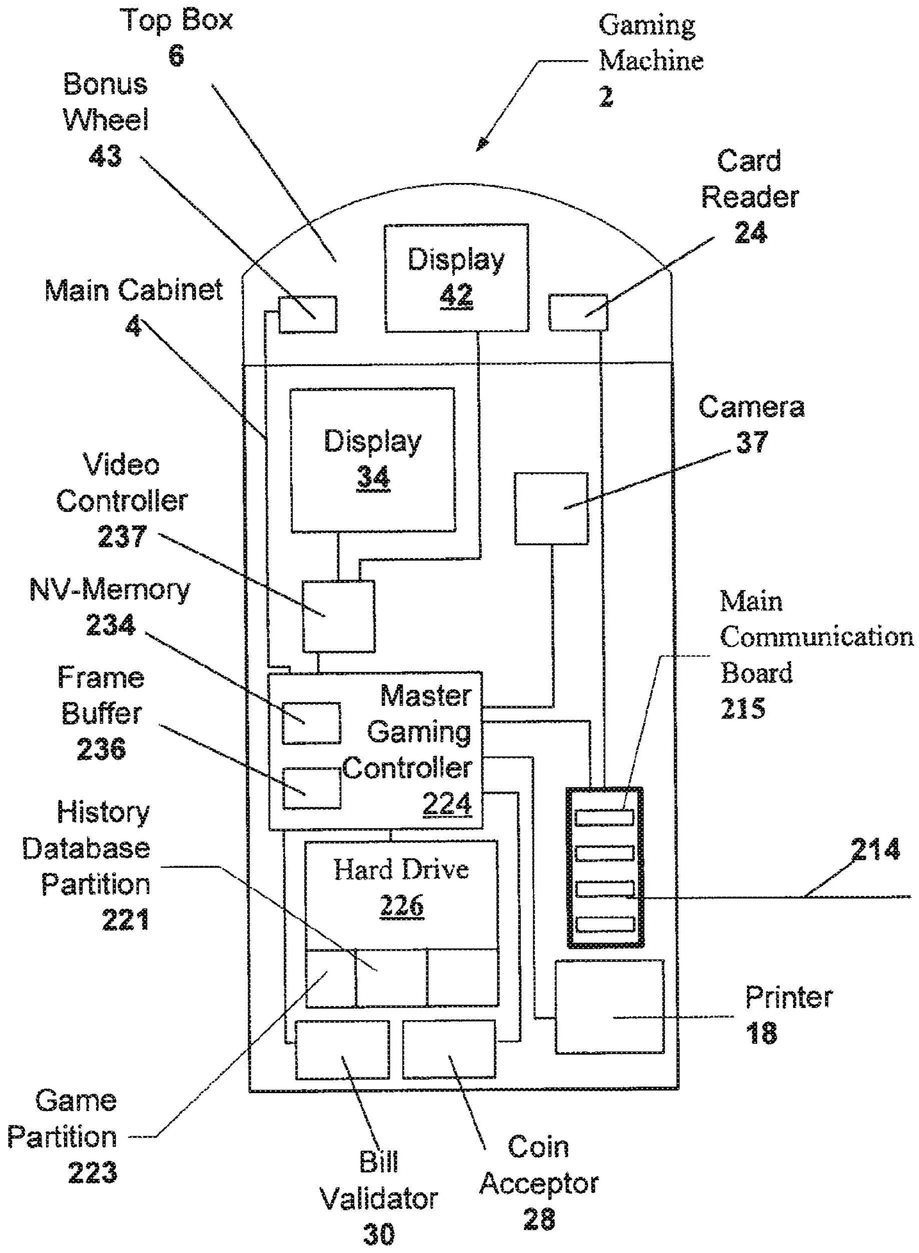
FIG. 7A is a block diagram of a gaming machine of the present invention.

FIG. 7A is a block diagram of a gaming machine 2 of the present invention. Components that appear in the previous figures are identified by common reference numerals. A master gaming controller 224 controls the operation of the various gaming devices and the game presentation on the gaming machine 2. The master gaming controller 224 may communicate with other remote gaming devices such as remote servers via a main communication board 215 and network connection 214. The master gaming controller 224 may also communicate other gaming devices via a wireless communication link (not shown). The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF. The gaming machine may include wireless communication ports and wired communication ports such as an infrared port, an Ethernet port and a USB port.

Using a game code and graphic libraries stored on the gaming machine 2, the master gaming controller 224 generates a game presentation which is presented on the displays 34 and 42. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 236 located on the master gaming controller 224 or alternatively on the video controller 237. The gaming machine 2 may also include a video card (not shown) with a separate memory and processor for performing graphic functions on the gaming machine. Typically, the video memory 236 includes 1 or more frame buffers that store frame data that is sent by the video controller 237 to the display 34 or the display 42. The frame buffer is in video memory directly addressable by the video controller. The video memory and video controller may be incorporated into a video card which is connected to the processor board containing the master gaming controller 224. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 223 of the hard drive 226, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

For gaming machines, an important function is the ability to store and re-display historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage 234 on the gaming machine and displayed in some manner to a display on the gaming machine. In some embodiments, game history information may also be stored to a history database partition 221 on the hard drive 226. The hard drive 226 is only one example of a mass storage device that may used with the present invention. For instance, CD/DVD drive, a removable media drive and a flash drive may be used. The game history information is used to reconcile the dispute.

During the game presentation, the master gaming controller 224 may select and capture certain frames to provide a game history. These decisions are made in accordance with particular game code executed by controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 224.

Various gaming software modules used to play different types of games of chance may be stored on the hard drive 226. Each game may be stored in its own directory to facilitate installing new games and virtual gaming peripherals (and removing older ones) in the field. To install a new game or a new virtual gaming peripheral, a utility may be used to create the directory and copy the necessary files to the hard drive 226. To remove a game or a virtual gaming peripheral, a utility may be used remove the directory that contains the game and its files.

On boot up, a gaming process in the game OS can iterate through the game directories on the hard drive 226 and detect the games and virtual gaming peripherals present on the gaming machine. The gaming process may obtain all of its necessary information to decide on which games can be played, how to allow the user to select one (multi-game) and which virtual gaming peripheral processes are to be installed on the gaming machine. The game manager may verify that there is a one to one relationship between the directories on the NV-memory 234 and the directories on the hard drive 226. Details of the directory structures on the NV-memory and the hard drive 226 and the verification process are described in co-pending U.S. application Ser. No. 09/925,098, filed on Aug. 8, 2001, by Cockerille, et al., titled "Process Verification," which is incorporated herein in its entirety and for all purposes.

Figure 7B:
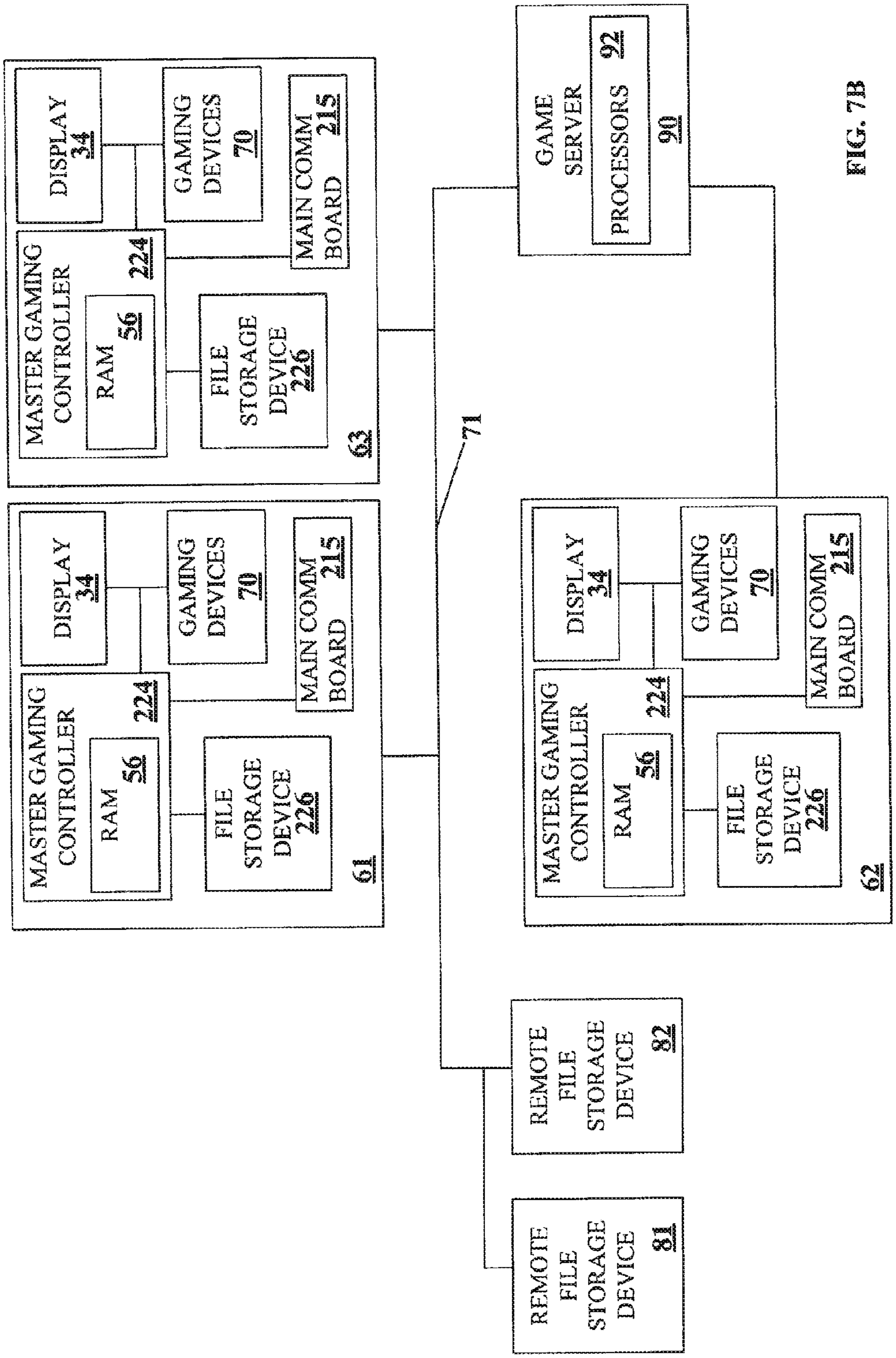
FIG. 7B is a block diagram of gaming machines that utilize distributed gaming software and distributed processors to generate a game of chance for one embodiment of the present invention.

FIG. 7B is a block diagrams of gaming machines that utilize distributed gaming software and distributed processors to generate a game of chance for one embodiment of the present invention. A master gaming controller 224 is used to present one or more games on the gaming machines 61, 62 and 63. The master gaming controller 224 executes a number of gaming software modules, including but not limited to virtual gaming peripheral processes, to operate gaming devices 70, such as coin hoppers, bill validators, coin acceptors, speakers, printers, lights, displays (e.g. 34) and other input/output mechanisms. The master gaming controller 224 may also execute gaming software enabling communications with gaming devices located outside of the gaming machines 61, 62 and 63, such as player tracking servers, bonus game servers, game servers and progressive game servers. These outside communications may be used by some virtual gaming peripherals such as virtual player tracking peripheral. In some embodiments, communications with devices located outside of the gaming machines may be performed using the main communication board 215 and network connections 71. The network connections 71 may allow communications with remote gaming devices via a local area network, an intranet, the Internet or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be may be located in 1) a file storage device 226 on gaming machine 61, 2) a remote file storage device 81, 2) a remote file storage device 82, 3) a game server 90, 4) a file storage device 226 on gaming machine 62, 5) a file storage device 226 on gaming machine 63, or 6) combinations thereof. Virtual gaming peripheral software may also be distributed in a similar manner.

In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies), or combinations thereof. For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection (e.g., 81, 82 and 90) or combinations thereof.

The game server 90 may be a repository for game software modules and software for other game services (e.g., virtual gaming peripheral processes) provided on the gaming machines 61, 62 and 63. In one embodiment of the present invention, the gaming machines 61, 62 and 63 may download game software modules from the game server 90 to a local file storage device to play a game of chance or the download may be initiated by the game server. For instance, when a gaming device used by a virtual gaming peripheral to provide a game service fails on the gaming machine, in some cases, the gaming machine may be able to download a new virtual gaming peripheral from the game server 90 that provides the game service without using the failed gaming device. One example of a game server that may be used with the present invention is described in co-pending U.S. patent application Ser. No. 09/595,798, filed on Jun. 16, 2000, entitled "Using a Gaming Machine as a Server" issued as U.S. Pat. No. 7,951,002, which is incorporated herein in its entirety and for all purposes. In another example, the game server might also be a dedicated computer or a service running on a server with other application programs.

Some aspects of the invention provide one or more different services in addition to player tracking, including but not limited to security services, harm minimization services, player identification services, bonusing/progressive services, accounting services, financial/banking services, network tunneling services, cheating detection services, etc. Some such implementations may be thought of as involving an agent that "follows" a player from host device to host device, but in reality each device executes separate software. Such software may be referred to herein as "software agents" or the like. Because the host devices used for gaming may be different, the software agents may be configured for different platforms and/or operating systems.

For example, some implementations of the present invention provide software-based player tracking that can extend to multiple devices used by a player for gaming. Whether the player plays games on a gaming machine, a PC, a PDA, a cell phone or another host device, the player can accumulate points in a player tracking program: points based on game play on all such devices can be tracked.

Some implementations of the invention provide a software agent hierarchy, within which software agents would have various levels of access and various levels of control over machine processes. In one such implementation, software agents at the lowest level perform low-level tasks and/or have access to non-secure information. At the highest level, software agents can control significant machine processes and/or have access to secure information.

In one such implementation, some of the lowest-level software agents are primarily configured for information gathering. For example, lower-level software agents may be downloaded, authenticated and register to receive information of particular types, such as “coin in” (for gaming machines), wager amounts, games played, wins/losses, bonus games, when a door is open (for gaming machines), when a player chose to make certain game play decisions (e.g., when the player chooses to hold certain cards, etc.), when money was input to a machine, when a PT card is inserted, etc. In some such implementations, low-level software agent could receive all these events, but could not command the machine to do anything. However, the software agent could gather this information and report it for player tracking purposes.

A low-level software agent may also determine the advertisements to which a player has responded and what actions the player took in response, e.g., whether a product or service was purchased, how much time and/or money was spent in response to an advertisement, etc. Some low-level or mid-level software agents may also determine a player’s skill level, style of play, ability to respond to “hard to read” displays, etc., for bot and general cheating detection purposes. Such software agents can also gather data for collusion detection.

Software agents that are enabled to take action (other than reporting) should have a higher security level. Some software agents may operate in host devices, other software agents can operate in other local devices (such as kiosks, switches, etc.) and yet other software agents may operate in intermediate or high-level devices, such as central servers. For example, a security agent may be configured to ensure that the entire system is functioning properly and may shut down any specific host device (or software agent) in the event of a malfunction or tampering. Such security agents may also be in charge of “heartbeat” signals and/or cheating detection, which will be discussed in more detail below. As such, security agents may be deployed in more than one level of a gaming network, e.g., at the host device level, at a local server level and at a central server level.

Player tracking agents could be used for various functions in addition to the types of monitoring actions described above. For example, player tracking agents may be involved in rewarding players for attaining a level of play, in notifying players of opportunities for using player tracking points, for alerting players that they are nearing an award level, etc. Player tracking agents could also be involved with cheating detection. For example, a player tracking agent may be used to determine, at least in part, a player’s style of play and/or to detect deviations from that style of play. Methods for acquiring and using such data are described in detail in U.S. patent application Ser. No. 11/480,713, entitled “DETECTING AND PREVENTING BOTS AND CHEATING IN ONLINE GAMING” and filed on Jul. 3, 2006, which has been incorporated by reference herein.

Such deviations may indicate cheating/collusion or another player using the player’s host device. Accordingly, such deviations could trigger countermeasures, including reporting to another software agent (such as a security software agent) and/or to a central system.

Network agents can provide network access services related to gaming. For example, a network agent may allow online games to be played on a local area network behind a router, e.g., by facilitating the use of network address translation. Moreover, a network agent may facilitate tunneling such as VPN tunneling. A network agent may provide location detection functions, as described elsewhere herein. Accordingly, a network agent may be involved with a determination of whether a player is in a location in which desired gaming is legal. In order to make this determination, a network agent could communicate with one or more other software agents and/or devices that keep track of jurisdictional requirements.

Progressive software agents may communicate with a central server to enable a multitude of players to participate in games that offer progressive jackpots. In some implementations, a progressive software agent monitors “coins in,” take percentage, jackpot size, etc. Such software agents can also be used for state lotteries. Bonus software agents could be used to provide for bonus rounds or additional bonus payouts, as appropriate.

Accounting software agents can be used to keep track of wins, losses and other play history. In some implementations, accounting software agents provide state information equivalent to that currently provided by the meters of a slot machine, which is necessary for restoring a gaming session. Such information should be stored in non-volatile memory.

Financial or banking software agents may be used to reserve the player’s bankroll amount directly through the player’s account at a financial institution such as a bank account, a credit card account, etc. This type of software agent could reserve the funds to ensure that players can actually pay any amount lost up to the reserved amount. Such software agents may also transfer winnings to the player’s account at the financial institution and deduct losses from such accounts.

Auditor and/or controller software agents may provide tax, regulatory compliance and/or harm minimization functions. For example, an auditor software agent could create whatever audit trail is required by the local jurisdiction. An auditor software agent could also log information necessary for tax requirements regarding gambling wins and losses, including but not limited to the requirements set forth in IRS Publication 529. For example, the auditor software agent may track all payments in, payments out, the location (e.g. which gaming establishment), host device number and date, etc.

Licensing software agents may be involved with various functions, some of which are described herein. For example, licensing software agents may facilitate game licensing, e.g., by ensuring that players are using games that are licensed, providing licenses as needed, etc. In some implementations, licensing software agents may be involved with tracking software versions and/or ensuring that players are using games that are authorized in the location.

Figure 8:
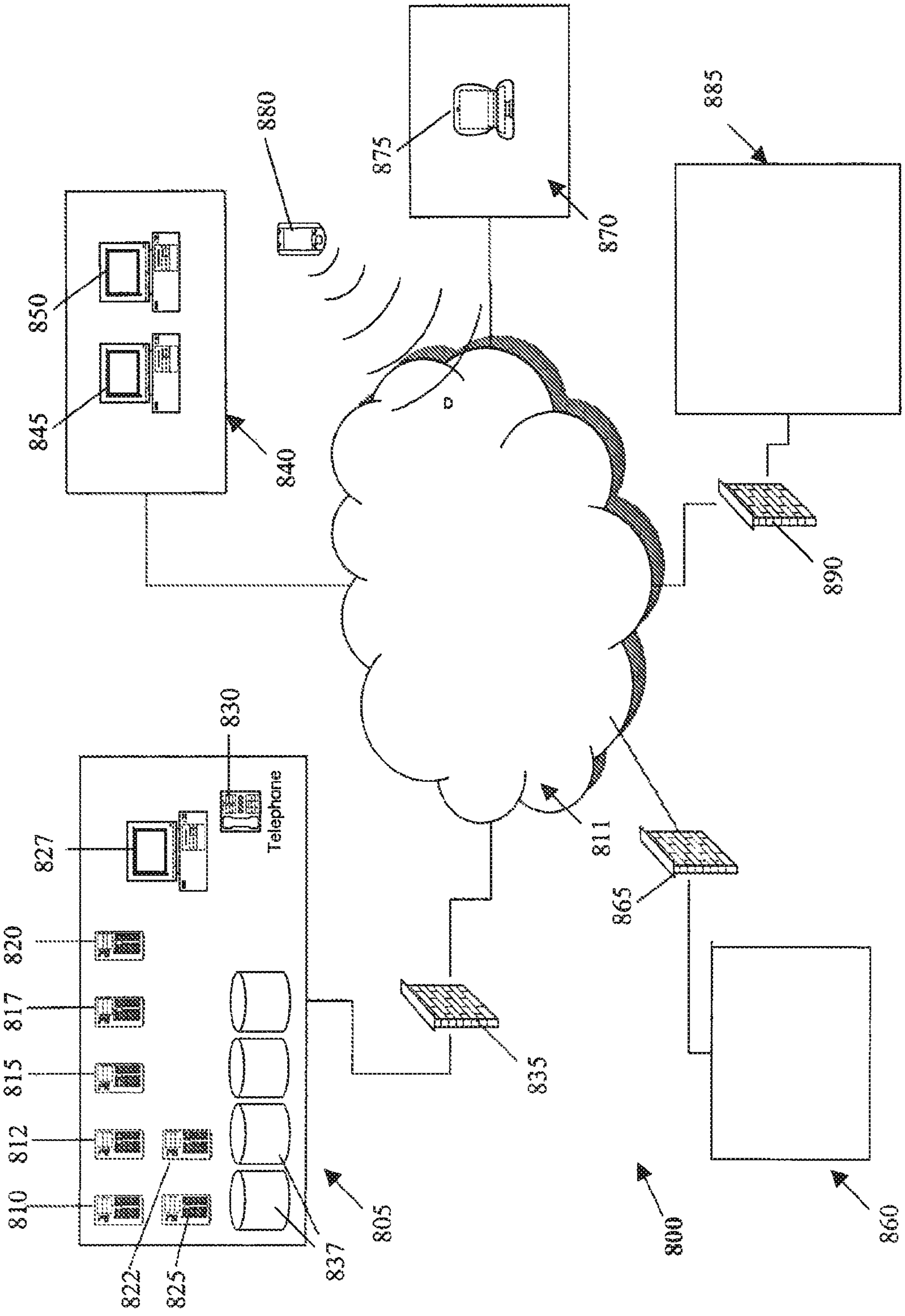
FIG. 8 illustrates a network that may be used to implement some aspects of the invention.

A simplified depiction of a network for some such implementations is shown in FIG. 8. It will be appreciated that other types of networks involving different devices, more or fewer devices, etc., may be used to implement the present invention. For example, game provider 805 provides Internet wagering games, but is not a gaming establishment (such as a casino or the like) that provides on-site wagering games. However, in alternative implementations, game provider 805 may be, or may at least be associated with, such a gaming establishment.

In this example, game provider 805 provides Internet wagering games and related services via one or more servers. In some implementations, the servers may be configured for specialized tasks. For example, server 810 may be primarily configured to provide games, server 812 may be primarily configured to provide authentication/identification functions, server 815 may be primarily configured to provide cheating detection services and related countermeasures, server 817 may be primarily configured to provide accounting services, server 820 may be primarily configured to provide financial services, server 825 may be primarily configured to provide progressive and/or bonusing services and server 827 may be primarily configured to provide player tracking services. One of these servers, or another device, may provide additional services such as advertising, network access, licensing, etc.

However, tasks may be apportioned among devices in any convenient fashion. For instance, some or all servers could provide multiple services. In some such implementations, each blade of a blade server provides a separate functionality. Moreover, host device 827 may allow an operator to monitor the activities of game provider 805 and of gaming participants, but may also be involved in some aspects of data analysis/cheating detection or other services. As described in more detail below, players' host devices are preferably involved in some aspects of data gathering and/or analysis.

Telephone 830 allows direct verbal communication between personnel of game provider 805 and others, including gaming participants. Storage devices 837 allow storage of data, including but not limited to accounting and financial data, game play data, player data, analyses, etc. In some implementations of the invention, storage is provided at another location, e.g., via a storage network. Such storage may, for example, provide data mirroring or other types of redundancy. Preferably, redundant blades, servers and/or other devices provide failover protection.

Firewall 835 is interposed between the devices of game provider 805 and Internet 811. Game provider 805 provides wagering games to players in locations 840 and 870, and to wireless device 880, via Internet 811. In this example, location 840 includes PC 845 and PC 850 and location 870 includes iBook™ 875. Wireless device 880 is a personal digital assistant in this example.

Gaming establishment 860 is configured for communication with Internet 811 via firewall 865. Gaming establishment 860 may be a casino, a cruise ship, a riverboat or any other type of gaming establishment. Exemplary gaming establishment networks are described in detail below.

Financial institution 885 is also connected to Internet 811, via firewall 890. Financial institution 885 may be a bank, a credit union, a credit card company, or another such institution. Part of the online gaming process may involve the transfer of funds to and/or from network devices of financial institution 885. For example, game provider 805 may also provide account reconciliation services, periodic reports or gaming wins and losses, etc., in connection with financial institution 885.

It will be appreciated that games could be played via devices other than those illustrated in FIG. 8 and that other devices not shown in FIG. 8 may be used within the scope of the invention. For example, some methods and devices described in U.S. patent application Ser. No. 10/981,435, entitled "LOCATION AND USER IDENTIFICATION FOR ONLINE GAMING" and filed on Nov. 3, 2004, which is hereby incorporated by reference, may advantageously be used in connection with the present invention. Such devices include, but are not limited to, location detection devices and biometric devices (such as retinal scanners, hand and/or fingerprint scanners, voice recognition devices and the like).

Moreover, it will be appreciated that one or more networks other than Internet 811 may be used to implement various aspects of the invention, such as a satellite network, a wireless network, a metro optical transport, the PSTN, etc. Accordingly, a variety of protocols may be used for communication, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks), Dense Wavelength Division Multiplexing ("DWDM," an optical technology used to increase bandwidth over existing fiber optic backbones), or Code Division Multiple Access (CDMA, a wireless cellular communication technology).

Figure 9A:
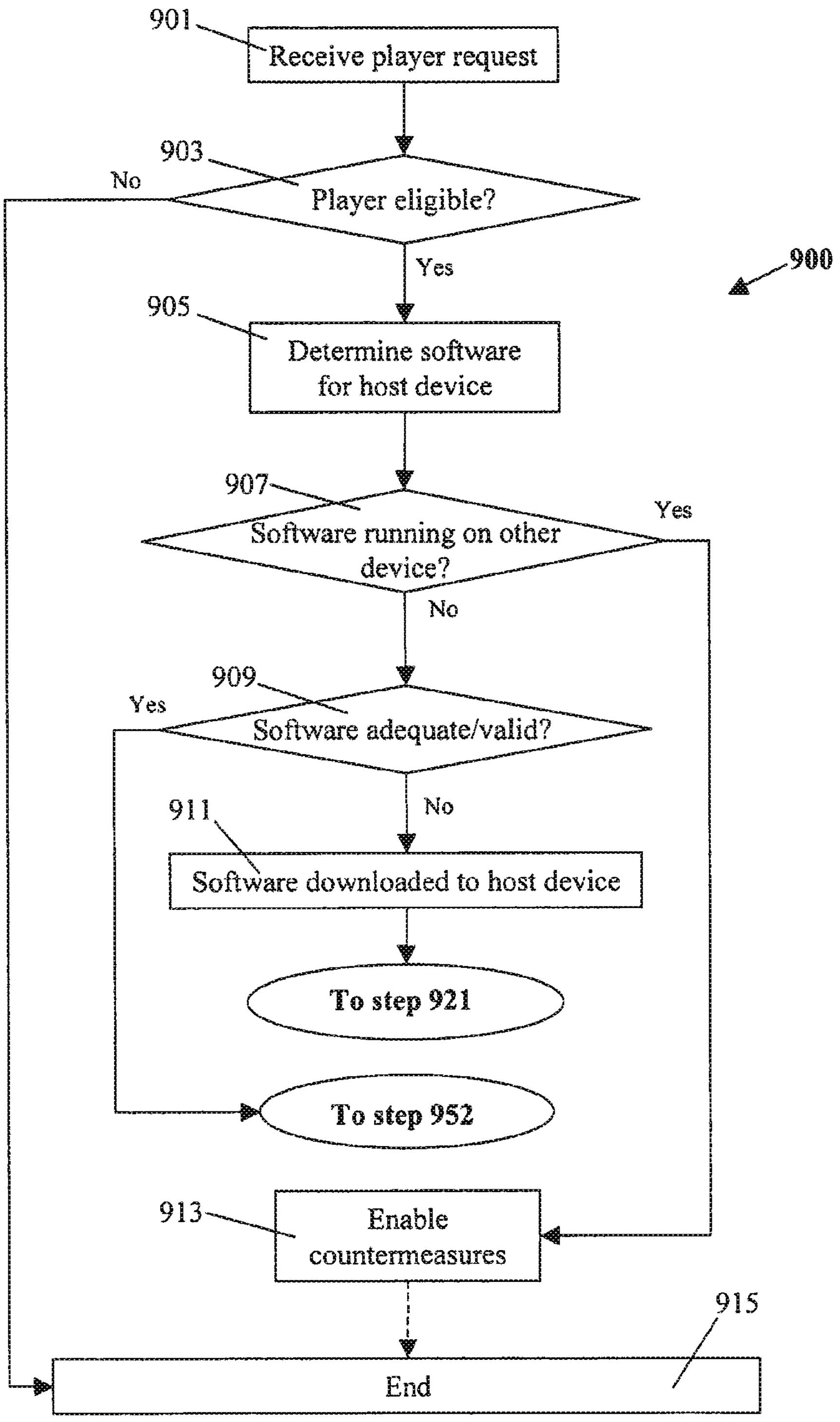
FIG. 9A is a flow chart that outlines some methods of the invention.
Figure 9B:
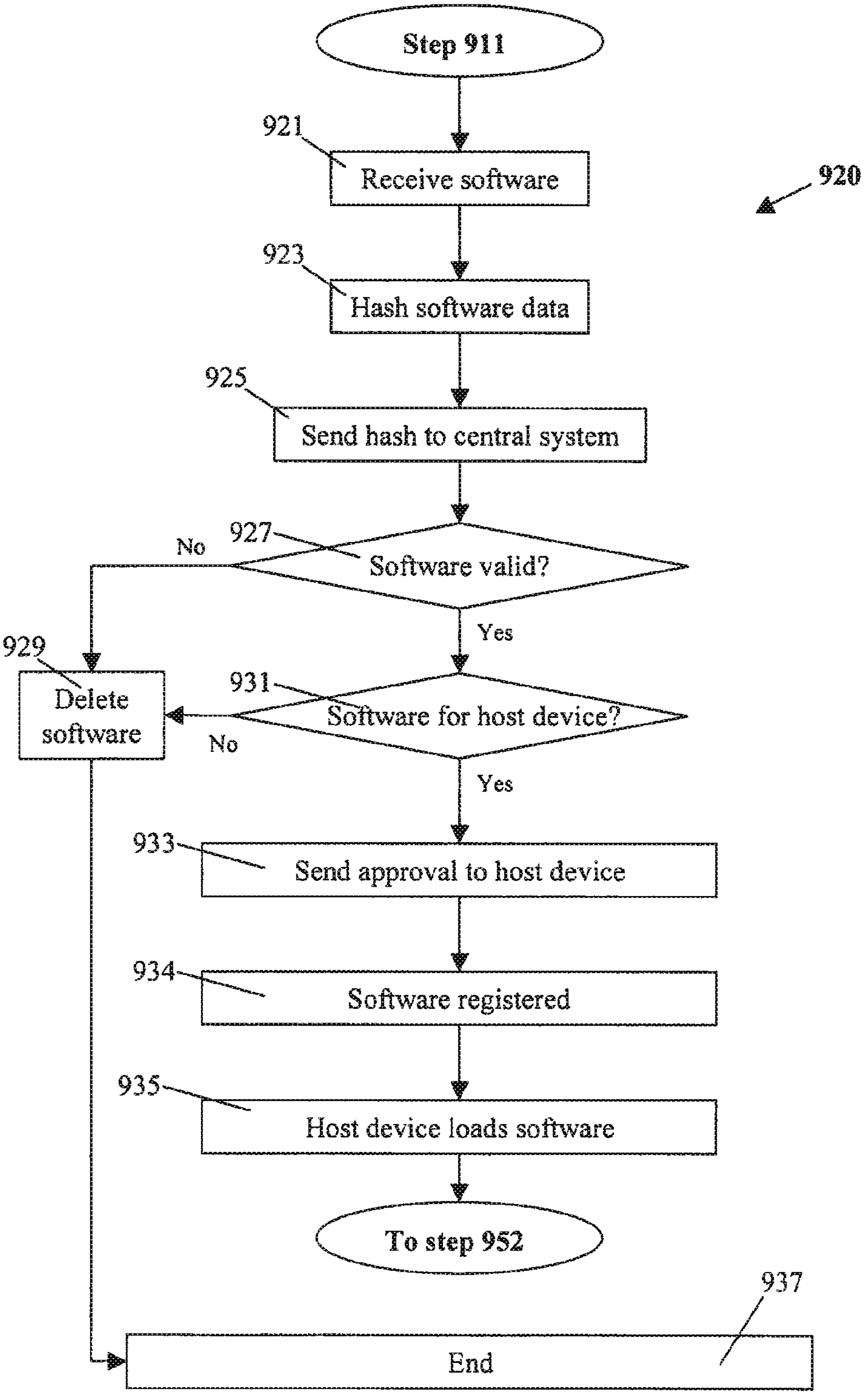
FIG. 9B is a flow chart that outlines some methods of the invention.
Figure 9C:
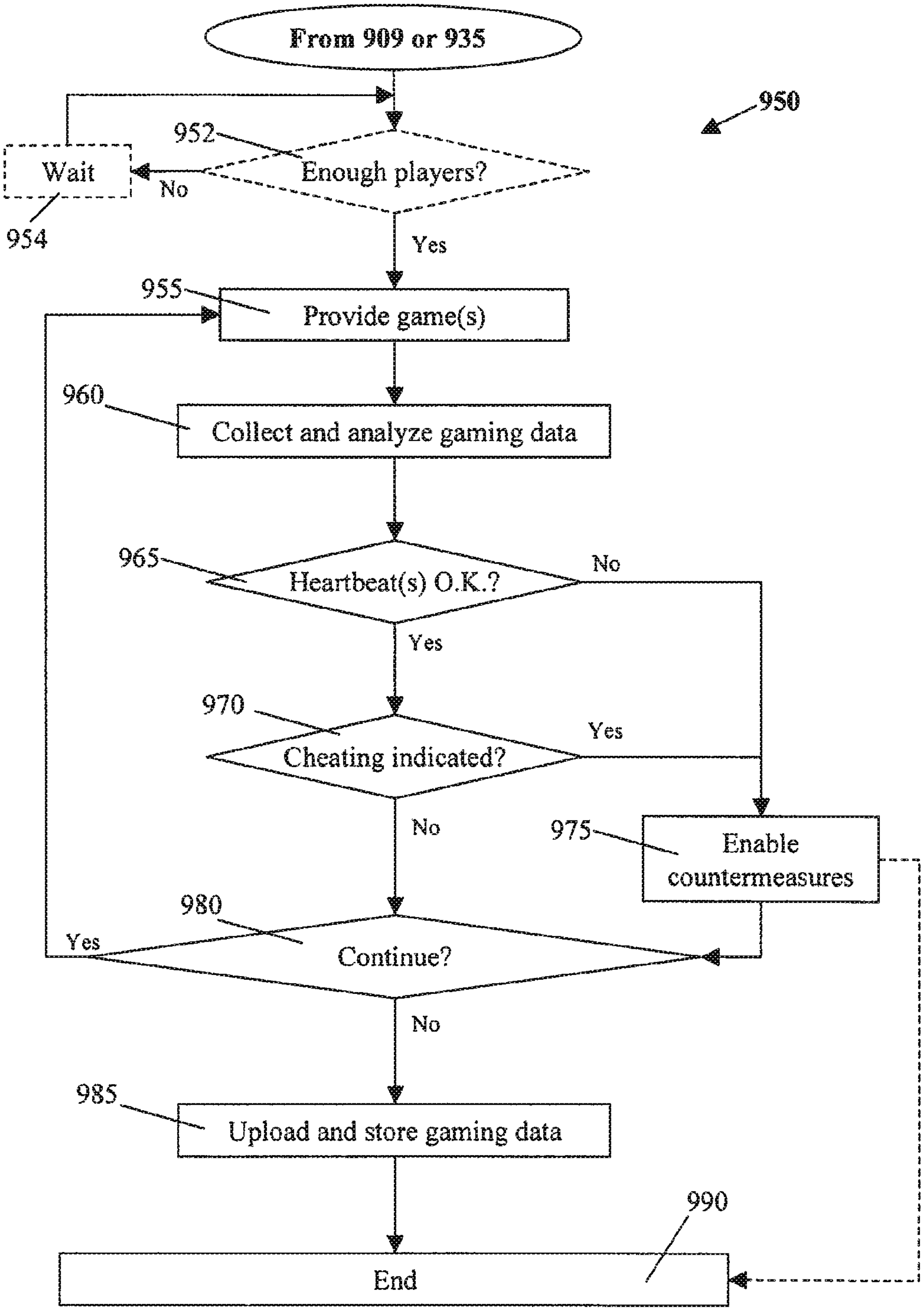
FIG. 9C is a flow chart that outlines some methods of the invention.

Some implementations of the invention will now be described with reference to FIGS. 9A through 10B. The methods shown and described herein, including but not limited to those outlined in FIGS. 9A through 9C, are not necessarily practiced in the sequence shown or described. For example, step 907 of FIG. 9A may be performed after step 909. Moreover, the methods shown and described herein may have more or fewer steps than are indicated herein.

In this example, a player wishes to play a wagering game using a host device that is not within a gaming establishment. Specifically, the player desires to play online poker using the player's Blackberry. In step 901 of FIG. 9A, a request is received (e.g., by a device of game provider 805) from the Blackberry. In step 903, it is determined whether the player is eligible to participate in the requested online gaming. Because a wagering game is involved, the player's location will need to be one in which the type of wagering game is permitted. Moreover, the player's identity and age need to be determined, in order to ensure that the player is old enough to play wagering games.

The player's available credit, creditworthiness, etc., should also be evaluated. However, although the financial aspects of online gaming are multi-faceted and highly important, they are not the main thrust of this application and will not be elaborated upon herein. Known methods of addressing such needs may be applied when implementing the present invention.

Any type of personal identification methods and devices known in the art may be used to identify a player. Data used in an initial registration process are preferably stored for subsequent use. For example, the player may be asked to use biometric device such as retinal scanner, a fingerprint reader, etc., and to transmit the data obtained from the biometric device to a central location. The player may be asked to input a confirmation number, swipe a card, and/or use a special dongle having an encrypted password, a key, etc. The player may be asked to make an oral response during a telephone call to a telephone number associated with the player's location. The oral response may be analyzed, e.g., according to known voice biometrics of a user obtained during a registration process, to verify the user's identity. The user may also be prompted to make statements verifying his or her identity, age, a maximum amount available for wagering or other statements, which are preferably recorded and stored.

In some implementations, if the user's location is fixed, the location will be determined in part by reference to a database of land telephone lines, modems, etc., and corresponding addresses. The location may be verified by reference to a location determined by other methods, e.g., by use of a "traceroute" or similar program to determine the location of an Internet service provider's network device that is near a user's host device.

However, some players may use a mobile device, such as wireless device 880 of FIG. 8, for gaming. Accordingly, a user's location may change, even during the course of a gaming session. Therefore, in some implementations, a user's location is determined in other ways, e.g., by reference to the Global Positioning System and/or to positioning information provided by a cellular telephone network. For example, if the user is called on a cellular telephone to verify his or her identity, it may be presumed that the user's location could change during the gaming session. The location is preferably checked again during the gaming session (if one is established) in order to ensure that the player is still within a jurisdiction that allows online gaming. This is particularly desirable if the device's last location was near a boundary of a jurisdiction that does not allow gaming, in which different gaming requirements apply, etc.

The device or devices that a player uses for online gaming are preferably identified and logged. Some implementations of the invention apply device fingerprinting techniques for device identification and/or verification. Some such fingerprinting techniques involve the exploitation of small deviations in processor clock skews. Relevant techniques are discussed, for example, in Kohno, Tadayoshi, "Remote Physical Device Fingerprinting" (IEEE Symposium on Security and Privacy [May 2005]), which is hereby incorporated by reference for all purposes.

If a player is not eligible, the process ends. (Step 915.) However, if a player is determined to be eligible, the proper software for the host device is determined in step 905. This software may include gaming software and/or one or more software agents.

Preferred implementations of the invention provide software agents that can be used on a variety of different host devices, including but not limited to gaming machines, desktop computers, laptop computers, PDAs and cellular telephones. For each device type and software agent type, there may be software agents that can run on various platforms and according to various operating systems. Within the general class of software agents that can be executed on gaming machines, for example, there may be versions of software agents for IGT's AVP machines, versions of software agents for IGT's 960 machines, versions of software agents for WMS platforms, versions of software agents for Bally platforms, etc. When a player goes into a gaming establishment and selects a gaming machine that is configured to use such software agents, appropriate versions of software agents may be downloaded to the player's selected machine, if needed.

Therefore, the determination of step 905 should be based in part on the type of host device that a player desires to use for gaming. Such information may be obtained, e.g., from data received in the request of step 901 or in response to a query sent to the host device. For example, a software program (e.g., one running on a central server) could query the host device to determine its operating system, processor(s), available memory, what kind of wagering game it is running or is desired by a player, whether the machine already has player tracking capability or other relevant capabilities, what software agents, if any, the host device has, etc.

In some implementations of the invention, a software agent may be configured to provide necessary data for other devices and/or software agents, as described elsewhere herein. A software agent may also be configured to satisfy jurisdictional or harm minimization requirements. Accordingly, the determination of step 905 may also depend, at least in part, on a player's location.

Some such implementations of the invention provide method and devices for tracking the requirements of various jurisdictions, for determining the locations of host devices used for gaming and making sure that the software agents used on these host devices are in conformity with these requirements. Jurisdictional requirements may be obtained, for example, from a database maintained by game provider 805, maintained by one or more regulatory bodies, maintained by a central game services provider (such as IGT.com), or maintained by another service provider.

For example, a database may indicate that under Missouri law a player cannot lose more than $500 within a certain time period. If it has been determined that a player's host device has moved into Missouri, a compliance software agent could be downloaded or modified to ensure compliance with this requirement. In some such implementations of the invention, compliance software agents are maintained for multiple jurisdictions and are downloaded as needed.

Some implementations of the invention can provide more than one agent per player and/or per device. In some preferred implementations of invention, there is a unique ID number/code for each agent. The ID corresponds not merely with a particular type of agent, but a particular agent. In other words, for the same player and the same type of agent, the ID of the agent running on one of the player's host devices would be different from the ID of the corresponding agent running on another of the player's host devices. Each ID should be associated with a player, so that data for that player may be conveniently stored and associated, regardless of which host device the player is using for gaming.

For example, such data may be stored in one or more databases in one or more of the storage devices 837 of game provider 805. (See FIG. 8.) In addition to the functions described with reference to FIG. 8, such central databases and servers may perform various functions, including not only player tracking information gathering and usage, but also agent downloading, agent authentication, keeping track of which agents are running on which host devices, keeping track of which agents are authorized, expired or blacklisted, monitoring agent "heartbeats," etc.

Data from each agent running on each of the player's gaming devices can be associated in one or more such databases. One reason for this association is to have player tracking credit/points from game play on all of a player's host devices be aggregated in a player's player tracking account. However, many other types of data may be stored and evaluated. For example, data pertaining to indicia of cheating, collusion, etc., may be stored and evaluated in a central location and/or other locations. Methods for acquiring and using such data are described in detail in U.S. patent application Ser. No. 11/480,713, entitled "DETECTING AND PREVENTING BOTS AND CHEATING IN ONLINE GAMING" and filed on Jul. 3, 2006, which has been incorporated by reference herein.

Many features may be provided by reference to databases of information obtained from software agents, player tracking devices, etc. For example, such a database may be queried in order to determine whether gaming software is currently running on another of the player's known host devices. (Step 907.) Features of simplified data structures that may be used to implement some such aspects of the invention will now be described with reference to FIGS. 10A and 10B. One of skill in the art will appreciate that the number of fields, data indicated, etc., in the data structures shown and described herein is purely illustrative and that many other data structures could be used to implement various aspects of the invention. For example, one such data structure may comprise a table of appropriate software agents that is determined in step 905.

Figure 10A:
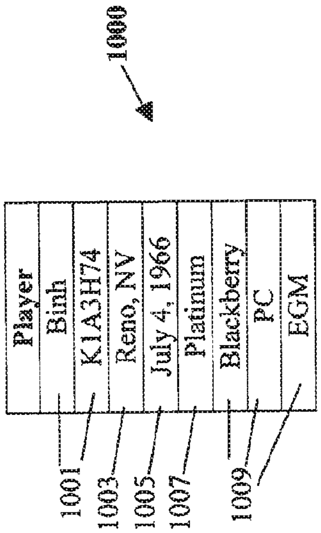
FIG. 10A is a simplified depiction of a data structure that may be used to implement some aspects of the invention.

FIG. 10A depicts a simplified data structure that contains information about a player who is registered to use various types of host devices for gaming. In this simple example, table 1000 includes a few basic types of player identification information. Fields 1001 include the player's name and an ID number. Field 1003 indicates the player's home address and field 1005 indicates the player's date of birth. Field 1007 states the player's level in a player tracking program and fields 1009 indicate host devices that are currently associated with the player.

Many other types of player identification information could be stored in table 1000 or in a cross-referenced data structure, including but not limited to biometric data (e.g., fingerprint, retinal scan, facial scan, voice characteristics, etc.), data to be used to verify responses to challenge questions (e.g., mother's maiden name, city of birth, first employer's name, nickname), etc. Moreover, details regarding the player's known host devices (e.g., operating system, processor(s), available memory, what kinds of wagering game software the host device is configured to execute, whether the machine already has player tracking capability or other relevant capabilities, what software agents, if any, the host device has, etc.) are preferably retained in table 1000 or in one or more other data structures.

Figure 10B:
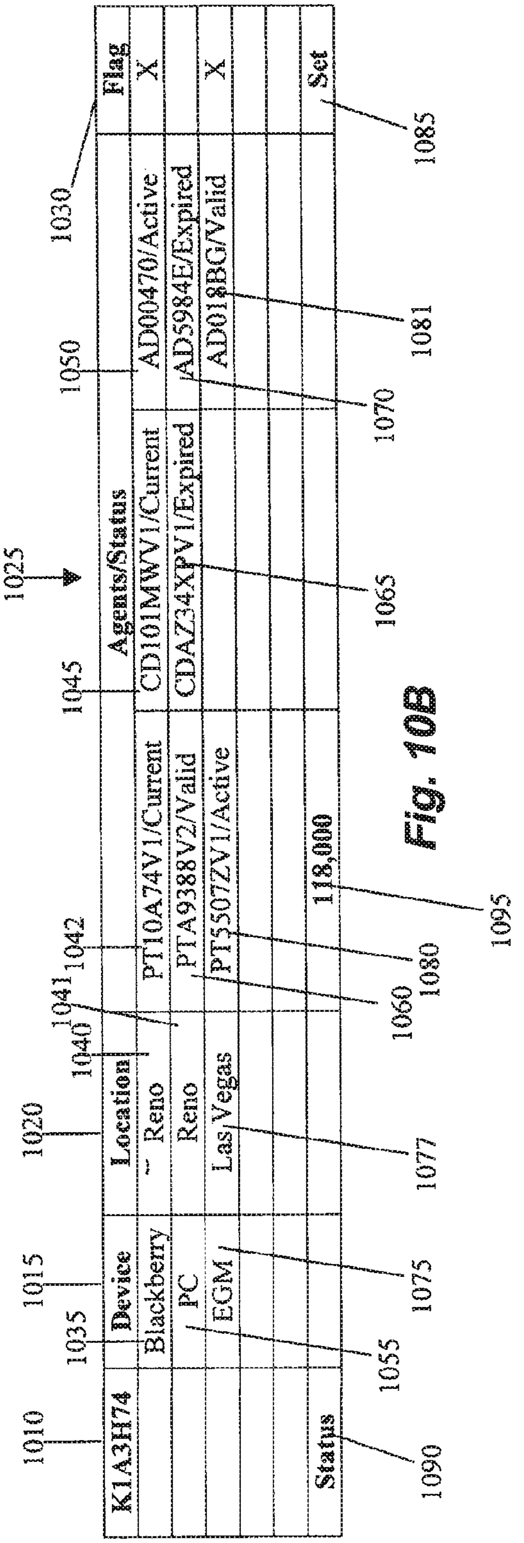
FIG. 10B is a simplified depiction of another data structure that may be used to implement some aspects of the invention.

In this example, some of this information is set forth in table 1002 of FIG. 10B. Table 1002 is associated with table 1000 according to the player's ID number, which is set forth in field 1010. The player's devices are indicated in column 1015 and the location corresponding to each device is stated in column 1020. Here, the player's Blackberry (cell 1035) and personal computer (cell 1055) are currently located in the player's home city of Reno (cells 1040 and 1041, respectively). Associating the player's software agents and host devices provides the ability to aggregate data from multiple software agents running on multiple host devices for, e.g., a cumulative point total in the player's player tracking account. (See cell 1095.)

Columns 1025 provide information regarding software agents that are currently associated with the player and the last known status of these software agents. Here, the player's personal computer was known to have a valid player tracking software agent PTA9388, version 2, but this player tracking software agent is not currently in use.

Cheating detection software agent CDAZ34XP, version 1, and advertising software agent AD5984E are both stored on the personal computer, but both are expired. According to some implementations of the invention, the personal computer will be instructed to delete such files, e.g., by a "vulture" software agent running on the personal computer or on another device, by game provider 805 the next time the player uses the personal computer for gaming, etc.

Player tracking software agent PT10A74, version 1, has previously been downloaded to the player's Blackberry. (Cell 1042.) Player tracking software agent PT10A74, version 1, has not yet expired. Cheating detection software agent CD101MW, version 1 (which is a current version), was also previously downloaded to the player's Blackberry. Advertising software agent AD00470 is presently active on the Blackberry.

However, there is evidence indicating that the player (or someone who purports to be the player) is also currently playing on an electronic gaming machine (cell 1075) in Las Vegas (cell 1077): player tracking software agent PT5507Z, version 1 (cell 1080), is currently tracking player activities on the electronic gaming machine. (At the time indicated, advertising software agent AD018BG is valid but not active on the electronic gaming machine.)

Accordingly, it is determined in step 907 that the ID of a player, who is attempting to play online poker via a host device in Reno, is also being used in association with concurrent game play on an electronic gaming machine in Las Vegas. This condition is indicated by the "flag set" status of table 1002. (See cell 1085 of FIG. 10B.)

Therefore, one or more countermeasures are enabled. (Step 913.) In some implementations of the invention, a countermeasure may comprise an investigation by a casino employee when, as here, one of the host devices is a gaming machine within a casino. If, as here, one of the devices is a mobile device, its location should already have been determined. The location should be compared with the location of the EGM to see if it is possible that the player is actually playing games on both devices at the same time. In this example, that could not be the case because the host devices are in different cities.

Alternatively, or additionally, countermeasures may include a text message, a telephone call, shutting down one or both devices, etc. Some countermeasures involve a requirement that a user of each device involved be re-identified according to a more stringent procedure. Other countermeasures involve a notice to a player's trusted host device or other device. For example, a player could arrange for an email or text message be sent to a PDA or cell phone when a desktop PC is being used for wagering games. The notification could be a contingent notification, e.g., after determining that the player's mobile device is not at the same location as a device where a player is gaming and using the player's ID. For example, if player's mobile device is not at his house but yet someone is playing wagering games on a PC at the player's house, the player would receive some form of notification.

In some situations, the countermeasure applied will end the process. (Step 915.) However, in order to describe other features of the invention, we will assume that the countermeasures applied resolve the situation and allow the process to continue. In step 909, it is determined whether the software (including but not limited to software agents, if any) already installed on the host device is adequate and/or valid. For example, in step 909 it may be determined whether the host device already has software for playing a desired wagering game and/or whether any such software already installed on the host device is properly licensed, the most current version, etc. Similarly, any software agents currently installed on the host device may be compared with a table of appropriate software agents that is determined in step 905.

The process of determining whether software, including but not limited to a software agent, is valid may be performed according to any convenient methods known in the art. For example, the methods set forth in U.S. patent application Ser. Nos. 10/225,116, 10/224,680, 10/224,699, 10/225,096 and 10/225,097, and in U.S. Pat. Nos. 5,643,086, 6,106,396, 6,149,552 and 6,620,047 and 7,063,615, which are incorporated by reference herein, may be used.

In this example, in step 909 it is determined that the player needs gaming software for providing an online poker game. Moreover, it is determined that cheating detection software agent that is specific to the online poker game would provide a higher level of performance than the previously-downloaded cheating detection software agent. These software agents are downloaded to the player's host device in step 911. Those of skill in the art will realize that software agents and the like may be distributed to host devices in ways other than downloading, e.g., by direct transfer from a storage medium such as a memory stick, an optical storage medium, etc.

Each time a software agent of consequence is downloaded, the central system preferably issues an identification number for the software agent. This step may be omitted for some low-level software agents, such as advertising software agents. Preferably, a software agent will be deleted, or at least revoked or cancelled, if one or more conditions occur. The condition may be a passage of time, a failure to report to another device for a predetermined period of time, etc. It is preferable to delete invalid software agents, but this will not always be possible. For example, it should be feasible to delete invalid software agents in controlled environments, such as gaming machines in a gaming establishment, but may not always be possible in uncontrolled environments. For example, if a cell phone or PDA is lost or is not in use for an extended time, the software agents will still be stored on the lost or unused device. However, even if invalid software agents are not erased, the central system should disregard any communications from them.

In this example, the cheating detection software agent that is downloaded in step 911 also provides other security-related features, including heartbeat emission and/or monitoring, to ensure that a host device and/or software agent has not been tampered with. For example, some such implementations involve a heartbeat (or the like) emitted by a software agent and verified by another device (and/or vice versa) as a condition for continued play. Heartbeats, or comparable systems, help to verify that a software agent is authentic and legitimate, and is not, e.g., improperly controlling a host device and/or sending bogus data to the central system.

Some such implementations of the invention involve "one-way" heartbeats, wherein a software agent in the host device either transmits a heartbeat to another device or "listens" for a heartbeat from another device. The other device may be a local device (e.g., another host device, a local server, a kiosk, etc.), a central device (e.g., a server of game provider 805 or of IGT.com) or an intermediate device (such as a device maintained by an ISP). Alternative implementations of the invention involve "two-way" heartbeats, wherein a software agent transmits a heartbeat and listens for a heartbeat. In other implementations involving "heartbeats" or the like, another software agent performs such functions, at least in part.

The heartbeat should be distinctive and is preferably associated with a single software agent. Preferably, the heartbeat is difficult to counterfeit. For example, some heartbeats may include a digital signature of a software agent. In alternative implementations of the invention, the heartbeat is irregular and changes over time in a manner that is known to the receiving device.

In some implementations of the invention a heartbeat changes each time a session is initiated and/or when other predetermined events occur. According to some such implementations, a new "heartbeat" software agent is downloaded prior to each gaming session. The software agent is configured to transmit and/or receive a heartbeat having characteristics that would be difficult for a player to determine in advance, such as heartbeat emission frequency, heartbeat pattern, heartbeat hashing/encryption information, or other characteristics.

In some such implementations, a pair of new heartbeat agents may be activated at predetermined times. One heartbeat agent will be executed by a trusted device (which may be a central device, a local device or an intermediate device) and the other heartbeat agent will be downloaded to, and executed by, a player's host device. The heartbeat agents will be configured for "one-way" or for "two-way" heartbeats of a characteristic type. If either of the heartbeat agents determines that a heartbeat is improper, countermeasures will be taken.

A host device architecture for implementing software agents preferably has the ability to start and stop a program (such as a downloaded software agent) without the need to re-boot. A software agent should be able to communicate with at least some other processes of the host device. At the least, a software agent should be able to receive information from one or more processes of the host device in order to, e.g., report gaming events.

Accordingly, in some implementations of the invention, a software agent communicates with other processes running on a host device via a generic interface. This interface could include functions such as (1) access to a list of what other processes and process IDs are registered to receive predetermined events/information and (2) a way of registering to receive such events/information. In some implementations of the invention, higher-level software agents can send and/or receive types and/or combinations of information that are not predetermined. Building in such flexibility is desirable for software agent functionality.

However, safeguards should be put in place so that rogue software agents cannot create havoc. Preferably, a downloaded software agent is authenticated and is registered to indicate what sort of information that it will be receiving. In an event-driven system such as AVP or Windows, an event (e.g., a mouse click, the insertion of a disc, the downloading of software, etc.) can be communicated or "distributed" to various processes, including the software agent's. The software agent may register to receive events and/or register to communicate with other processes.

For security purposes, each process that supports an interface should specify explicitly what other processes are allowed to use that interface. For example, a bill validator of a gaming machine may indicate that the only process that can tell the bill validator to start accepting bills, to receive notification that bills have been accepted, etc., would be a banking manager program. This should prevent a rogue software agent from telling the bill validator, e.g., to start accepting $1 bills and reporting them as $20 bills. On the other hand, game software may expose an interface and may allow any authenticated software process to tap into it, receive events, numbers and other data regarding a game.

One method of authenticating and registering software agents is outlined in the flow chart of FIG. 9B. In step 921, a host device receives downloaded software, which includes one or more software agents of the present invention. Before allowing a software agent to register or execute, the host device evaluates the software agent and prepares a report regarding the software agent for a trusted device, e.g., a central server. (Step 923.) In essence, the host device asks the trusted device, "Should I run this?"

For example, a software program running on the host device may determine the software agent's name and size, hash the software agent's contents, and report the name, size and hashed contents to the trusted device. (Step 925.) The host device preferably identifies itself and may include information about itself (e.g., operating system used, memory available, etc.). Alternatively, this additional information may already be stored/known by the trusted device.

In this example, the trusted device first determines the validity of the software. (Step 927.) If the software is not valid, the host device is instructed to delete the software. (Step 929.) A validation step comparable to that of step 927 may be taken more than once, e.g., prior to game play and during "spot checks" at predetermined or random times. In some implementations of the invention, such spot checks are an alternative to a heartbeat process.

If the software is valid, the trusted device then determines whether the software agent is intended for, or appropriate for, the host device. (Step 931.) For example, the trusted device may access a list of software agents and player IDs in order to determine which software agents are appropriate for the player and the host device. The trusted device may access an event log (or the like) indicating whether software was recently downloaded to the host device from a trusted source, if so what software, whether this software has previously been registered, etc.) If the trusted device cannot verify that the software agent is appropriate for/intended for the host device, the host device is instructed to delete the software. (Step 929.)

If the trusted device approves the software, an approval message is sent to the host device. (Step 933.) The software is registered, preferably at the host device level and in a central database. (Step 934.) For example, one or more data structures such as those described with reference to FIGS. 10A and 10B may be updated. The host device then may load and execute the software (step 935).

FIG. 9C is a flow chart that outlines method 950 for using downloaded game software and software agents. In optional step 952, it is determined whether enough players are currently available to play a requested type of game. In this example, the requesting player desires to play online poker with other human players, so step 952 is necessary. If there are sufficient players available, online games will be provided to eligible players. (Step 955.) If not, the player may be asked to wait. (Step 954.)

As a game is provided, players' gaming data are collected and analyzed. (Step 960.) Some implementations of the invention involve the tracking and analysis of gaming data that includes, but is not limited to, the following: response time, win frequency, win amount, time spent playing, game play decisions and wagering decisions. A player's responses and other gaming data are preferably tracked over a period of time.

In some implementations of the invention, step 960 may be performed, at least in part, by a software agent that can access an interface in a game and start gathering information about the style of play. In this example, a one-way or two-way "heartbeat" checking process is employed to ensure that the player tracking software agent is functioning properly and has not been tampered with. In some implementations of the invention, the player tracking agent also performs at least some degree of data analysis.

For example, some implementations compare a player's game play decisions with a "perfect" game play strategy. A player's style of play may be determined and categorized, including but not limited to the percentage of the time a player makes optimal game play decisions, the length of typical gaming sessions, typical wagering amounts, etc. A normal variation in one or more such factors may be determined so that abnormal instances of game play can be determined.

Accordingly, some implementations of the invention involve calculating a player's characteristic percentage of optimal decision-making, a player's characteristic range of deviation from this characteristic percentage, a player's characteristic range of deviation from perfect game play, or similar values. For example, a player may tend to make optimal decisions 90% of the time, on average, but the player may have made optimal decisions during 95% of a particular gaming session, during only 87% of another gaming session, etc. A player's characteristic range of deviation may be, for example, a standard deviation, two standard deviations, etc. A player may tend, for example, to deviate gradually from perfect play as the player plays for an increasing length of time. If a player is suddenly playing at a level quite different from his or her historical range, this indicates that something is awry.

We would expect a bot's response time to be very consistent unless it has been programmed otherwise. Humans are not that consistent. We would expect a person's response time to vary within a predetermined range of an average response time.

Therefore, another metric that can be logged, stored and evaluated is a player's response time. A player's response time should vary, but players may tend to be faster or slower than others. A player's average response time and characteristic range of deviation from the average response time may be determined.

Some methods of the invention involve skill level classification, which may involve player classification and/or bot classification. For example, games (including but not limited to poker games) may be organized by skill level. Players could be grouped with other players at a similar skill level. Players who play at a higher level and/or win more would not be able to prey on beginners.

The data collection and analysis may be performed by a single device or by multiple devices. Some implementations of the invention provide a multi-tier approach to data collection and/or analysis, wherein data gathering and/or collection tasks are distributed among multiple devices. Certain types of data may be collected and/or analyzed at a central location and other types of data may be collected and/or analyzed at a host device, such as a player's host device. As described in more detail below, some methods of the invention are performed, at least in part, by software installed on a player's host device (e.g., downloaded to a player's computer or the like).

In some implementations, game data are gathered by each host device during each gaming session. At the end of each session, these data are associated with a player and a host device, are time-stamped and are transmitted to a central storage device. Preferably, the data are compressed and hashed, for efficient data storage and to allow authentication. A copy is preferably retained on the host device (or an associated storage device).

In step 970, gaming data are evaluated for indicia of cheating. Many types of gaming data may be evaluated for indications of cheating within the scope of the invention. Preferably, data involving multiple variables are analyzed in order to increase the likelihood of correct determinations. For example, consistently perfect or nearly-perfect game play suggests that a player is actually a bot (or is using a bot or similar software). However, if the player also has a consistently small response time and can play for long time periods without making an error, the player is even more likely to be a bot.

One way to detect a bot by using a multi-variable analysis is to detect play that indicates a precise calculation of "pot odds" and related odds (such as implied odds and reverse implied odds) in a poker game. These odds which can be difficult for a human being to compute; it is very unlikely that a person could quickly and consistently determine such odds accurately.

Pot odds are a ratio of how much money is already in a pot compared to the amount of money a player would have to put in the pot in order to remain in a hand. For example, if the pot is currently $150 and a player must put in $15 to remain in the hand, the pot odds are 150 to 15 or 10 to 1.

Ideally, the pot odds should be compared to the odds of winning a hand, which involves a determination of "implied odds" and "reverse implied odds." "Implied odds" are the odds that take into account future bets. "Reverse implied odds" and "redraws" involve the chance that a player will achieve a desired hand after a draw, but will still lose the hand. If the player thinks that the odds of achieving what the player believes would be a winning hand are less than the pot odds (e.g., 1 in 5 in this example), the player should stay in the game.

Therefore, an accurate determination of pot odds involves both wagering data and play level data. Moreover, if a player's response time is consistent and small when complex pot odd calculations (or similar calculations) are required, the player is probably a bot (or using a bot).

An alternative indication of cheating could be indicated when an evaluation of a player's strategy indicates that the player is very consistently following a complex rule set, suggesting that a program/bot is actually making the decisions. Such methods are particularly effective in "corner cases" wherein the application of a simple rule set (one that a normal human might use) would indicate one response, but a more sophisticated mathematical analysis would indicate another response.

For example, if the player is dealt a pair of face cards and three cards to a royal flush, it is difficult to decide between going for the royal flush or just keeping the pair of face cards. Some players think the "safe" thing to do is hold the pair and draw three more cards for a chance at three of a kind, four of a kind or a full house. However, a mathematical analysis reveals that many poker games provide better long-term rewards for going for the royal flush. The actual corner cases that exist will vary from one type of game to the next, so that even if a player has memorized the best strategies for one type of game, he will unknowingly make some suboptimal choices in another very similar type of game. Therefore, some methods of the invention involve detecting such corner cases and determining whether a player is consistently making responses that only a computer program would be likely to make.

In step 970, it is determined whether indicia of cheating have been detected. This determination may be made by a central computing device, e.g., one associated with game provider 805, and/or by a device in another location, such as a player's host device. If no indicia of cheating have been detected, play may continue as before (step 980).

However, if an indicium of cheating has been detected, cheating countermeasures are invoked (step 975). The term "cheating countermeasures" (and the like) is used herein to mean not only measures taken when cheating is indicated, but also measures taken when cheating or another irregularity is suspected. The severity of the countermeasures should be commensurate not only with the degree and type of cheating indicated, but also with the degree of certainty associated with the indication(s). For example, if there are preliminary indications of bot use for the purpose of cheating, a display may be used that is believed to be more difficult for bots to interpret, the display type may be changed more frequently, etc. On the other hand, if there is a very high probability that cheating has occurred and is ongoing, a player may be prevented from further play, assessed a monetary penalty, etc. Certain users, software and/or devices may be "blacklisted" and tracked. Information about blacklisted players and/or devices may be provided to other entities, possibly for a price.

The detection of a bot would not necessarily result only in some sort of penalty. For example, some implementations require bots to play in "bot rooms" wherein player's bots can compete against one another. For example, game provider 105 could assess a penalty against a person whose bot is caught competing against humans, but could actually facilitate bot-against-bot play. A game provider could even enable bot-against-bot tournaments. Some programmers have a great deal of pride in their work and may be very interested to determine how their bots would fare in such a tournament.

Some implementations of the invention require responses to audio and/or visual information in order to continue participating in a game. For example, a player may be required to respond correctly to a spoken question or command. A player may be prompted to perform an action to prove he or she is not a bot ("Wave at the camera," "Stick out your tongue," "Raise your right pinky," "Make a fist," etc.). The actions could be, e.g., recorded on a webcam and transmitted to a central location for evaluation. The prompt is preferably in a form that would be difficult for a bot to detect (audio, hashed writing, etc.).

In some implementations of the invention, such requirements are countermeasures that are invoked when cheating is suspected. In such implementations, these types of "challenge and response" measures will be used only when (or will be used more frequently when) indicia of cheating have been detected and/or when a player is determined to be playing abnormally.

For example, if a player is using another player's host device, the new player's play characteristics may be sufficiently different to allow detection. An appropriate countermeasure might be to query the player, require identification, etc., to determine whether it is the same player or is at least an authorized player. Accordingly, some methods of the invention can help to verify that an under-age player is not using an older player's ID, password and/or host device for online gaming.

In some alternative implementations, such requirements are implemented whether or not cheating is suspected. New actions may be required on a regular basis. A player could be required to leave a webcam on continuously during play, with the understanding that the player could be randomly monitored at any time. However, such requirements may not be popular with players.

Some required responses could be built into game play, to avoid distracting a player or breaking a player's concentration. For example, instructions about game play could be given orally or in another form that would be difficult for a bot to interpret (e.g., "You are not allowed to raise at this point"). A human player would be able to respond appropriately, but a bot would probably not respond appropriately. In some implementations, the accent used for voice instructions is changed from time to time, because such changes are very challenging for voice recognition software.

Having an audio link between players could also help to root out bots. In some instances of game play, players will speak with various types of accents and possibly in various languages. If a player never speaks or never responds appropriately, the player is likely to be a bot. Players would have a vested interest in making sure they are playing against other humans. Players could report suspicious responses to a central game administrator. The administrator could provide various types of countermeasures, including any of the above detection/authentication methods, watching for other indications of a bot, etc. The administrator could send a message to other players, such as "BOT DETECTED" or the like. Such a notice would give other players a chance to leave the game. The administrator could terminate a cheater's activity.

Some cheating detection methods are more resource-intensive than others. Given the high volume of activity and the large number of players involved in online gaming, selective application of cheating detection methods may be desirable.

Therefore, some implementations of the invention involve multi-tiered detection methods, wherein one level of data analysis may trigger another level of data analysis. In some such implementations, the analyses may be distributed over multiple devices.

Some such data collection and analyses may be more resource-intensive and may, therefore, be performed (at least in part) by devices other than a centralized computing device. For example, data gathering and/or analysis may be performed by software running on the host devices used by players, e.g., for Internet wagering games. The software may be provided, e.g., along with the software necessary for participating in Internet wagering games. Preferably, such software will need to be authenticated prior to or during each gaming session by a digital signature, a "heartbeat," etc.

The player tracking software agent may gather and cache information locally. In some preferred implementations, the software agent accesses these data, hashes the data and sends the hash to a central device (e.g., a server or a storage device of game provider 805) at predetermined time intervals and/or upon the occurrence of predetermined events. The central device receives the hash and stores it. (Step 985.) If these data need to be accessed (e.g., if there is an audit of the player's gaming activities), one could retrieve the hashed data, calculate the hash and determine whether the data are valid. In some implementations, the hash (and/or other data) may be transmitted to an intermediate device such as a local server, etc. According to some implementations, one or more software agents (e.g., the player tracking agent) may be deleted at the end of a gaming session.

Some implementations of the invention provide software agents that can to communicate with one another. Depending on the intelligence and permission level of the software agents, such processes can facilitate negotiation and/or cooperation between software agents, e.g., as described below.

In order for two programs to communicate with one another, each has to know that the other exists. As noted above, some such software agents can determine "who else" (process or person) is receiving various types of information/events from one or more interfaces of a host device and can obtain an address for communicating with these processes. Any process known in the art that provides the ability to distinguish uniquely one software agent from another, such as "COM" (component object modeling) or "IPC" (inter-process communication), may be employed in this regard. Such methods of the invention provide an event distribution program that indicates a menu of choices indicating what a software agent is allowed to do, e.g., what functions may be called and what data may obtained.

Figure 11:
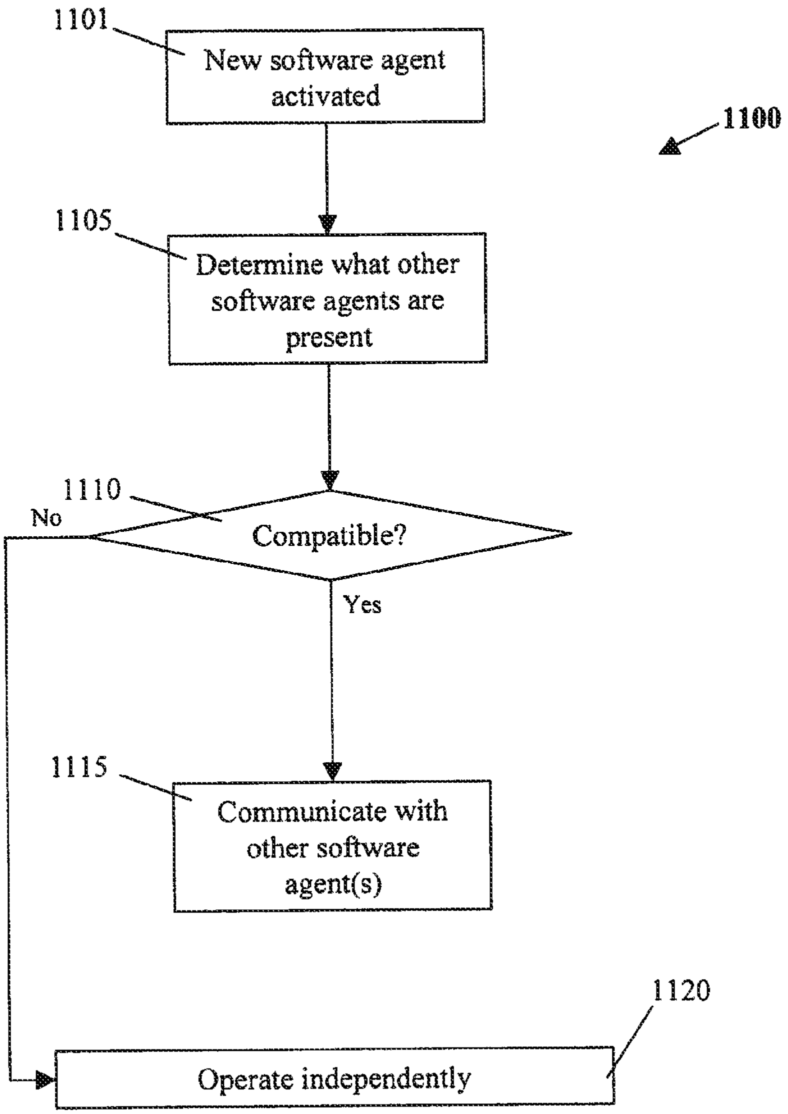
FIG. 11 is a flow chart that outlines other methods of the invention.

Referring now to FIG. 11, some examples of inter-agent communication will be described. In step 1101 of method 1100, a new software agent is activated on a host device. In this discussion, the new software agent will be called "software agent 2." Software agent 1 has been previously downloaded to the host device. In this example, software agent 2 is an advertising software agent and software agent 1 is a player tracking software agent. Software agent 1 has been obtaining player tracking information about a player for some time.

In step 1105, software agent 2 determines what other programs, including software agents, are currently running on the host device. The host device is running an event distribution program that is configured to access a list of other programs that are running and to provide information about such processes. Accordingly, software agent 2 determines that software agent 1 is a player tracking agent that has been gathering player and gaming information.

Software agent 2 may be able to make use of some such information, if accessible. For example, software agent 2 might seek to obtain information from software agent 1 regarding how often the player plays, games the player likes, wager amounts, etc. The player tracking software agent (software agent 1) might even have been gathering information regarding advertisements to which a player has responded and what actions the player took in response (e.g., was a product or service purchased, how much time and/or money was spent in response, etc.), even though the player tracking software agent (software agent 1) may not previously have reported or used this information. Software agent 2 may be able to target advertising to the player according to such information, even though software agent 2 was only downloaded a short time beforehand.

However, software agent 2 may or may not be able to obtain such information from software agent 1, depending on their level of compatibility. Therefore, in step 1110, software agent 2 determines the extent to which it and software agent 1 are compatible. For example, software agent 2 might ask whether software agent 1 is a particular software agent, e.g., according to its type and/or individual ID number. Software agent 2 may wish to know, for example, whether software agent 1 is an IGT software agent and whether both were meant to be compatible with one another and/or to work together to perform predetermined functions: "Are you an IGT wager-level tracker software agent?" Such compatibility would allow the software agents to communicate and/or cooperate in more detail.

Software agent 2 may also query whether software agent 1 supports a particular level of interface, e.g., a "wager level interface" that indicates how much a player is wagering. The version level could also be queried/determined; certain versions may support functionality that others do not. In one example, IGT wager-level tracker software agent version 1 tracks the amount wagered, whereas IGT wager-level tracker software agent version 2 also has the intelligence to determine "streaks" of play, e.g., this player plays a lot of money, but only plays on 3-day weekends.

If such information can be obtained from software agent 1, software agent 2 does so. (Step 1115.) Software agent 2 may, for example, use this information to target advertising to the player. Software agent 2 could, e.g., determine when 3-day weekends will occur and target offers to the player regarding opportunities/offers involving such times. The offers could be timed/scheduled in advance of such long weekends.

If software agent 2 and software agent 1 are not compatible, software agent 2 operates independently. (Step 1120.) In this case, software agent 2 may require other software agents to obtain the types of information it needs for optimal performance. If, for example, the player's host device is not running a compatible player tracking software agent, some implementations of the invention will cause such a software agent to be downloaded.

Some methods of the invention are implemented between local devices and/or host devices, e.g., in a "peer to peer" fashion. Some implementations of the invention provide a local security software agent for multiple devices. For example, one host device may execute a security program that is required by a second host device in order to log into the network. Instead of communicating with a server, the second host device communicates with a program running on the first host device.

In some such implementations, one player tracking software agent gathers information from game play on multiple host devices. Such implementations are suitable for, e.g., a local network with a trusted device that executes the player tracking software agent.

Alternative implementations use peer-to-peer methods to form queries between host devices, e.g., to determine what software agents they are running, evaluate game play, etc. For example, a first host device may authenticate a second host device, the second host device may authenticate a third host device, whereas the third host device may authenticate the first host device. In this fashion, it would be difficult for one player to execute a corrupt or hacked software agent without at least one of the other players' host devices knowing.

Some such implementations are designed for collusion detection. In some such implementations, some or all of the player tracking and/or security software agents of players participating in an on-line poker game are in communication with one another and evaluating the other players' responses.

Alternative implementations provide a carousel or similar grouping of player devices, with one device acting as a host. Peer-to-peer methods provide efficient ways to distribute many copies of a new, low-level and non-secure software agent, e.g. an advertising agent.

Some gaming networks described herein include a central system that is configured to download game software and data to networked gaming machines. The game theme of a particular networked gaming machine (or a group of networked gaming machines) may be changed according to instructions received from the central system. Such gaming networks allow for the convenient provisioning of networked gaming machines and allow additional game themes to be easily and conveniently added, if desired. Related software, including but not limited to game software, may be downloaded to networked gaming machines.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some exemplary gaming networks and devices are below.

Exemplary System Architecture

Figure 12:
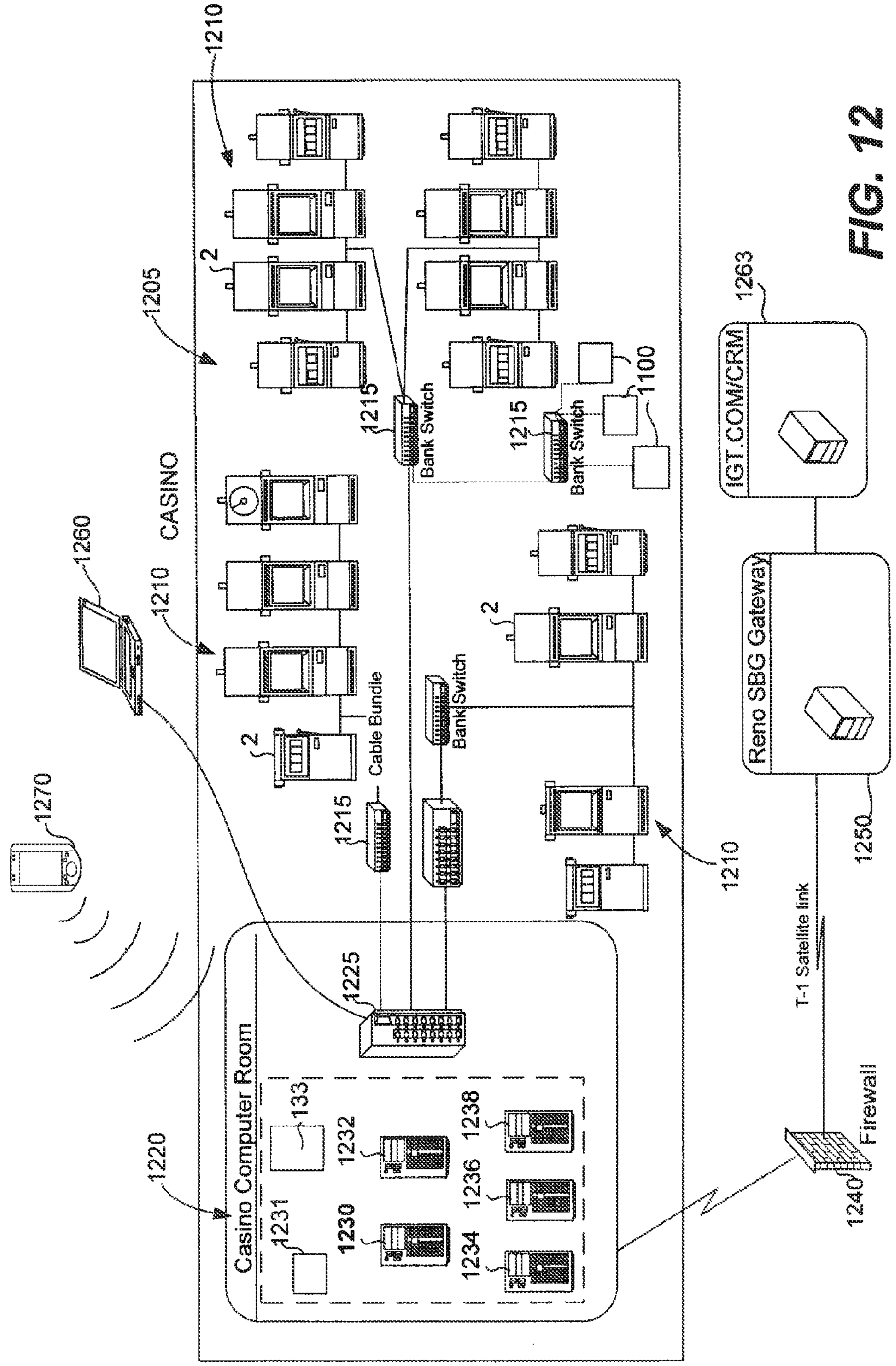
FIG. 12 illustrates one example of a network topology for implementing some aspects of the present invention.

One example of a network topology for implementing some aspects of the present invention is shown in FIG. 12. Those of skill in the art will realize that this exemplary architecture and the related functionality are merely examples and that the present invention encompasses many other such embodiments and methods. Here, for example, a single gaming establishment 1205 is illustrated, which is a casino in this example. However, it should be understood that some implementations of the present invention involve multiple gaming establishments.

Gaming establishment 1205 includes 16 gaming machines 2, each of which is part of a bank 1210 of gaming machines 2. In this example, gaming establishment 1205 also includes a bank of networked gaming tables 1100. It will be appreciated that many gaming establishments include hundreds or even thousands of gaming machines 2 and/or gaming tables 1100, not all of which are included in a bank. However, the present invention may be implemented in gaming establishments having any number of gaming machines, gaming tables, etc.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 1225, which combines switching and routing functionality in this example) and/or the inclusion of other network devices not shown in FIG. 12. For example, some implementations of the invention include one or more middleware servers disposed between gaming machines 2 and server 1230. Such middleware servers can provide various useful functions, including but not limited to the filtering and/or aggregation of data received from bank switches 1215, from individual gaming machines and from other player terminals. Some implementations of the invention include load balancing methods and devices for managing network traffic.

Each bank 1210 has a corresponding bank switch 1215, which may be a conventional bank switch. Each bank switch is connected to server-based gaming ("SBG") server 1230 via main network device 1225, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 1230, License Manager 1231, Arbiter 133, servers 1232, 1234, 1236 and 1238, and main network device 1225 are disposed within computer room 1220 of gaming establishment 1205. In practice, more or fewer servers may be used. Some of these servers may be configured to perform tasks relating to player tracking, bonusing/progressives, etc. Some servers may be configured to perform tasks specific to the present invention. License Manager 1231 may also be implemented, at least in part, via a server or a similar device. Some exemplary operations of License Manager 1231 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 1230 can also be configured to implement, at least in part, various aspects of the present invention. Some preferred embodiments of SBG server 1230 and the other servers shown in FIG. 12 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 1231, servers 1232, 1234, 1236 and 1238, and main network device 1225) are mounted in a single rack with SBG server 1230. Accordingly, many or all such devices will sometimes be referenced in the aggregate as an "SBG server." However, in alternative implementations, one or more of these devices is in communication with SBG server 1230 and/or other devices of the network but located elsewhere. For example, some of the devices could be mounted in separate racks within computer room 1220 or located elsewhere on the network. For example, it can be advantageous to store large volumes of data elsewhere via a storage area network ("SAN").

In some embodiments, these components are SBG server 1230 preferably has an uninterruptible power supply ("UPS"). The UPS may be, for example, a rack-mounted UPS module.

Computer room 1220 may include one or more operator consoles or other host devices that are configured for communication with SBG server 1230. Such host devices may be provided with software, hardware and/or firmware for implementing various aspects of the invention; many of these aspects involve controlling SBG server 1230. However, such host devices need not be located within computer room 1220. Wired host device 1260 (which is a laptop computer in this example) and wireless host device (which is a PDA in this example) may be located elsewhere in gaming establishment 1205 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 13:
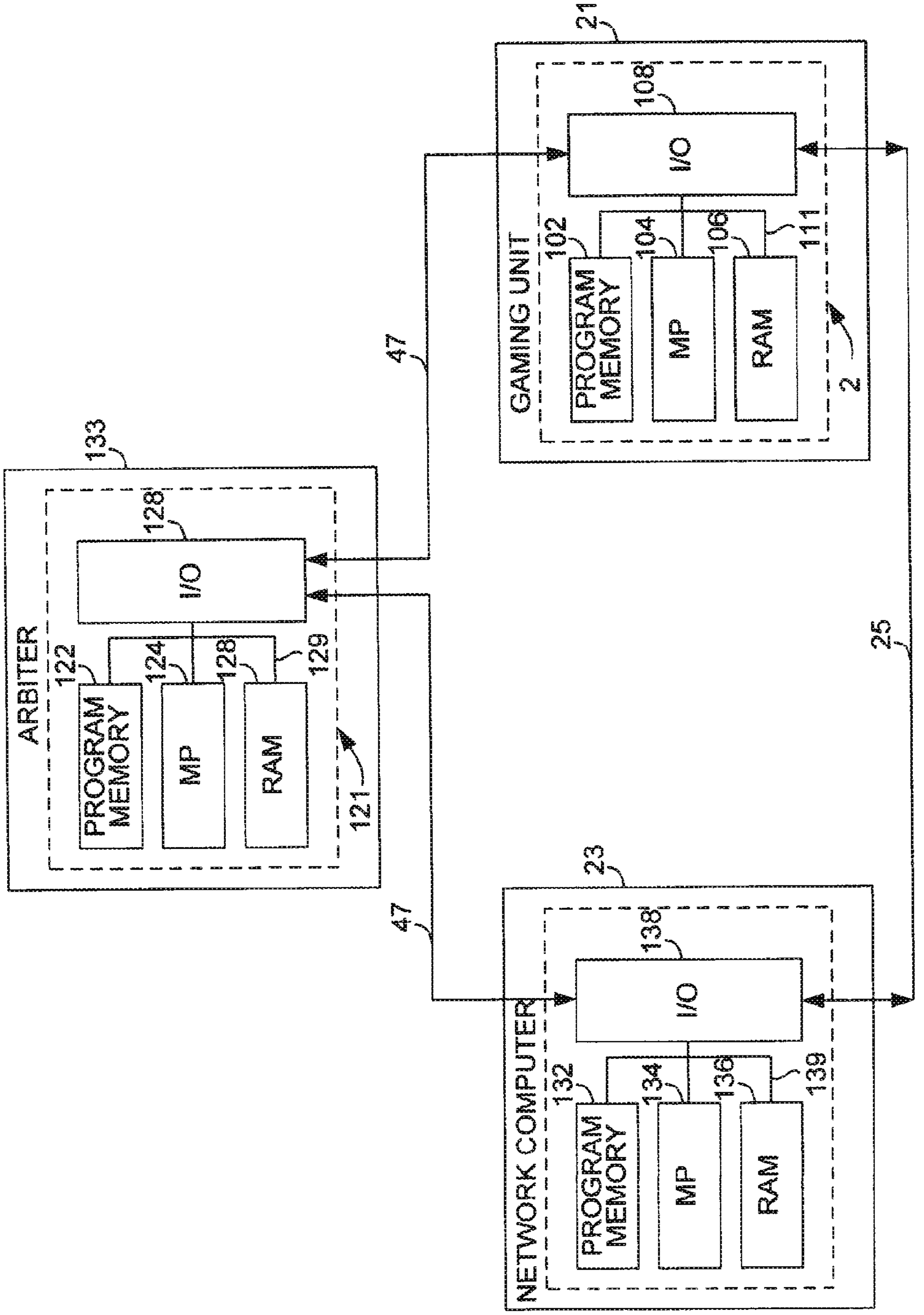
FIG. 13 is a block diagram that illustrates a simplified network topology for some implementations of an Arbiter.

FIG. 13 is a block diagram of a simplified communication topology between a gaming unit 21, the network computer 23 and the Arbiter 133. Although only one gaming unit 21, one network computer 23 and one Arbiter 133 are shown in FIG. 13, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 133 may be used for secure communications among a plurality of network computers 23 and tens, hundreds or thousands of gaming units 21. Likewise, multiple gaming security arbiters 46 may be utilized for improved performance and other scalability factors.

Referring to FIG. 13, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 13 as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 13 may each comprise multiple address/data buses, which may be of different types, and there may be an I/O circuit disposed between the address/data buses.

As shown in FIG. 13, the gaming unit 21 may be operatively coupled to the network computer 23 via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the

Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 12, one or more network devices in gaming establishment 1205 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 1205 and the outside world should only be made with trusted devices via a secure link, e.g., via a virtual private network ("VPN") tunnel. For example, the illustrated connection between SBG 1230, gateway 1250 and central system 1263 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN.

VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN #0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 1263 (in this example, IGT.com) to obtain the account information such as the customer's current and prior account status.

Moreover, such a secure connection may be used by the central system 1263 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 1263 may notify a local SBG server regarding new products and/or product updates. For example, central system 1263 may notify a local SBG server regarding updates of new gaming software, gaming software updates, peripheral updates, the status of current gaming software licenses, etc. In some implementations of the invention, central system 1263 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 1263 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 1263 and the gaming establishments.

Figure 14:
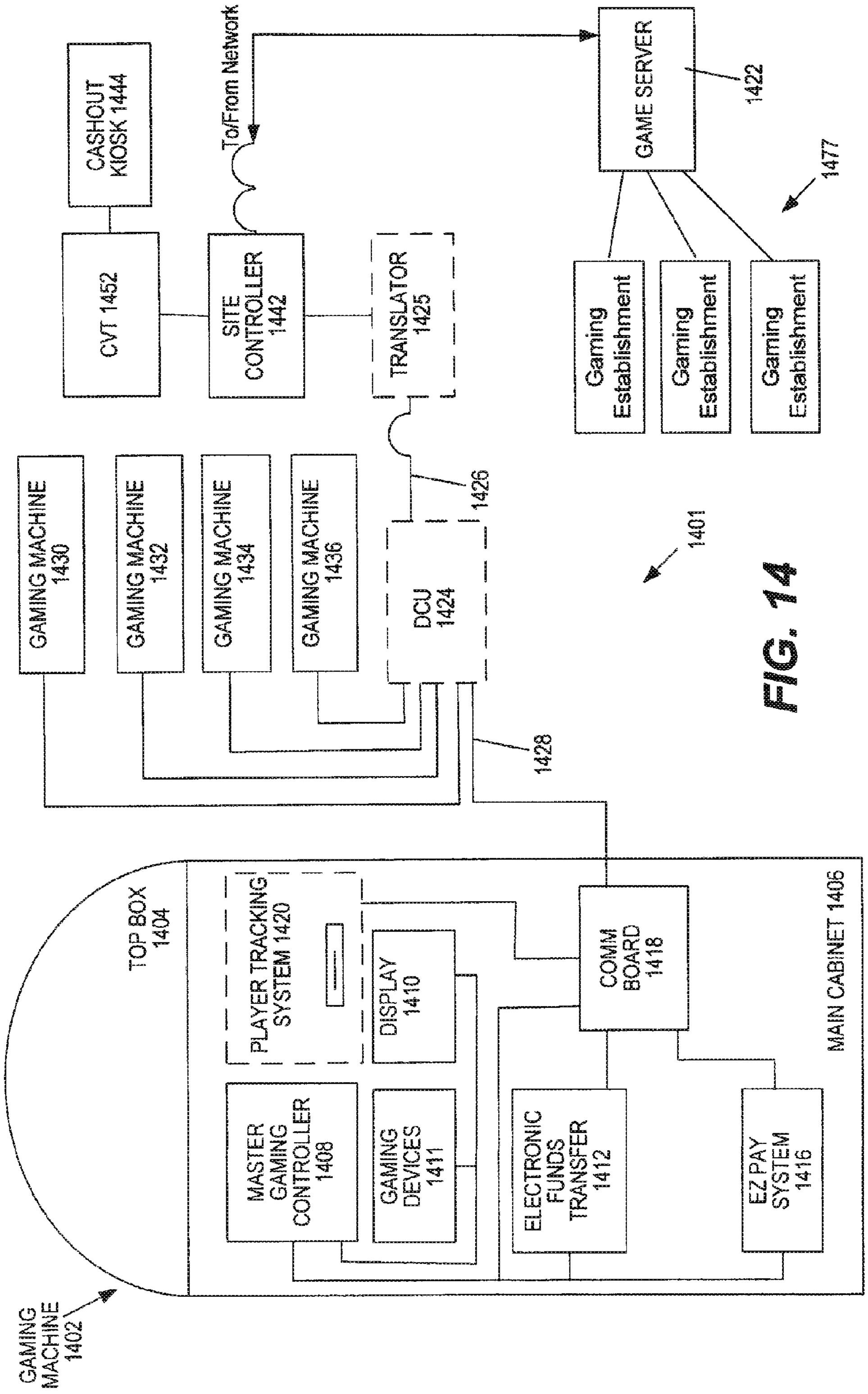
FIG. 14 illustrates a gaming machine and a gaming network that may be configured according to some aspects of the invention.

A gaming network that may be used to implement additional methods performed in accordance with embodiments of the invention is depicted in FIG. 14. Gaming establishment 1401 could be any sort of gaming establishment, such as a casino, a card room, an airport, a store, etc. In this example, gaming network 1477 includes more than one gaming establishment, all of which are networked to game server 1422.

Here, gaming machine 1402, and the other gaming machines 1430, 1432, 1434, and 1436, include a main cabinet 1406 and a top box 1404. The main cabinet 1406 houses the main gaming elements and can also house peripheral systems, such as those that utilize dedicated gaming networks. The top box 1404 may also be used to house these peripheral systems.

The master gaming controller 1408 controls the game play on the gaming machine 1402 according to instructions and/or game data from game server 1422 or stored within gaming machine 1402 and receives or sends data to various input/output devices 1411 on the gaming machine 1402. In one embodiment, master gaming controller 1408 includes processor(s) and other apparatus of the gaming machines described above in FIGS. 6 and 7. The master gaming controller 1408 may also communicate with a display 1410.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking Therefore, master gaming controller 1408 may also communicate with EFT system 1412, EZPay™ system 1416 (a proprietary cashless ticketing system of the present assignee), and player tracking system 1420. The systems of the gaming machine 1402 communicate the data onto the network 1422 via a communication board 1418.

It will be appreciated by those of skill in the art that embodiments of the present invention could be implemented on a network with more or fewer elements than are depicted in FIG. 14. For example, player tracking system 1420 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1424 and translator 1425 are not required for all gaming establishments 1401. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1442 provides this function for gaming establishment 1401. Site controller 1442 is connected to a central system and/or other gaming establishments via one or more networks, which may be public or private networks. Among other things, site controller 1442 communicates with game server 1422 to obtain game data, such as ball drop data, bingo card data, etc.

In the present illustration, gaming machines 1402, 1430, 1432, 1434 and 1436 are connected to a dedicated gaming network 1422. In general, the DCU 1424 functions as an intermediary between the different gaming machines on the network 1422 and the site controller 1442. In general, the DCU 1424 receives data transmitted from the gaming machines and sends the data to the site controller 1442 over a transmission path 1426. In some instances, when the hardware interface used by the gaming machine is not compatible with site controller 1442, a translator 1425 may be used to convert serial data from the DCU 1424 to a format accepted by site controller 1442. The translator may provide this conversion service to a plurality of DCUs.

Further, in some dedicated gaming networks, the DCU 1424 can receive data transmitted from site controller 1442 for communication to the gaming machines on the gaming network. The received data may be, for example, communicated synchronously to the gaming machines on the gaming network.

Here, CVT 1452 provides cashless and cashout gaming services to the gaming machines in gaming establishment 1401. Broadly speaking, CVT 1452 authorizes and validates cashless gaming machine instruments (also referred to herein as "tickets" or "vouchers"), including but not limited to tickets for causing a gaming machine to display a game result and cash-out tickets. Moreover, CVT 1452 authorizes the exchange of a cashout ticket for cash. These processes will be described in detail below. In one example, when a player attempts to redeem a cash-out ticket for cash at cashout kiosk 1444, cash out kiosk 1444 reads validation data from the cashout ticket and transmits the validation data to CVT 1452 for validation. The tickets may be printed by gaming machines, by cashout kiosk 1444, by a stand-alone printer, by CVT 1452, etc. Some gaming establishments will not have a cashout kiosk 1444. Instead, a cashout ticket could be redeemed for cash by a cashier (e.g. of a convenience store), by a gaming machine or by a specially configured CVT.

Figure 15:
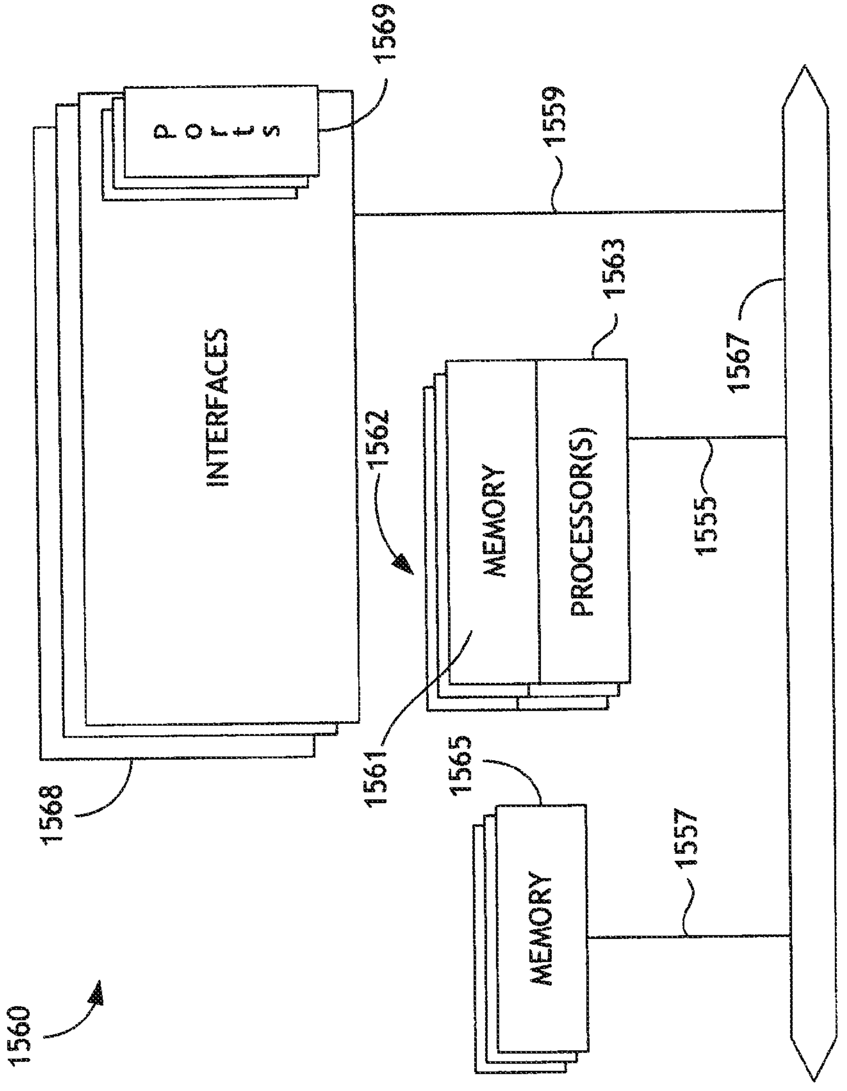
FIG. 15 illustrates a network device that may be configured according to some aspects of the invention.

FIG. 15 illustrates an example of a network device that may be configured for implementing some methods of the present invention. Network device 1560 includes a master central processing unit (CPU) 1562, interfaces 1568, and a bus 1567 (e.g., a PCI bus). Generally, interfaces 1568 include ports 1569 appropriate for communication with the appropriate media. In some embodiments, one or more of interfaces 1568 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1568 control such communications-intensive tasks as encryption, decryption, compression, decompression, packetization, media control and management. By providing separate processors for the communications-intensive tasks, interfaces 1568 allow the master microprocessor 1562 efficiently to perform other functions such as routing computations, network diagnostics, security functions, etc.

The interfaces 1568 are typically provided as interface cards (sometimes referred to as "linecards"). Generally, interfaces 1568 control the sending and receiving of data packets over the network and sometimes support other peripherals used with the network device 1560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1562 may be responsible for implementing specific functions associated with the functions of a desired network device. According to some embodiments, CPU 1562 accomplishes all these functions under the control of software including an operating system and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

Regardless of the network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 15) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A method, comprising:

obtaining, at a server, first gaming information regarding a first player's Internet wagering games from a first software agent executing on a first gaming device, and obtaining, at the server, second gaming information regarding the first player's Internet wagering games from a second software agent executing on a second gaming device;

combining at least some components of the first gaming information and the second gaming information;

crediting a player tracking account of the first player based on the combination of at least some components of the first gaming information and the second gaming information determining consistency of game play reaction time of the first player;

determining whether the first gaming device or the second gaming device is being played according to the consistency of game play reaction time; and invoking one or more countermeasures affecting game play when it is determined that the first gaming device or the second gaming device is not being played according to the consistency of game play reaction time.

2. The method of claim 1, wherein the second gaming device is disposed within a gaming machine of a gaming establishment.

3. The method of claim 2, wherein the second gaming device is a wireless device.

4. The method of claim 1, wherein the first gaming device and the second gaming device are in locations other than gaming establishments.

5. The method of claim 1, further comprising the step of determining a first playing style of the first player.

6. The method of claim 5, wherein the first playing style is based on at least one of play consistency indicia, reaction time indicia, wagering indicia, length of play indicia, frequency of play indicia, game preference indicia, win frequency indicia, win amount indicia or optimal play indicia of the first player.

7. The method of claim 5, further comprising the step of determining whether the first gaming device is being played according to the first playing style.

8. The method of claim 1, wherein the one or more countermeasures comprise at least one of requiring a proper response to a challenge, disabling the first gaming device or sending a message to a game administrator.

9. The method of claim 1, further comprising crediting a player tracking account of the first player based on the first gaming information and the second gaming information.

10. The gaming method of claim 1, further comprising monitoring a heartbeat from a third software agent.

11. The gaming method of claim 10, wherein the third software agent monitors a heartbeat from another device.

12. The gaming method of claim 11, further comprising the step of initiating countermeasures when an expected heartbeat is not received from the third software agent.

13. The gaming method of claim 1, further comprising the step of determining third gaming information regarding a second player's wagering games on a third gaming device.

14. The gaming method of claim 13, further comprising monitoring the third gaming information for indicia of cheating, the monitoring step being performed by a software agent on the first gaming device.

15. The gaming method of claim 1, further comprising monitoring the first or second gaming information for indicia of cheating.

16. The gaming method of claim 15, wherein the monitoring step is performed by a third software agent executing on a third device.

17. The gaming method of claim 1, wherein a third software agent provides network access services.

18. The gaming method of claim 1, wherein a third software agent provides progressive or bonusing services.

19. The gaming method of claim 1, wherein a third software agent provides accounting services.

20. The gaming method of claim 1, wherein a third software agent provides financial services.

21. The gaming method of claim 1, wherein a third software agent provides auditing or controller services.

22. The gaming method of claim 1, wherein a third software agent provides licensing services.

23. The gaming method of claim 1, wherein a third software agent executing on the first gaming device obtains at least some of the first gaming information from the first software agent.

24. The gaming method of claim 23, wherein the third software agent is an advertising software agent, further comprising the step of targeting advertisements to the first player based at least in part on the first gaming information.

25. The gaming method of claim 23, wherein the third software agent has a higher permission level than that of the first software agent.

26. The gaming method of claim 23, wherein the third software agent has a lower permission level than that of the first software agent.

* * * * *